(12) United States Patent
Thieuleux et al.

(10) Patent No.: US 8,871,877 B2
(45) Date of Patent: Oct. 28, 2014

(54) HYBRID ORGANIC-INORGANIC MATERIALS THAT CONTAIN STABILIZED CARBENE

(75) Inventors: Chloe Thieuleux, Villeurbanne (FR); Christophe Coperet, Lyons (FR); Laurent Veyre, Jardin (FR); Robert Corriu, Montpellier (FR); Catherine Reye, Montpellier (FR); Ahmad Mehdi, Montpellier (FR); Jean-Marie Basset, Caluire et Cuire (FR); Tarun Maishal, Karnataka (IN); Malika Boualleg, Villeurbanne (FR); Iyad Karame, Chouf (LB); Jean-Michel Camus, Dijon (FR); Johan Alauzun, Beziers (FR)

(73) Assignee: Universite Claude Bernard Lyon 1 (UCBL), Villeurbanne (FR)

( * ) Notice: Subject to any disclaimer, the term of this patent is extended or adjusted under 35 U.S.C. 154(b) by 629 days.

(21) Appl. No.: 12/812,535

(22) PCT Filed: Jan. 23, 2009

(86) PCT No.: PCT/EP2009/050810
§ 371 (c)(1),
(2), (4) Date: Mar. 4, 2011

(87) PCT Pub. No.: WO2009/092814
PCT Pub. Date: Jul. 30, 2009

(65) Prior Publication Data
US 2011/0160412 A1 Jun. 30, 2011

Related U.S. Application Data

(60) Provisional application No. 61/006,650, filed on Jan. 25, 2008.

(30) Foreign Application Priority Data

Jan. 25, 2008 (EP) .................................. 08290068

(51) Int. Cl.
*C07F 1/10* (2006.01)
*C07F 15/00* (2006.01)
*C07C 45/68* (2006.01)
*C08F 4/58* (2006.01)

(52) U.S. Cl.
USPC ........................... 526/126; 548/103; 568/315

(58) Field of Classification Search
USPC ........................... 526/126; 548/103; 568/315
See application file for complete search history.

(56) References Cited

U.S. PATENT DOCUMENTS

2004/0122250 A1 6/2004 Corriu et al.
2006/0293526 A1* 12/2006 Koehler et al. ............... 548/101

FOREIGN PATENT DOCUMENTS

DE 10 2004 039 277 A1 2/2006
WO WO 02/076991 10/2002
(Continued)

OTHER PUBLICATIONS

Gonzalez-Arellano et al., "Heterogenized Gold(I), Gold(II), and Palladium(II) Complexes for C-C Bond Reactions," Synlett. 2007, No. 11, pp. 1771-1774.*

(Continued)

*Primary Examiner* — Ling Choi
*Assistant Examiner* — Catherine S Branch
(74) *Attorney, Agent, or Firm* — Oliff PLC

(57) ABSTRACT

The present invention relates to materials and particularly "organometallic-organic-inorganic hybrid materials" that can be used as heterogeneous catalysts for selective catalytic reactions. More precisely this invention relates to organic-inorganic hybrid nanostructured materials comprising a regularly distributed stabilized carbene that binds strongly to a metal so as to form a stable organometallic-organic-inorganic hybrid material having high catalytic performances.

48 Claims, 17 Drawing Sheets

(56) References Cited

FOREIGN PATENT DOCUMENTS

| WO | WO 2005/016524 A2 | 2/2005 |
|----|-------------------|--------|
| WO | WO 2005/016941 A1 | 2/2005 |

OTHER PUBLICATIONS

Hoffmann et al, "Silica-Based Mesoporous Organic-Inorganic Hybrid Materials," Angew. Chem. Int. Ed. 2006, 45, 3216-3251.*

Maishal et al., "A Tailored Organometallic-Inorganic Hybrid Mesostructured Material: A Route to a Well-Defined, Active, and Reusable Meterogeneous Iridium-NHC Catalyst for H/D Exchange," Angew. Chem. Int. Ed. 2008, 47, 8654-8656.*

Lelli et al., "Fast Characterization of Functionalized Silica Materials by Silicon-29 Surface-Enhanced NMR Spectroscopy Using Dynamic Nuclear Polarization," J. Am. Chem. Soc. 2011, 133, 2104-2107.*

Polshettiwar et al., "Silica hybrid material containing Pd-NHC complex as heterogeneous catalyst for Mizoroki-Heck reactions," Tetrahedron Letters, 2007, pp. 5363-5366, vol. 48.

Elias et al., "Hybrid Organic-Inorganic Materials Derived from a Monosilylated Hoveyda-type Ligand as Recyclable Diene and Enyne Metathesis Catalysts," Advanced Synthesis & Catalysts, 2007, pp. 1701-1713, vol. 349.

Klapdohr et al., "Incorporation of Chromium Carbenes in a Silica Matriz by Sol-Gel Processing: Application to Aminolysis of Alkoxycarbene Complexes," Chemistry—A European Journal, 2000, pp. 3006-3017, vol. 6—No. 16.

Cetinkaya et al., "Synthesis and immobilization of N-heterocyclic carbine complexes of Ru(II): catalytic activity and recyclability for the furan formation," Journal of Molecular Catalysis, 2002, pp. 31-38, vol. 184.

Burkett et al., "Synthesis of hybrid inorganic-organic mesoporous silica by co-condensation of siloxane and organosiloxane precursors," Chem. Commun., 1996, pp. 1367-1368.

Macquarrie, "Direct preparation of organically modified MCM-type materials. Preparation and characterisation of aminpropyl-MCM and 2-cyanoethyl-MCM," Chem. Commun., 1996, pp. 1961-1962.

Inagaki et al., "Novel Mesoporous Materials with a Uniform Distribution of Organic Groups and Inorganic Oxide in Their Frameworks," Journal of the American Chemical Society, 1999, pp. 9611-9614, vol. 121.

Lee et al., "Synthesis and Characterization of Periodic Mesoporous Organosilicas as Anion Exchange Resins for Perrhenate Adsorption," Langmuir, 2005, pp. 5372-5376, vol. 21.

Mouawia et al., "Synthesis of bifunctionalized-pore mesoporous organosilica. Study of the accessibility and the distribution of functions in the pore channels," New Journal of Chemistry, 2006, pp. 1077-1082, vol. 30.

Besson et al., "Photoresponsive ordered hybrid materials containing a bridged azobenzene group," Journal of Materials Chemistry, 2005, pp. 803-809, vol. 15.

Bennett et al., "Arene Ruthenium(II) Complexes formed by Dehydrogenation of Cyclo-hexadienes with Ruthenium(III) Trichloride," J. C. S. Dalton Trans., 1974, 233-241.

Booth et al., "Silica-Supported Cyclopentadienyl-Rhodium(I), -Cobalt(I), and -Titanium(IV) Complexes, "Journal of Organometallic Chemistry, 1986, pp. 143-156, vol. 315.

Bezombes et al., "Preparation and characterization of new organic-inorganic hybrid materials incorporating phosphorus centres," Journal of Materials Chemistry, 1998, pp. 1749-1759, vol. 8—No. 8.

Corriu et al., "Molecular chemistry and nanosciences: on the way to interactive materials," Journal of Materials Chemistry, 2005, pp. 4285-4294, vol. 15.

International Preliminary Report on Patentability dated Jul. 27, 2010 issued in International Patent Application No. PCT/EP2009/050810.

* cited by examiner

HYBRID ORGANIC-INORGANIC MATERIALS THAT CONTAIN STABILIZED CARBENE

FIELD

The present invention relates to materials and particularly "organometallic-organic-inorganic hybrid materials" that can be used as heterogeneous catalysts for selective catalytic reactions. More precisely this invention relates to organic-inorganic hybrid nanostructured materials comprising a regularly distributed stabilized carbene that binds strongly to a metal so as to form a stable organometallic-organic-inorganic hybrid material having high catalytic performances.

BACKGROUND

Heterogeneous catalysis is a very important part of catalysis: 80% of the industrial processes use heterogeneous catalysts instead of homogeneous ones because they are much easier to handle (continuous flow products are separated from the catalyst by a simple filtration) and because they are most of the time recyclable and stable which represent major differences from homogeneous systems. However, classical heterogeneous catalysts only contain a small fraction of active sites and the leaching of metal can be observed into the liquid phase during the catalytic reaction thus leading to the pollution of the products, which are not easy to purify since the recovery of traces amounts of metal is difficult and/or costly. Concerning "supported homogeneous catalysts", their lack of efficiency (compared to their homogeneous analogues) has prevented their use in industrial processes.

Advances in the chemistry of materials have been achieved since the discovery of nanostructured silica synthesized by Sol-Gel process via templating routes and their further functionalization by classical grafting reaction of silylated molecules. These methods have however not given access to highly active "supported homogeneous catalysts" because neither the good control of the concentration of grafted functionalities nor the homogeneous distribution of the functionalities within the materials were obtained.

Recently, new synthetic pathways to synthesize nanostructured hybrid organic-inorganic materials containing various types of organic moieties regularly distributed within the framework, either in the pore channel or in the walls, have been developed. These organic-inorganic materials were prepared by sol-gel process by hydrolysis and condensation of organosilylated precursors with or without dilutants in presence of surfactants as structure directing agents. The first example of such materials containing organic moieties in the channel pores was described in 1996 by Mann et al. (Burkett et al., Chem. Commun. 1996, 1367) and Macquarrie D. J. et al. {Macquarrie D. J. et al., Chem. Comm 1996, 1961), whereas the first example of a nanostructured material functionalized in the walls was only achieved in 1999 by Inagaki S (Inagaki et al., J. Am. Chem. Soc. 1999, vol 121, 9611). In this type of synthesis, the structuration of the material as well as the regular distribution of the organic moieties within the framework are attributed to interactions between the structure-directing agent (surfactant) and the silylated precursors (organoalkoxysilane or alcoxysilane). Numerous advanced hybrid nanostructured materials designed for various applications (optic, gas separation (Corriu et al., Patent WO 2002/076991), ions separation (B. Lee et al. Langmuir, 2005, vol. 21, 5372) have been developed so far. Recently, Corriu R. J. P. et al. have investigated the structuration of such materials and have demonstrated the regular distribution of the organic moieties within the materials wherever their localisation (in the pores or in the walls) in the J. Mater. Chem., 2005, 15, 4285-429, in the New J. Chem., 2006, 30, 1077-1082., and in the J. Mater. Chem., 2005, 15, 803-809. Until now, the use of these types of materials in catalytic applications has been limited only to a few examples such as acido-basic catalysis or hydrogenation/oxidation reactions, in fact only two examples of these above described materials have been currently used as catalysts for challenging reactions such as metathesis of olefins (X Elias et al., Adv. Synth. Catal., 2007, Vol 349, 1701) and C—C coupling (V. Polshettiwar et al., Tetrahedron Letters, 2007, Vol 48, 5363) because most of the time they are limited to simple systems, typically not sensitive towards $H_2O$, oxygen.

A large number of reactions uses homogeneous catalysts based on organometallic complex which are sensitive to protic media and oxygen. As an example, of these homogeneous catalysts, the family of the metallo-monocarbenes as published by Grubbs and Hermann are part of the most highly active catalysts ever described, but these chemical entities are very sensitive and deactivate rapidly during the catalytic process. Moreover, these catalysts are not suitable for the synthesis of all the chemical products, like pharmaceutical active principles, because they are difficult to separate from the reaction products and are not quantitatively recovered at the end of the reaction.

Surprisingly hybrid organic-inorganic materials that contain stabilized carbene could be prepared with a good stability of the metallo-carbene species and more surprisingly, their catalytic performances are at least comparable or greater to these of the corresponding homogeneous catalysts.

Moreover, the synthesis of these materials could be achieved by Sol-Gel process using surfactants to regularly distribute the metallo-carbene moieties within the material. Noteworthy, after the catalytic process, the catalytic material can be completely recovered, recycled, and no leaching of metal was observed in the reaction mixture.

SUMMARY

The present invention relates to materials and particularly "organometallic-organic-inorganic hybrid materials" that can be used as heterogeneous catalysts for selective catalytic reactions. More precisely this invention relates to organic-inorganic hybrid nanostructured materials comprising a regularly distributed stabilized carbene that binds strongly to a metal so as to form a stable organometallic-organic-inorganic hybrid material having high catalytic performances.

More precisely the present invention relates to porous structured material which comprises:
  at least a component (A) comprising at least:
    an inorganic part selected from metalloid-oxygen units of formula —$ZO_o$, wherein Z is Silicon and o is 1.5
    an organometallic part consisting of a stabilized carbene, silylene or germylene and a metal bonded to a single stabilized carbene, silylene or germylene
    said organometallic part being bonded to the inorganic part via at least one covalent bond
  said component (A) being an integral part of the porous structured material and being regularly distributed within the porous structured material via siloxy bonds
  In others words, in component (A), —$ZO_o$═—$SiO_{1.5}$.

In the material according to the invention, the organometallic part consisting of a stabilized carbene, silylene or germylene is bonded to the inorganic part via at least one covalent bond. In other words, it means that the organic part comprising the stabilized carbene, silylene or germylene is directly bonded to the inorganic part —ZO$_o$ via at least one covalent bond, and that this binding is not realized via the metal atom, as illustrated by formula I hereafter.

Others aspects of the invention are described in the claims.

In alternative embodiments of this invention the said framework further comprises at least a component (B) comprising at least:
- an inorganic part, selected from metalloid-oxygen units of formula —ZO$_o$,
- an organic part consisting in a stabilized carbene, silylene or germylene or in a precursor of a stabilized carbene, silylene or germylene,
- said organic part being bonded to the inorganic part via at least one covalent bond said component (B) being an integral part of the porous structured material and being regularly distributed within the porous structured material via siloxy bonds the components (A) and (B) having an identical or a different inorganic part. the components (A) and (B) having an identical or a different stabilized carbene, silylene or germylene.

In others words, in component (B), —ZO$_o$=—SiO$_{1.5}$.

In alternative embodiments of this invention, the organometallic part of component (A) is bonded to its inorganic part via one covalent bond and/or the organic part of component (B) is bonded to its inorganic part via one covalent bond.

In alternative embodiments of this invention, the organometallic part of component (A) is bonded to its inorganic part via two covalent bonds and/or the organic part of component (B) is bonded to its inorganic part via two covalent bonds.

In alternative embodiments of this invention, the material comprises at least an inorganic component (C). the material of any of the previous claims, said material further comprising at least an inorganic component (C) selected from a metalloid oxide defined as Z'O$_o$', wherein the Z' atom may be selected from silicon Si, zirconium Zr, titanium Ti, aluminium Al and o' is 2 when Z' is Si, Zr or Ti, o' is 1.5 when Z' is Al or In and o' is 2.5 when Z' is Nb or Ta.

For the purposes of this invention, the term "organic-inorganic hybrid material" broadly refers to a three-dimensional solid framework made of non-carbon-containing (inorganic) fragments and carbon-containing (organic) fragments. The term "porous" means that the solid framework contains channels and/or pores and/or cavities. The channels may be interconnected or not and are regularly distributed throughout the framework.

In alternative embodiments of this invention, the material can be structured in a one or two dimensional hexagonal array of pores or in a cubic or wormlike arrangement of the pores.

In alternative embodiments of this invention, the material can comprise a three-dimensional framework that can be crystalline, amorphous or quasi-crystalline and further contains a series of pores and/or channels.

In alternative embodiments of this invention, the porous material of the invention may have a mean pore diameter from 20 to 500 Å, preferably from 20 to 150 Å. Pores diameters was calculated using BJH (Barrett-Joyner-Halenda) equation.

In alternative embodiments of this invention, the molar ratio r between the total amount of components (A), (B) and (C) divided by the total amount of components (A) and (B) ranges from 1 to about 1000.

In alternative embodiments of this invention, the molar ratio r' between the total amounts of component (B), divided by the total amount of component (A) ranges from 0 to about 1000.

The Z' atom may be selected from silicon Si, zirconium Zr, titanium Ti, aluminium Al, Nb nobium, Indium In or tantalium Ta, and o' is 2 when Z' is Si, Zr or Ti, o' is 1.5 when Z' is Al or In and o' is 2.5 when Z' is Nb or Ta.

In a preferred embodiment Z' is silicon.

For the purposes of this invention, the term stabilized carbene, silylene or germylene is a L-type carbene-carbon, a silylene-silicium or a germylene-germanium.

The L-type carbene-carbon, is defined according to Green formalism (G. Parkin, Comprehensive Organometallic Chemistry III, Vol. 1, Chap. 1, Ed. Elsevier 2007).

In a preferred embodiment of this invention, the organometallic part of component (A) consists in a stabilized carbene bonded to a metal and/or the organic part of component (B) consists in a stabilized carbene or a precursor of a stabilized carbene.

In a preferred embodiment the stabilized carbene is a substituted N-heterocyclic carbene.

In a preferred embodiment the precursor of the stabilized carbene is a substituted N-heterocyclic group.

In a preferred embodiment the precursor of the stabilized carbene is a substituted imidazolium unit.

The term "metal" shall refer to any metal that are classified into Group 3 through group 11 of the Periodic Table of Elements, as referenced by the IUPAC (1985) and into lanthanides.

The material of the invention can be represented by the followings formulas.

The organometallic part of the component (A) comprising a stabilized carbene, silylene or germylene bonded to a metal may be chosen among radicals of formula I

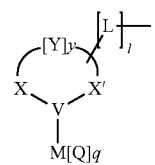

wherein
- V is a carbon atom C, a silicon atom Si or a germanium atom Ge,
- M is a metal, selected from lanthanides and metals from the group 3 elements to group 11 elements (III B to I B),
- Q is a ligand, and q is comprised between 0 to 11 as a function of the metal, the ligands Q could be the same or not and could be linked together to form a cyclic group in a 3 to 8 membered ring,
- Q is selected from the group consisting of hydrogen, halide, $C_{1-20}$ alkyl, $C_{5-20}$ aryl, $C_{1-20}$ alkoxy and thioalkoxy, $C_{5-20}$ aryloxy and thioaryloxy, $C_{1-20}$ alkyldiketonate, diketiminate ligand (such as the NacNac: CH[C(Me)NAr]$_2^-$, Ar=2,6-Me$_2$C$_6$H$_3$), $C_{1-20}$ alkoxycarbonyl, $C_{1-20}$ arylcarbonyl, $C_{1-20}$ acyl, $C_{1-20}$ alkylsulfonato, $C_{1-20}$ arylsulfonato, $C_{1-20}$ alkylsulfanyl, $C_{1-20}$ arylsulfanyl $C_{1-20}$ alkylsulfinyl, $C_{1-20}$ arylsulfinyl, $C_{1-20}$ alkylcarboxylate, $C_{1-20}$ arylcarboxylate, $C_{1-20}$ alkylsilyl, $C_{1-20}$ arylsilyl, $C_{1-20}$, substituted with one or more moieties selected from the group consisting of. $C_{1-10}$ alkoxy, $C_{1-10}$ alkyl, $C_{1-10}$ aryl), cyclopentadienyl, amido, imido, phosphido, nitrido, alkene, alkyne, arene, phosphane, sulfonated phosphane, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether.
- X et X' are each independently selected from carbon or heteroatom, the heteroatom being selected from nitrogen N, oxygen O, sulphur S or phosphorus, provided that at least one of X or X' is a heteroatom, eventually substituted if not bonded to L, by an hydrogen atom H or a R substituent.

Y is a divalent radical from 1 to 6 atoms including a substituted hydrocarbylene, a hydrocarbylene comprising at least a heteroatom, or a substituted hydrocarbylene comprising at least a heteroatom and forming a ring between X and X' when y is comprised between 1 to 10, or if y is 0, X and X' can be directly linked or not.

L is a divalent radical and 1 is comprised between 1 and 2 (2+y), comprising a hydrocarbylene bonding X or X' or any of the divalent hydrocarbon radical Y, respectively including a substituted hydrocarbylene, a hydrocarbylene comprising a heteroatom, or substituted hydrocarbylene comprising a heteroatom, like a $C_{1-10}$ alkylene, a $C_{6-40}$ arylene substituted or not.

R is selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether.

In an alternative embodiment, the organometallic part of the component (A) comprising a stabilized carbene, silylene or germylene may be chosen among radicals of formulas Ia or Ib

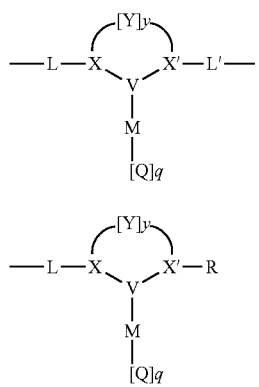

wherein
V is a carbon atom C, a silicon atom Si or a germanium atom Ge,
M is a metal, selected from lanthanides and metals from the group 3 elements to group 11 elements (III B to I B),
Q is a ligand, and q is comprised between 0 to 11 as a function of the metal, the ligands could be the same or different and could be linked together to form a cyclic group in a 3 to 8 membered ring.
Q is selected from the group consisting of hydrogen, halide, $C_{1-20}$ alkyl, $C_{5-20}$ aryl, $C_{1-20}$ alkoxy and thioalkoxy, $C_{5-20}$ aryloxy and thioaryloxy, $C_{1-20}$ alkyldiketonat, diketiminate ligand (such as the NacNac: $CH[C(Me)NAr]_2^-$, Ar=2,6-$Me_2C_6H_3$), $C_{1-20}$ alkoxycarbonyl, $C_{1-20}$ arylcarbonyl, $C_{1-20}$ acyl, $C_{1-20}$ alkylsulfonato, $C_{1-20}$ aryl sulfonato, $C_{1-20}$ alkylsulfanyl, $C_{1-20}$ arylsulfanyl $C_{1-20}$ alkylsulfinyl, $C_{1-20}$ arylsulfinyl, $C_{1-20}$ alkylcarboxylate, $C_{1-20}$ arylcarboxylate, $C_{1-20}$ alkylsilyl, $C_{1-20}$ arylsilyl, $C_{1-20}$, substituted with one or more moieties selected from the group consisting of. $C_{1-10}$ alkoxy, $C_{1-10}$ alkyl, $C_{1-10}$ aryl), cyclopentadienyl, amido, imido, phosphido, alkene, alkyne, arene, phosphane, sulfonated phosphane, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether.

X et X' are each independently selected from carbon or heteroatom, the heteroatom being selected from nitrogen N, oxygen O, sulphur S or phosphorus, provided that at least one of X or X' is a heteroatom, L and L' are divalent linkers, each individually comprising a hydrocarbylene bonding X or X', respectively including a substituted hydrocarbylene, a hydrocarbylene comprising a heteroatom, or substituted hydrocarbylene comprising a heteroatom, like a $C_{1-10}$ alkylene, a $C_{6-40}$ arylene substituted or not, provided that when the organometallic part is part of the organic-inorganic framework via only one covalent bond one of the L or L' is replaced by an R substituent.

Y is a divalent radical from 1 to 6 atoms including a substituted hydrocarbylene, a hydrocarbylene comprising at least a heteroatom, or a substituted hydrocarbylene comprising at least a heteroatom and forming a ring between X and X' when y is comprised between 1 to 10, or if y is 0, X and X' can be directly linked or not.

R is selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether.

In alternative embodiments of this invention, the metal M is selected from the group consisting to the group 3 elements to group 11 elements (III B to I B).

In alternative embodiments of this invention the metal M is selected from the group consisting of ruthenium Ru, molybdenum Mo, tungsten W or rhenium Re.

In alternative embodiments of this invention the metal M is selected from the group consisting of iron Fe, copper Cu, nickel Ni, palladium Pd or gold Au.

In alternative embodiments of this invention the metal M is selected from the group consisting of vanadium V, chromium Cr, molybdenum Mo, tungsten W, rhenium Re, iron Fe, ruthenium Ru, osmium Os, platinum Pt or gold Au.

In alternative embodiments of this invention the metal M is selected from the group consisting of lanthanides preferably neodinium Nd and yttrium Y, titanium Ti, zirconium Zr, hafnium Hf, chromium Cr or nickel Ni.

In alternative embodiments of this invention the metal M is selected from the group consisting of cobalt Co, rhodium Rh or iridium Ir.

In alternative embodiments of this invention, the metal is selected from the group consisting of titanium Ti, ruthenium Ru, rhodium Rh, or Iridium Ir.

The organic part of the component (B) comprising a stabilized carbene or a precursor of a stabilized carbene may be chosen among radicals of formula I'

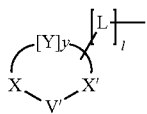

I' wherein V' can be identical to V or be a precursor to V that can be a sp$^2$ C—H along with a counter-anion, or a sp$^3$ C(—H)(A), A is selected from the group consisting of $C_{1-20}$ alkyl, Halogeno-$C_{1-20}$ alkyl, $C_{5-20}$ aryl, halogeno-$C_{5-20}$ aryl, $C_{1-20}$ alkoxo, $C_{5-20}$ aryloxo, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether wherein R, L, l, X, X', Y are as defined hereinabove.

In a preferred embodiment, the organic part of the organic-inorganic component (B) comprising a stabilized carbene or a precursor of a stabilized carbene may be chosen among radicals of formula I'a or I'b

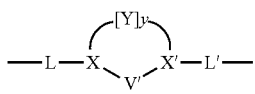

I'a

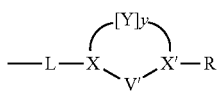

I'b wherein V'R, L, L', X, X', Y are as defined hereinabove.

The component (A) may be chosen among the components of formula II

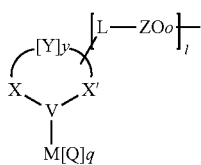

II

In a preferred embodiment the organometallic-inorganic component (A) may be chosen among the components of formula IIa or IIb

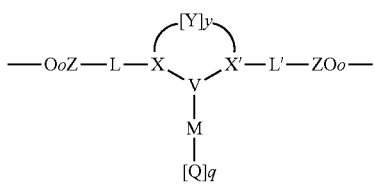

IIa

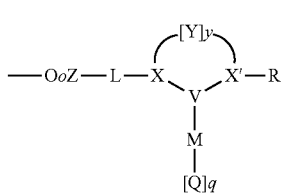

IIb wherein V, R, L, L', M, Q, X, X', Y, q, y and o are as defined herein above and may be identical or different from one organometallic organic-inorganic component to another.

The component (B) may be chosen among the components of formula III

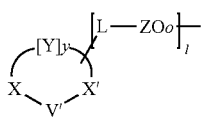

III wherein V', R, L, I, X, X', Y, y and o are as defined herein above and may be identical or different from one organic-inorganic component to another.

In a preferred embodiment the organic-inorganic component (B) may be chosen among the components of formulas IIIa and IIIb

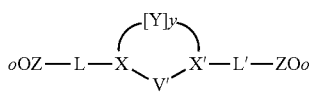

IIIa

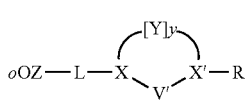

IIIb wherein V', R, L, L', X, X', Y, Z, o and y are as defined herein above and may be identical or different from one organic-inorganic component to another.

The material of the invention may be selected from the compounds of formula IV

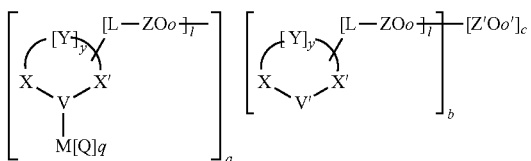

IV with b/a=r' with 0≤r'≤1000
with 1≤r=(a+b+c)/(a+b)≤1000
wherein L, L', X, X', Y, R, Z, Z', V, V', o, o', a, b, c and y are as defined herein above and may be identical or different from one organometallic-inorganic component to another; they may be identical or different from one organic-inorganic component to another, identical or different from the organometallic-inorganic component to the organic-inorganic component.

An example of:

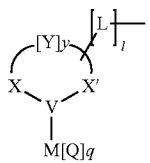

in formula (I), (Ia), (Ib), (II), (IIa), (IIb) and (IV) are:

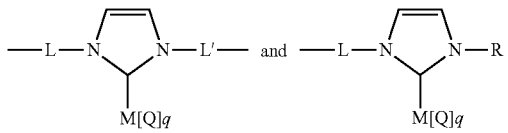

wherein R, L, L', M, Q and q are as defined herein above and may be identical or different from one organic-inorganic component to another.

An example of:

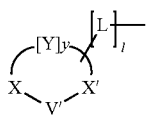

in formula (I'), (I'a), (I'b), (III), (IIIa), (IIIb) and (IV) are:

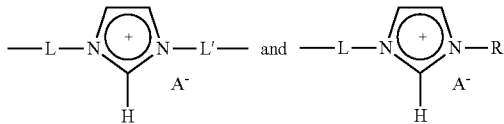

wherein R, L, and L' are as defined herein above and may be identical or different from one organic-inorganic component to another and $A^-$ is an anion chosen between $I^-$, $Br^-$, $Cl^-$, $NO_3^-$, $BF_4^-$, $B(C_6F_5)_4^-$, $OTs^-$, $PF_6^-$, $OTf^-$, $NTf_2^-$.

For instance, in formula (I), (Ia), (Ib), (I'a), (I'b), (II), (IIa), (IIb) (IIIa), (IIIb) and (IV), R can be a methyl or a mesityl group.

For instance, in formula (I), (Ia), (Ib), (I'a), (I'b), (II), (IIa), (IIb) (IIIa), (IIIb) and (IV), L can be —$CH_2Ph$, hexyl, phenyl, phenyl-mesityl ... and the $ZO_o$ or $Z'O_o$, being bounded in para of the phenyl group.

DETAILED DESCRIPTION

Figure 1:
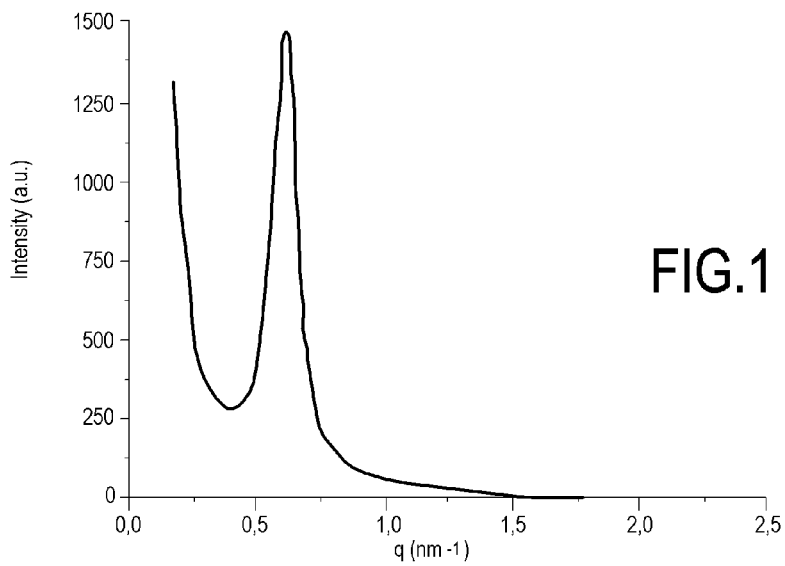
FIG. 1 is an XRD diffraction of Iodopropyl-functionalised material $P1_{29}^1$ according to an embodiment of the present disclosure.

As previously explained, in a preferred embodiment the organometallic-organic-inorganic hybrid material, is made of an organic-inorganic component comprising an inorganic part and an organic part and of an organometallic-inorganic component comprising an inorganic part and an organometallic part and optionally an inorganic component.

In a preferred embodiment the inorganic part of the organic-inorganic component can be derived from silicium, zirconium, titanium, indium, nobium or tantalum oxides.

The invention concerns also the experimental procedures to obtain a material as described above.

The organometallic-organic-inorganic hybrid material of this invention can be prepared by any synthetic method that is capable of inserting organic fragments into an inorganic framework.

A sol-gel method using structure directing agents is the preferred method of synthesizing the organometallic-organic-inorganic hybrid material.

However the complete synthesis of the organometallic organic-inorganic hybrid material of this invention is not limited to a particular synthesis strategy, and the following strategies could be described.

Two strategies are preferred.

In broad terms the first strategy comprises third steps:

The first step is the synthesis of the organic silylated precursors, the second step is the synthesis of an organic-inorganic hybrid material by sol-gel process, the third step is the formation of the carbene and its further coordination with an organometallic complex to obtain an organometallic-organic-inorganic hybrid material of this invention, optionally the desired organometallic-organic-inorganic hybrid material can be obtained by in-situ transmetallation from the organometallic-organic-inorganic hybrid material previously synthesized in the third step.

In broad terms the second strategy comprises the following steps:

the first step is the synthesis of the organic silylated precursors, the second step is the transformation of the organic silylated precursors into organometallic silylated precursors, the third step is the synthesis of an organometallic-organic-inorganic hybrid material by sol-gel process, optionally the desired organometallic-organic-inorganic hybrid material can be obtained by in-situ transmetallation from the organometallic-organic-inorganic hybrid material previously synthesized in the third step, Both strategies may also include an additional step of converting residual hydroxyl- or alkoxy-functionalities, present on the surface of the hybrid material to other surface functionalities, such as alkoxy and trialkylsiloxy-groups.

A "sol-gel process" is a wet-chemical technique for the fabrication of materials (typically a metal oxide) starting from a chemical solution that reacts to produce colloidal particles (sol). Typical precursors are metal alkoxides and metal chlorides, which undergo hydrolysis and polycondensation reactions to form a colloid, a system composed of solid particles (size ranging from 1 nm to 1 μm) dispersed in a solvent. The sol evolves then towards the formation of an inorganic network containing a liquid phase (gel). Formation of a metal oxide involves connecting the metal centers with oxo (M-O-M) or hydroxo (M-OH-M) bridges, therefore generating metal-oxo or metal-hydroxo polymers in solution. The drying process serves to remove the liquid phase from the gel thus forming a porous material, then a thermal treatment (firing) may be performed in order to favor further polycondensation and enhance mechanical properties.

The classical sol-gel process and the synthesis of hybrid nanostructured materials by sol-gel process using a templating route have been respectively described by Corriu R. J. P et al. in Angew. Chem. Int; Ed. 1996, 35, 1420-1436 and in J. Mater. Chem 2005, 15, 4285-4294.

Regarding the first strategy, the invention also concerns a method for synthesizing a material of the invention comprising at least the following steps:

a) a sol-gel step, with at least a mono or disilylated carbene, silylene or germylene precursor of formula V wherein L, L', X, X', Y and y are as defined herein above and may be identical or different and optionally with trialkoxyalkylmetalloid and/or peralkoxymetal/metalloid of formula R'Si(OR)$_3$ or Z'(OR)$_x$ Z'(OH)x or Z'(O-)$_x$.(x/n)(E$^{n+}$):

$$\left(\underset{X}{\overset{\{Y\}_y}{\bigvee}}\underset{\underset{M[Q]q}{|}}{\overset{[L-Z(OR'')_3]_l}{\bigvee}}X'\right)  \quad V$$

wherein the said sol-gel step can be achieved in water with or without co solvents or in an appropriate polar solvent along with water, using hydrolysis-condensation catalysts chosen among bases, acids or nucleophilic compounds to obtain a compound of formula III, b) optionally the compound of formula III is treated to remove surfactant and, c) the compound of formula III is contacted with a base or a silver compound and, d) Simultaneously or subsequently, the material obtained in step c) is reacted with a metal complex under conditions so as to form an organometallic-organic-inorganic hybrid material of formula IV.

When the sol-gel step is achieved with trialkoxyalkylmetalloid and/or peralkoxymetal/metalloid of formula R'Si(OR)$_3$ or Z'(OR)$_x$, Z'(OH)x or Z'(O-)$_x$.(x/n)(E$^{n+}$), a corresponding part [Z'O$_o$]$_c$ as defined above is introduced.

For instance, in the first strategy, R" is selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether. R" can also be an allyl group.

Preferably, in the first strategy, R" represents H, a $C_1$-$C_6$alkyl (methyl, ethyl, isopropyl being preferred), an aryl (phenyl being preferred) or an allyl group.

Regarding the second strategy, the invention further concerns a second method for synthesizing a material of the invention comprising at least the following steps:

a) a sol-gel step, with at least an organometallic mono or disilylated carbene, silylene or germylene precursor of formula VI wherein L, L', X, X', Y and y are as defined herein above and may be identical or different and optionally with trialkoxyalkylmetalloid and/or peralkoxymetal/metalloid of formula R'Si(OR)$_3$ or Z'(OR)$_x$, Z'(OH)x or Z'(O-)$_x$.(x/n)(E$^{n+}$)

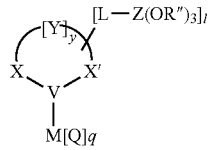

VI wherein the said sol-gel step can be achieved in water with or without co solvents or in an appropriate polar solvent along with water, using hydrolysis-condensation catalysts chosen among bases, acids or nucleophilic compounds to obtain a compound of formula III, b) optionally the compound of formula III is treated to remove surfactant, c) optionally the compound of formula III obtained is subjected to an in-situ transmetallation or contacted with a appropriate component to obtain the desired material of formula IV.

When the sol-gel step is achieved with trialkoxyalkylmetalloid and/or peralkoxymetal/metalloid of formula R'Si(OR)$_3$ or Z'(OR)$_x$, Z'(OH)x or Z'(O-)$_x$.(x/n)(E$^{n+}$), a corresponding part [Z'O$_o$]$_c$ as defined above is introduced.

For instance, in the second strategy, R" is selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether. R" can also be an allyl group.

Preferably, in the second strategy, R" represents H, a $C_1$-$C_6$alkyl (methyl, ethyl, isopropyl being preferred), an aryl (phenyl being preferred) or an allyl group.

The invention also concerns the methods as described above wherein the co-solvents can be chosen among alcohols, amides, ethers, esters.

The invention also concerns the methods as described above wherein the polar solvents can be chosen among alcohols, amides, ethers, esters.

The invention also concerns the methods as described above wherein the surfactant is chosen among:

1) anionic surfactants (Sodium dodecyl sulfate);
2) cationic surfactants: ammonium salts (Cetyltrimethylammonium bromide), imidazolium salts (1-Hexadecane-3-methylimidazolium Bromide $C_{16}H_{33}$-methylimidazoliumBr), pyridinium salts (n-Hexadecylpyridinium chloride), phosphonium salts;

3) non-ionic surfactants:
amines (hexadecylamine ($C_{16}H_{33}NH_2$),
alkylpolyethyleneoxides or alkylarylpolyethylene oxides (Brij 52 ($C_{16}H_{33}O(CH_2CH_2O)_2H$), Tergitol 15-S-12 ($C_{11-15}H_{23-31}O(CH_2CH_2O)_{12}H$), Triton X 100 ($C_{14}H_{22}O(C_2H_4O)_n$, n=9-10), Montanox 20 (Sorbitan.20EO.monooleyl ester), Octylphenol-10EO (p-$C_8H_{17}C_6H_4O(CH_2CH_2O)_{10}H$), Lauryl ether-nEO ($C_{12}H_{25}O(CH_2CH_2O)_nH$ n~2,4,8)),
polysorbate surfactants (such as Tween 20 (IUPAC name: polyoxyethylene (20) sorbitan monolaurate) and,
amphiphilic block copolymers (like Pluronic P123 triblock copolymer ($EO_{20}$-$PO_{70}$-$EO_{20}$), Pluronic F127 ($EO_{100}$-$PO_{70}$-$EO_{100}$) or F108 ($EO_{132}$-$PO_{50}$-$EO_{132}$)).

The invention also concerns the methods as described above wherein the hydrolysis polycondensation catalyst is a base chosen among amines, an acid chosen among inorganic acids such as hydrochloric acid, hydrobromic acid, iodidric acid . . . or organic acids such as p-toluene sulfonic acid or a nucleophile such as sodium fluoride and tetrabutylammonium fluoride.

The invention also concerns the methods as described above wherein the surfactant is removed by washing with the proper polar solvent as described above (alcohol, water . . . ) with/without the presence of an acid or Soxhlet extraction.

The invention also concerns the methods as described above wherein the base in step c is chosen among potassium hexamethyldisilazide (KHMDS), tBuOK, DBU: 1,8-diazabicyclo[5.4.0]undec-7-ène, phosphazenes (BEMP), pyridines, phosphanes, guanidine type bases: $R^1R^2N)(R^3R^4N)C=N-R^5$.

The invention also concerns the methods as described above wherein the silver compound is chosen among the soluble Ag salts, Ag-Alkoxysilane or Ag-Alkoxyde: AgO—Si(iPr)$_3$, AgO—C(CF$_3$)$_3$ The invention also concerns the methods as described above wherein the metal complex is defined as MQ'$_{q'}$, where M is a metal chosen for the periodic classification, Q' is a ligand, and q' is comprised between 0 to 11 as a function of the metal, the ligands could be the same or different and could be linked together to form a cyclic group in a 3 to 8 membered ring. Q' is selected from the group consisting of hydrogen, halide, $C_{1-20}$ alkyl, $C_{5-20}$ aryl, $C_{1-20}$ alkoxy and thioalkoxy, $C_{5-20}$ aryloxy and thioaryloxy, $C_{1-20}$ alkyldiketonate, diketiminate ligand (such as the NacNac: CH[C(Me)NAr]$_2^-$, Ar=2,6-Me$_2$C$_6$H$_3$), $C_{1-20}$ alkoxycarbonyl, $C_{1-20}$ arylcarbonyl, $C_{1-20}$ acyl, $C_{1-20}$ alkylsulfonato, $C_{1-20}$ arylsulfonato, $C_{1-20}$ alkylsulfanyl, $C_{1-20}$ arylsulfanyl $C_{1-20}$ alkylsulfinyl, $C_{1-20}$ arylsulfinyl, $C_{1-20}$ alkylcarboxylate, $C_{1-20}$ arylcarboxylate, $C_{1-20}$ alkylsilyl, $C_{1-20}$ arylsilyl, $C_{1-20}$, substituted with one or more moieties selected from the group consisting of. $C_{1-10}$ alkoxy, $C_{1-10}$ alkyl, $C_{1-10}$ aryl), cyclopentadienyl, amido, imido, phosphido, nitrido, alkene, alkyne, arene, phosphane, sulfonated phosphane, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether (G. Parkin, Comprehensive Organometallic Chemistry III, Vol. 1, Chap. 1, Ed. Elsevier 2007).

In general, q' is different from q in the final product because a ligand is lost during the reaction.

The invention also concerns the methods as described above wherein a further step a' is included after the step a, which consists in removing the residual hydroxyl or alkoxygroups. This is typically done by reaction of the material with passivating agents, typically considered as hydrophobic and chosen among trialkylsilyl derivatives (chloro, bromo, Iode, amide or alkoxysilanes) or alcohols.

For the purposes of the invention the transmetallation corresponds to the exchange of one metal to another in appropriate conditions (Comprehensive Organometallic Chemistry III, Vol. 1, Elsevier 2007), respecting the material like Ag for Ru and Ag for Ir.

All the schemes and the formulas are only illustrative and represent a simplified (and an ideal) representation of the materials.

By convention, in this application all the materials presented will be quoted using letters and figures:

for materials containing organic fragments in the pores, they will be quoted by the letter P with the number referring to the silylated organic precursor introduced within the material in exponent and the number referring to the expected dilution of the organic precursor in the material (i.e. the ratio of dilutant/the silylated precursor) in index leading to $P_y^x$, N.B: When no dilutant is introduced the figure y in index is 0.

the same nomenclature will be used for materials being functionalized in the walls with the letter W.

when in-situ reactions are achieved in the materials, letters and figures will be added to the above-mentioned symbols $P_y^x$ and $W_{y'}^{x'}$, see experimental part for more details.

The invention also concerns also each of the following materials of formulas $P_{30HOMeSi}^{2MesAg}$, $P_{30HSi}^{2MesAg}$, $P_{30HOMe}^{2MesAgIr}$, $P_{30HSi}^{2MesKIr}$, $P_{30HSi}^{2MesKIr}$, $P_{30HOMeSi}^{2MesKIr}$, $P_{30HoMeSi}^{2MesKRu}$ L=PCy3, $P_{30HSi}^{2MesKRu_{0,2}}$ L=PCy3, $P_{30HSi}^{2MesKRu_1}$ L=PCy3, $P_{30HOMe}^{2MesAg}$, $P_{30HOMeSi}^{2Mes}$, $P_{30HOMe}^{2Mes}$, $P_{30HSi}^{2Mes}$, $P_{30HSi}^{2Mes}$, $P_{30H}^{2Mes}$, $P_{30H}^{2Mes}$, $P_{30HSi}^{2}$, $P_{30HOMe}^{3MeAgRu}$, $P_{30HOMe}^{3MeAg}$, $P_{30HOMeSi}^{3MeKIr}$, $P_{30HOMeSi}^{3MeAgIr}$, $P_{30HSi}^{3MeAgIr}$, $P_{30HOMeSi}^{3Me}$, $P_{30HOMe}^{3Me}$, $P_{30HSi}^{3Me}$, $P_{30H}^{3Me}$, $P_{30}^{1Mes}$, $P_{30HSi}^{1Mes}$, $P_{30OMeSi}^{1Mes}$, $P_{30HOMe}^{1MesAg}$, $P_{30HOMe}^{1MesAgRu}$, $P_{30HSi}^{1MesAgRu}$, $P_{30HSi}^{1MesKRu}$, L=PCy3, $P_{30OMeSi}^{1MesKRu}$, L=PC3, $W_{19HSi}^{7}$, $W_{19HSi}^{7Pd(OAc)_2}$, $W_{19HSi}^{7BPdCl_2}$, $W_{19HSi}^{7BPdCl_2COD}$ as below represented:

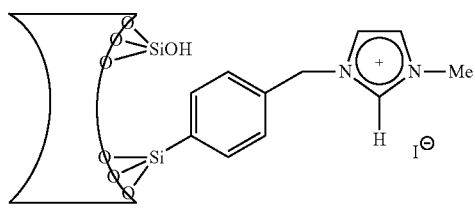

$P_{30H}^{3Me}$

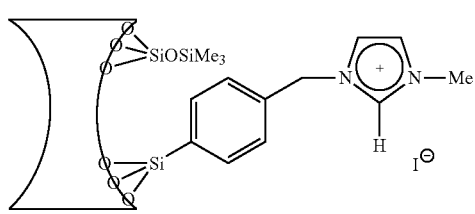

$P_{30HSi}^{3Me}$

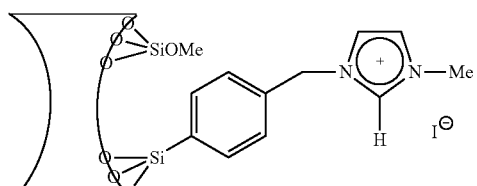

$P_{30HOMe}^{3Me}$

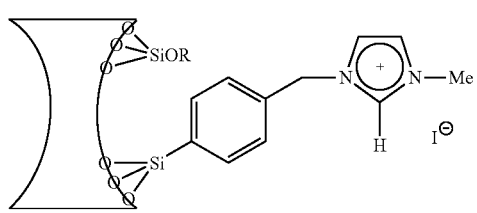

$P_{30HOMeSi}^{3Me}$

R = Me and SiMe$_3$

R=Me and SiMe$_3$ means that in some binding groups $O_{1,5}Si$ (OR) some R represent Me and other R represent SiMe$_3$

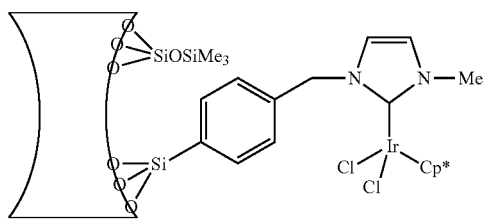

$P_{30HSi}^{3MeAgIr}$

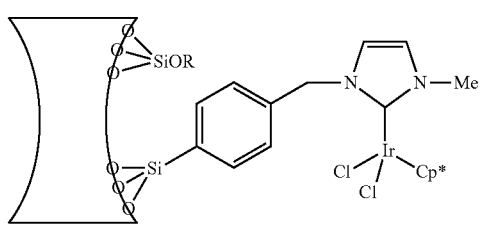

$P_{30HOMeSi}^{3MeAgIr}$
R = Me and SiMe$_3$

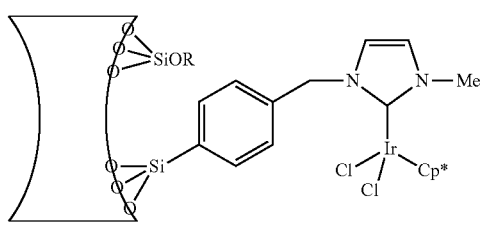

$P_{30HOMeSi}^{3MeKIr}$
R = Me and SiMe$_3$

-continued
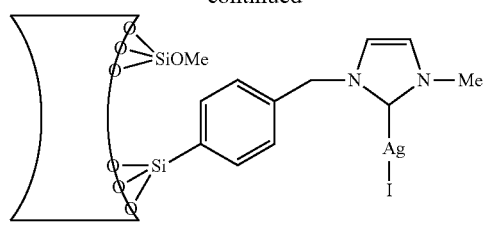
P$_{30HOMe}^{3MeAg}$
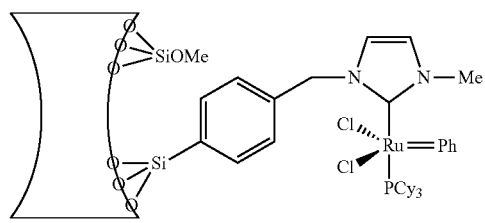
P$_{30HOMe}^{3MeAgRu}$
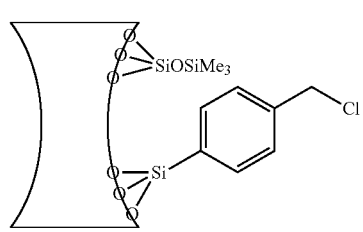
P$_{30HSi}^{2}$
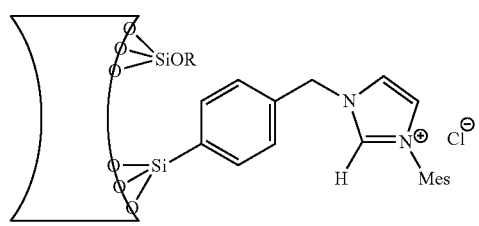
P$_{30H}^{2Mes}$
R = H
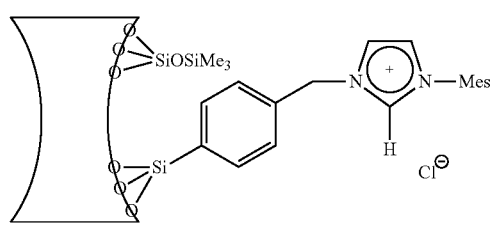
P$_{30HSi}^{2Mes}$
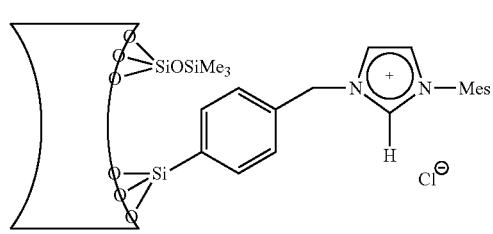
P$_{30HSi}^{2Mes}$
-continued
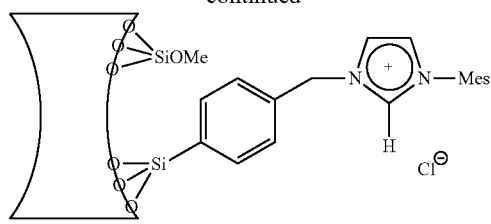
P$_{30HOMe}^{2Mes}$
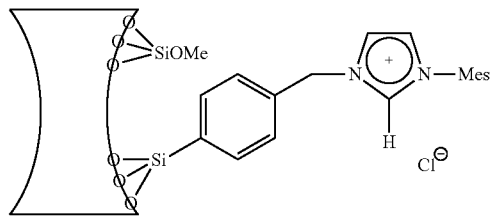
P$_{30HOMeSi}^{2Mes}$
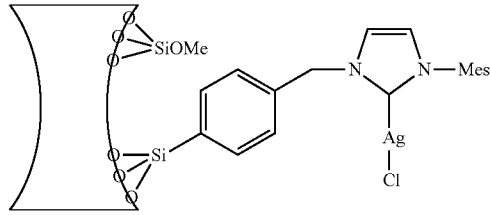
P$_{30HOMe}^{2MesAg}$
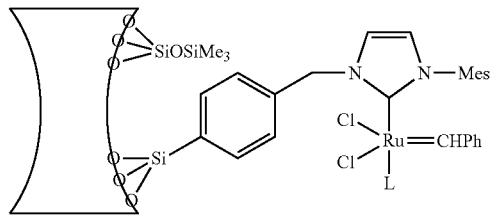
P$_{30HSi}^{2MesKRu}$ 1
L = PCy$_3$
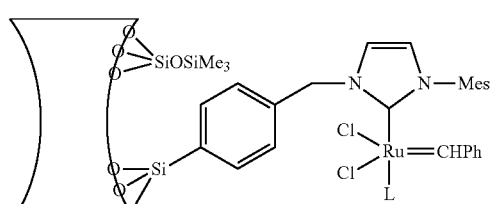
P$_{30HSi}^{2MesKRu}$ $_{Q.2}$
L = PCy$_3$
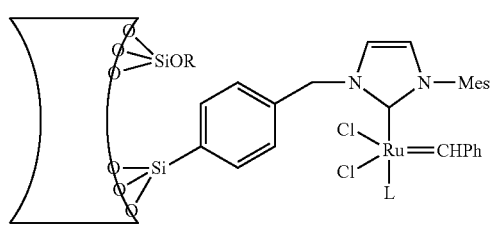
P$_{30HOMeSi}^{2MesKRu}$
L = PCy$_3$
R = Me and SiMe$_3$ -continued
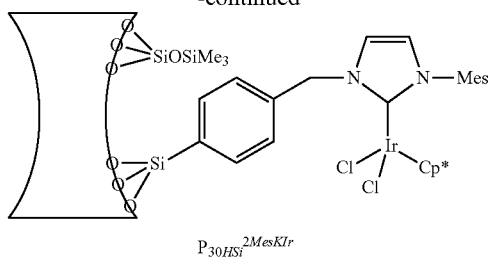
P30HSi2MesKIr
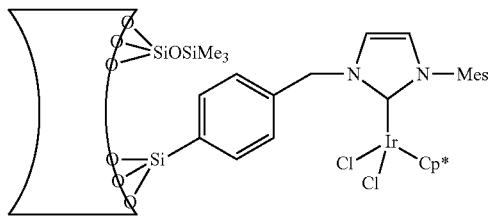
P30HSi2MesKIr
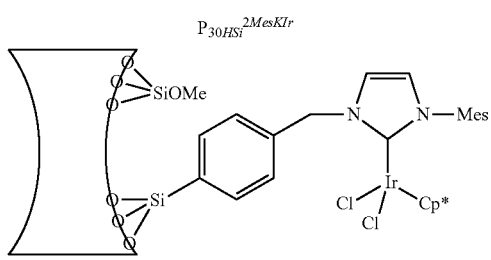
P30HOMe2MesAgIr
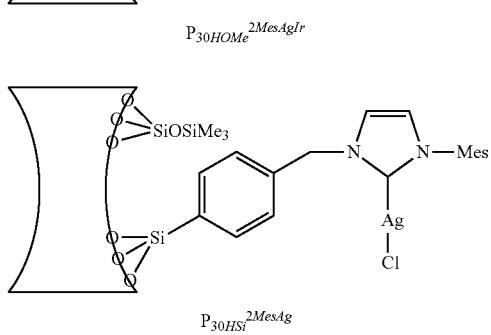
P30HSi2MesAg
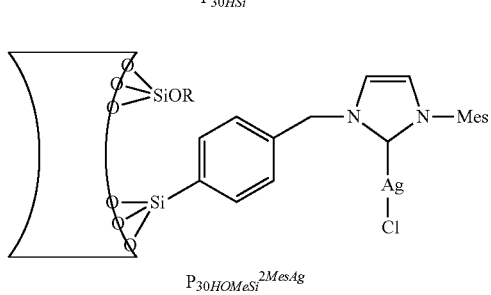
P30HOMeSi2MesAg
R = Me and SiMe3
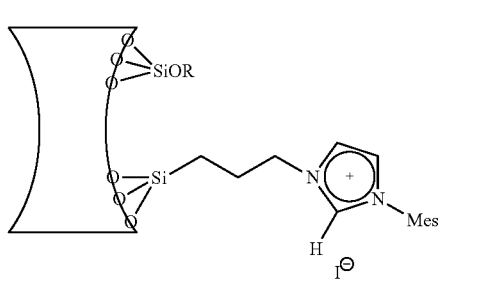
P301Mes
R = H and Et
-continued
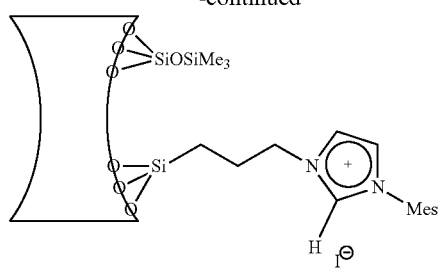
P30HSi1Mes
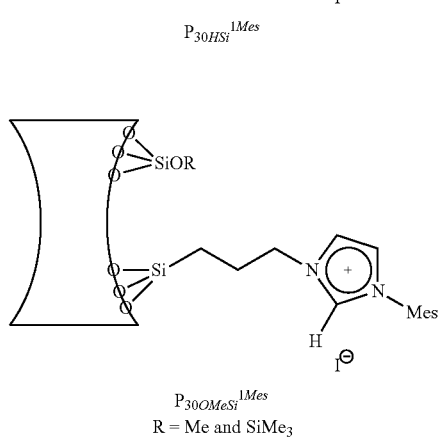
P30OMeSi1Mes
R = Me and SiMe3
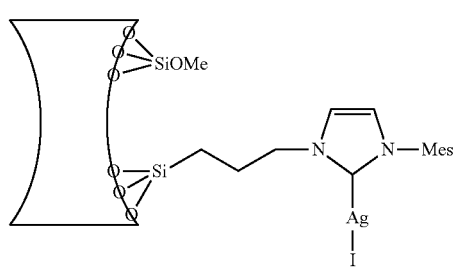
P30HOMe1MesAg
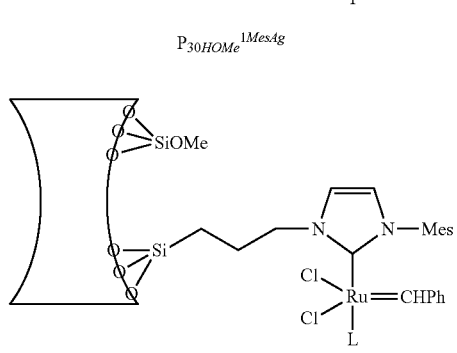
P30HOMe1MesAgRu
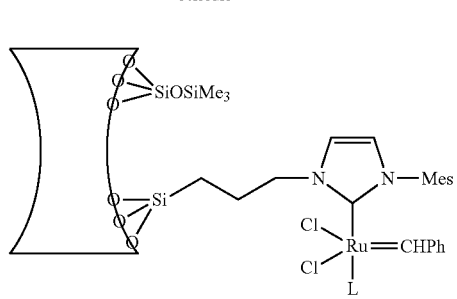
P30HSi1MesAgRu

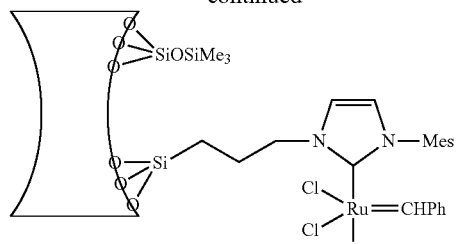

$P_{30HSi}^{1MesKRu}$,
L = PCy$_3$

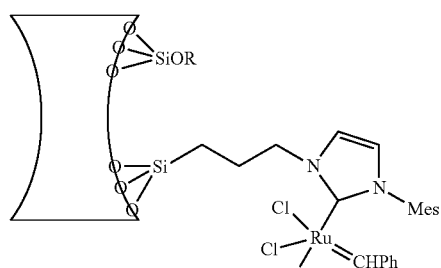

$P_{30OMeSi}^{1MesKRu}$,
L = PCy$_3$
R = Me and SiMe$_3$

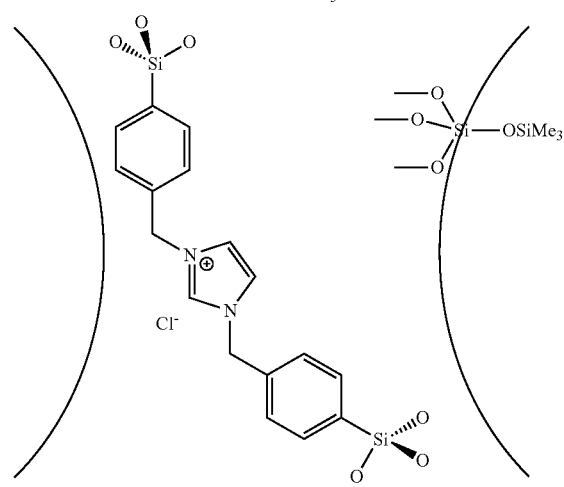

$W_{19HSi}^{7}$

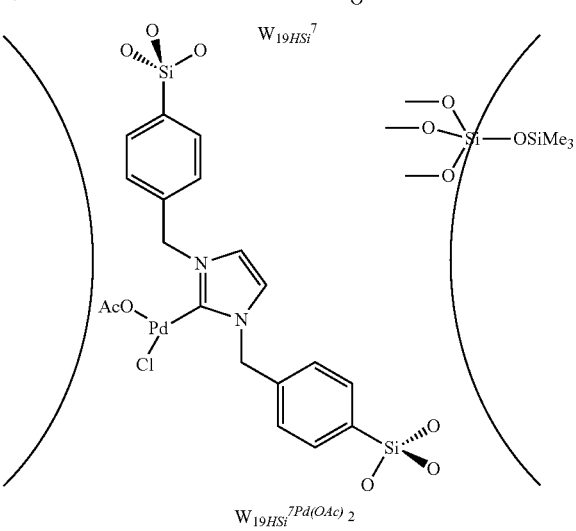

$W_{19HSi}^{7Pd(OAc)_2}$

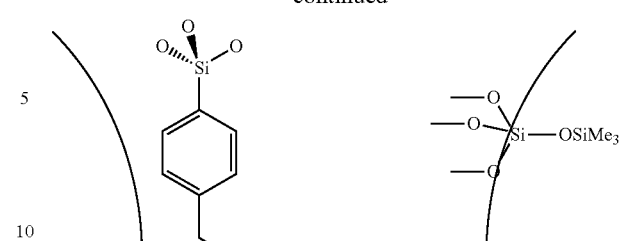

$W_{19HSi}^{7BPdCl_2}$

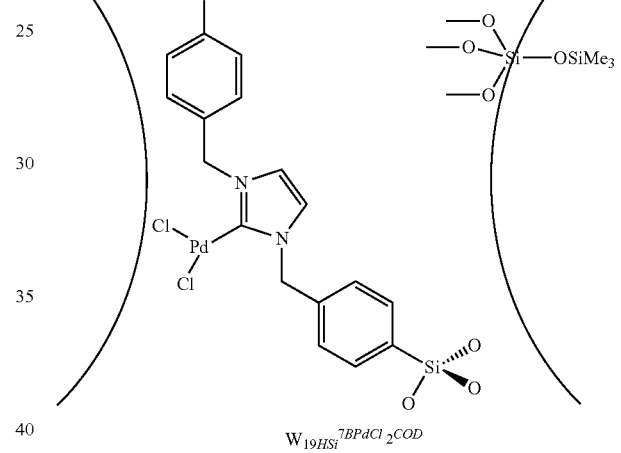

$W_{19HSi}^{7BPdCl_2COD}$ $P_{30HOMeSi}^{2MesAg}$, $P_{30HSi}^{2MesAg}$, $P_{30HOMe}^{2MesAgIr}$, $P_{30HSi}^{2MesKIr}$, $P_{30HSi}^{2MesKIr}$, $P_{30HOMeSi}^{2MesKRu}$ L=PCy3, $P_{30HSi}^{2MesKRu_{0.2}}$ L=PCy3, $P_{30HSi}^{2MesKRu_1}$ L=PCy3, $P_{30HOMe}^{2MesAg}$, $P_{30HOMe}^{3MeAgRu}$, $P_{30HOMe}^{3MeAg}$, $P_{30HOMeSi}^{3MeKIr}$, $P_{30HOMeSi}^{3MeAgIr}$, $P_{30HSi}^{3MeAgIr}$, $P_{30}^{1Mes}$, $P_{30HSi}^{1Mes}$, $P_{30OMeSi}^{1Mes}$, $P_{30HOMe}^{1MesAg}$, $P_{30HOMe}^{1MesAgRu}$, $P_{30HSi}^{1MESAgRu}$, $P_{30HSi}^{1MesKRu}$, L=PCy3, $P_{30OMeSi}^{1MesKRu}$, L=PCy3, $W_{19HSi}^{7BPdCl_2COD}$, $W_{19HSi}^{7BPdCl_2}$, $W_{19HSi}^{7Pd(OAc)_2}$, mentioned above are material according to the invention. The other materials mentioned above are intermediates. So, the invention concerns also the synthesis intermediates.

It concerns more particularly each of the mono- or bis-silylated precursors of formulas 3, 4, 5, 7 as below represented:

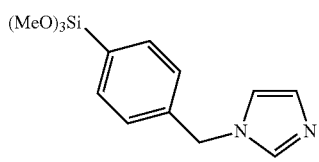

3

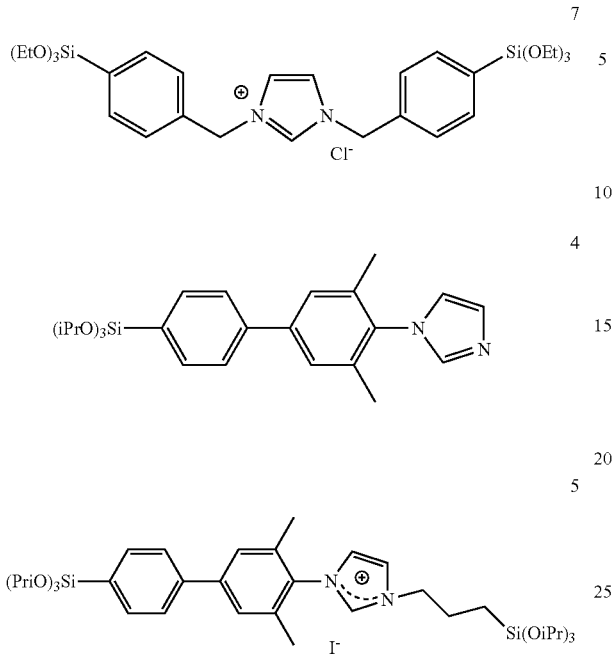

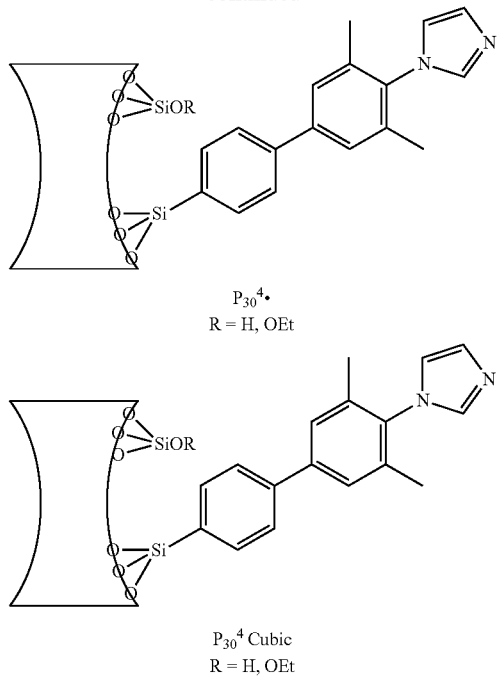

P₃₀⁴•
R = H, OEt

P₃₀⁴ Cubic
R = H, OEt
(Mesoporous organosilica with cage like pores).

It concerns more particularly each of the structured hybrid materials of formulas $P_{30}^3$, $P_{30}^{1'}$, $P_{30}^4$, $P_{30}^4$ Cubic, $W_{19}^6(55)$, $W_{19}^6(30)$, $W_{19}^7(55)$, $W_{19}^7(30)$, $W_{30}^5$ as below represented:

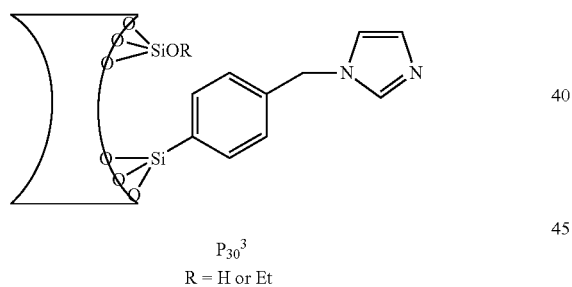

$P_{30}^3$
R = H or Et

R=H or Et means that in some binding groups $O_{1,5}$ Si(OR), some R represent H and others R represent Et

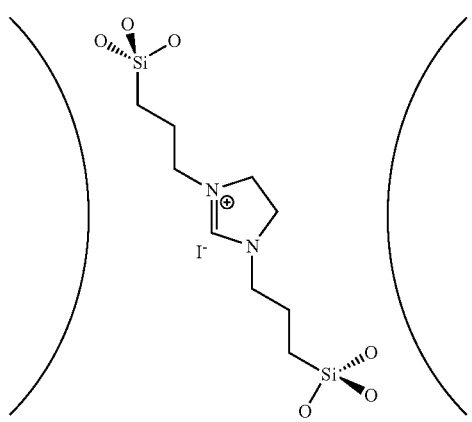

$W_{19}^6(55)$.
Procedure using 55% of surfactant,

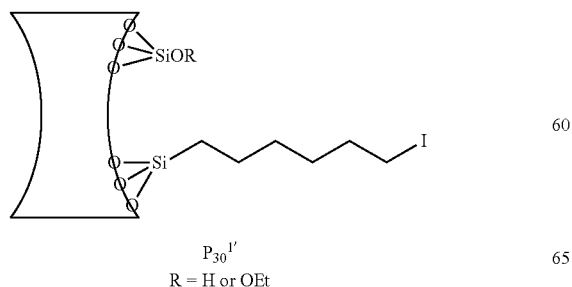

$P_{30}^{1'}$
R = H or OEt

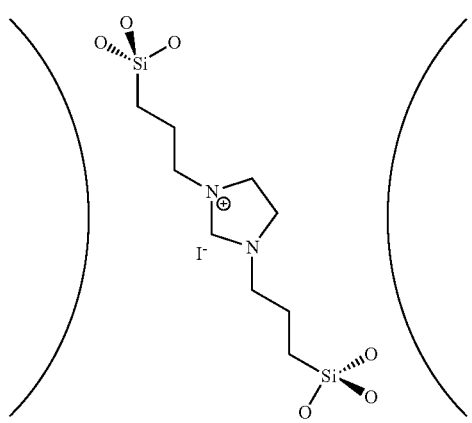

$W_{19}^6(30)$.
Procedure using 30% of surfactant.

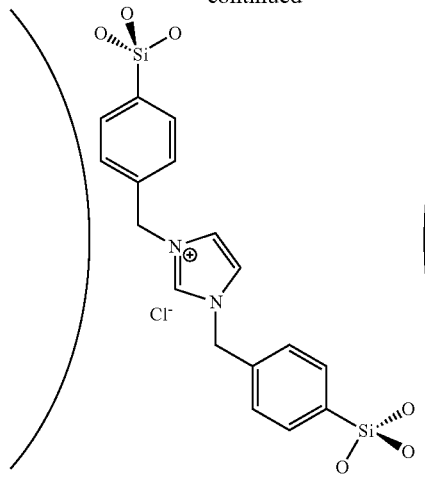

$W_{19}^7$ (55).
Procedure using 55% (wt) of surfactant.

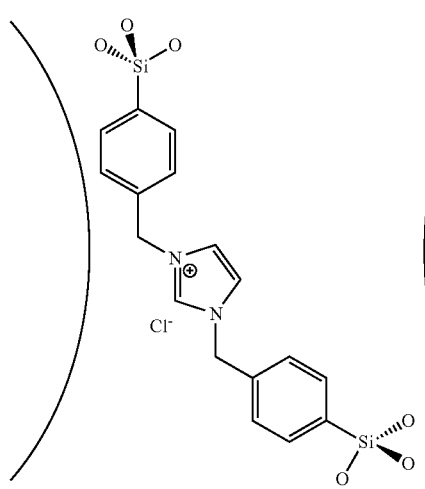

$W_{19}^7$ (30).
Procedure using 30% (wt) of surfactant

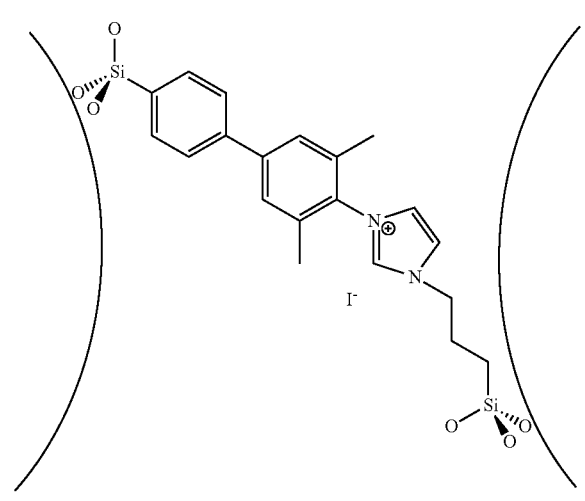

$W_{30}^5$

It concerns more particularly each of the non-structured hybrid materials of formulas $W_0^8$, $W_0^9$ as below represented:

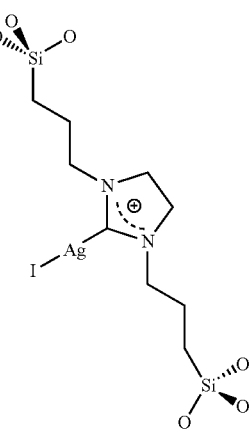

$W_0^8$ $W_0^9$

The invention concerns also the use of the materials of the invention in a broad range of synthesis processes (catalytic reaction processes) like metathesis, coupling reactions, oxidation, polymerization, hydroformylation, C—H activation and hydrogenation and the corresponding synthesis processes.

In an embodiment the invention concerns a synthesis process comprising at least a step where one or more reactants are contacted with the material of the invention.

The invention also concerns the use of the material of the invention as a heterogeneous catalyst in a chemical reaction process.

The invention further concerns a metathesis reaction process comprising contacting one or more reactant with the material of the invention, wherein the metal M is selected from the group consisting of ruthenium Ru, molybdenum Mo, tungsten W or rhenium Re.

The invention further concerns the use of a material wherein the metal M is selected from the group consisting of ruthenium Ru, molybdenum Mo, tungsten W or rhenium Re as a heterogeneous catalyst in a metathesis reaction process.

The term "metathesis" is well known in the art and refers to a "metal-catalyzed redistribution of carbon-carbon double bonds".

In its simplest concept, one or more reactant olefins are converted through carbon-carbon double bond scission and reforming to produce at least one product olefin that is structurally distinct from the reactant olefin(s). Metathesis processes are organized into several useful classifications, most notably, self-metathesis, cross metathesis ("CM" or "XMET"), ring-closing metathesis ("RCM"), ring-opening metathesis ("ROM"), ring-opening metathesis polymerization ("ROMP"), and acyclic diene metathesis polymerization ("ADMET").

A wide variety of metathesis processes are known with applications in the pharmaceutical industry, fine chemical synthesis, and the synthesis of polymers.

The invention further concerns a coupling reaction process comprising contacting one or more reactant with the material of the invention wherein the metal M is selected from the group consisting of iron Fe, copper Cu, nickel Ni, palladium Pd or gold Au.

The invention further concerns the use of the material of the invention wherein the metal M is selected from the group consisting of iron Fe, copper Cu, nickel Ni, palladium Pd or gold Au as a heterogeneous catalyst in a coupling C—C reaction process Coupling reactions correspond to well-known reactions, which involve the formation of a C—C bond in an organic substrate (R—R') starting from two reagents, one having an activated bond (R—X, X=Cl, Br, I, OR) and the other one being an organometallic partner (R'MX, M=Li, Mg, Zn, B, Al, Zr ... ) in the presence of a catalyst, typically based on late metals. This type of reaction has been recently extended to the efficient formation of C—N and C—O bond.

The invention further concerns an oxidation process comprising contacting one or more reactant with the material of the invention wherein the metal M is selected from the group consisting of vanadium V, chromium Cr, molybdenum Mo, tungsten W, rhenium Re, iron Fe, ruthenium Ru, osmium Os, platinum Pt or gold Au.

The invention further concerns the use of the material of the invention wherein the metal M is selected from the group consisting of vanadium V, chromium Cr, molybdenum Mo, tungsten W, rhenium Re, iron Fe, ruthenium Ru, osmium Os, platinum Pt or gold Au as a heterogeneous catalyst in an oxidation reaction process Oxidation corresponds to a large class of reactions. For instance, alkenes and alcohols can be transformed respectively into epoxides and ketones, which correspond to important chemical processes. These reactions are performed in the presence of metal catalysts in the presence of an oxidant such as air, $H_2O_2$, other peroxide reagents (ROOH, $R_3NO$) or in the case of ketones by alcohol.

The invention further concerns a polymerization or oligomerization process comprising contacting one or more reactant with the material of the invention wherein the metal M is selected from the group consisting of lanthanides preferably neodymium Nd and yttrium Y, titanium Ti, zirconium Zr, hafnium Hf, chromium Cr or nickel Ni.

The invention further concerns the use of the material of the invention wherein the metal M is selected from the group consisting of lanthanides preferably neodymium Nd and yttrium Y, titanium Ti, zirconium Zr, hafnium Hf, chromium Cr or nickel Ni as a heterogeneous catalyst in a polymerization or oligomerization reaction process.

Starting from alkenes the oligomerization or polymerization process leads to the formation of higher alkene homologs.

The invention further concerns an hydroformylation or carbonylation process comprising contacting one or more reactant with the material of the invention wherein the metal M is selected from the group consisting of cobalt Co, rhodium Rh or iridium Ir.

The invention further concerns the use of the material of the invention wherein the metal M is selected from the group consisting of cobalt Co, rhodium Rh or iridium Ir as a heterogeneous catalyst in a hydroformylation or carbonylation reaction process.

Carbonylation is a reaction, which incorporates carbon monoxide (CO) units in the product. It can be carried out in the presence of a nucleophile such as alcohols or amines to yield the corresponding ester and amides. It can also be performed in the presence of $H_2$ (hydroformylation), which allows one hydrogen and one formyl unit to be incorporated in the product, e.g. an alkene provides a saturated aldehyde.

The invention further concerns an alkane conversion process comprising contacting one or more of the reactant with the material of the invention wherein the metal M is selected from the group consisting of Iridium Ir.

The invention further concerns the use of material of the invention wherein the metal M is selected from the group consisting of Iridium Ir as a heterogeneous catalyst in alkane conversion process.

Alkane conversion processes allow alkane to be functionalized or transformed and involve the activation of a C—H bonds followed by a subsequent reaction. For instance, H/D exchange reaction allows deuterium to be incorporated into substrates, alkane hydrogenolysis to decrease the molecular weight of alkanes by reaction with $H_2$ and alkane metathesis to disproportionate alkanes into their lower and higher homologues.

The invention further concerns an hydrogenation and hydrosilylation process comprising contacting one or more of the reactant with the material of the invention wherein the metal M is selected from the group consisting of titanium Ti, ruthenium Ru, rhodium Rh or Iridium Ir.

The invention further concerns the use of the material of the invention wherein the metal M is selected from the group consisting of titanium Ti, ruthenium Ru, rhodium Rh or Iridium Ir as heterogeneous catalyst in a hydrogenation reaction process.

Hydrogenation is well-known and typically involves the addition of $H_2$ to reagents having at least one unsaturation (alkenes, alkynes, imines and ketones for instance). By extension, hydrosilylation corresponds to the addition of silane reagents ($H_xSiX_{4-x}$) to these unsaturated reagents, yielding the silylated reagents.

All the schemes and the formulas are only illustrative and represent a simplified (and an ideal) representation of the materials.

EXAMPLES PART I

Mono- or Bis-Silylated Precursors

General Procedure.

3-chloropropyltriethoxysilane, para-chloromethylphenyltrimethoxysilane and 3-triethoxysilylpropyl-4,5-dihydrogenoimidazole were purchased form Aldrich and used as received. Silver (I) oxide was purchased from Strem, and used as received. All solvents were further purified by distillation and kept over molecular sieves prior to use: THF over Na-benzophenone ketyl, Toluene over Na. All reactions were performed under argon atmosphere using Schlenk techniques. [RuCl$_2$(p-cymene)]$_2$ and 3-iodopropyltriethoxysilane were prepared as previously reported (M. A. Bennett, A. K. Smith, *J. C. S. Dalton Trans.* 1974, 233-241; B. L. Booth, G. C. Ofunne, C. Stacey, P. J. T. Tait, *J. Organomet. Chem.* 1986, 315, 143-156). Liquid NMR spectra were recorded on a Bruker Avance 300 MHz (standard QNP probe) spectrometer using the peaks of residual solvents as internal references.

3-iodopropyltriethoxysilane will be quoted as precursor 1
6-iodohexyltriethoxysilane will be quoted as precursor 1'
para-chloromethylphenyltrimethoxysilane will be quoted as precursor 2

Synthesis of Compound 3.

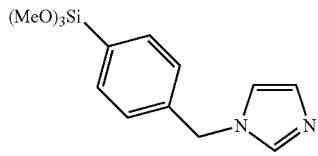

The precursor 3 was prepared by contacting, under Argon atmosphere, 3.7 g of para-chloromethylphenyltrimethoxysilane (15 mmol), 2.7 g of Sodium imidazolide (15 mmol) and 60 mL of THF. The reaction mixture was put under reflux for 48 h under Ar and the THF was further removed under vacuum ($10^{-2}$ mbar). The brown residue was treated three times with 15 mL de $CH_2Cl_2$ and the supernatant was recovered by filtration. $CH_2Cl_2$ was evaporated under vacuum and 3.7 g of 3 were obtained as a brown oil (Yield=88%).

Analytical Data.

$^1$H NMR ($\delta$, 200 MHz, CDCl$_3$): 3.8, 5.6 (2H, s), 7.2 (1H, d), 7.5 (1H, d), 7.7 (2H, d), 11.3 (H, s).

$^{13}$C NMR ($\delta$, 50 MHz, CDCl$_3$): 25.2, 53, 121, 122, 127.8, 134.8, 135.8, 139.

Synthesis of Compound 4.

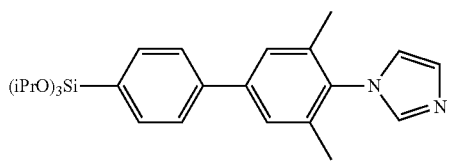

The compound 4 was prepared according to the Scheme 1.

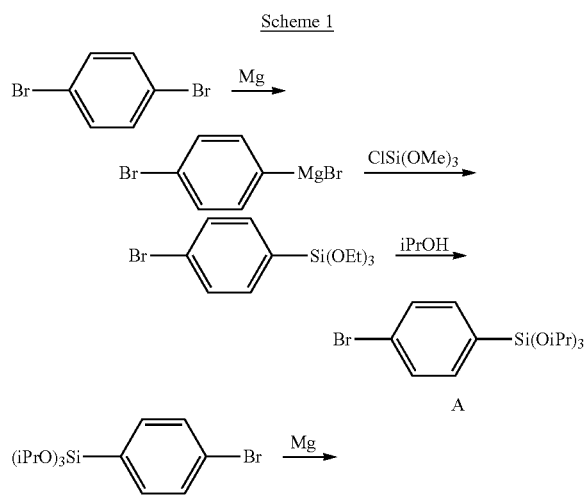

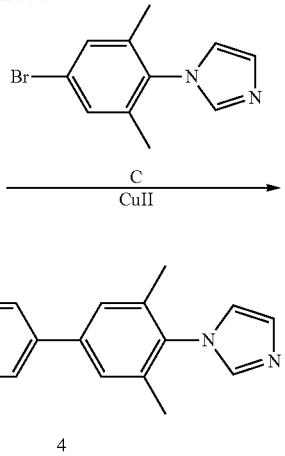

The Grignard reagent B was prepared as previously described (*J. Mater. Chem.*, 1998, 8, 1749) starting from 17 g (4.7 mmol, 2 equiv.) of A in THF solution (80 mL), 1.37 g of Mg (56.3 mmol, 2.35 equiv.). The Grignard reagent was filtered under argon atmosphere and added dropwise to a THF solution (110 mL) containing 6.02 g (24 mmol, 1 equiv.) of C, (*Synthesis*, 2003, 17, 2661) 500 mg (4 mmol) of freshly dry NiCl$_2$. The reaction mixture was stirred at room temperature for 24 h. After evaporation of the solvent, the resulting product was purified by chromatography on silica gel using iPrOH/CH$_2$Cl$_2$ (1/25) as the eluant to give 4 in 80% yield.

Analytical Data.

$^1$H NMR ($\delta$, 200 MHz, CDCl$_3$): 1.28 (18H, $^3J_{HH}$=4.3 Hz, d), 2.12 (6H, s), 4.33 (3H, $^3J_{HH}$=6.1 Hz, sept), 6.97 (1H, s), 7.29 (1H, $^3J_{HH}$=4 Hz, d), 7.40 (2H, s), 7.53 (1H, $^3J_{HH}$=1 Hz, d), 7.60 (2H, $^3J_{HH}$=8.2 Hz, d), 7.79 (2H, $^3J_{HH}$=8.1 Hz, d).

$^{13}$C NMR ($\delta$, 50 MHz, CDCl$_3$): 17.6, 25.5, 65.5, 120.0, 126.4, 127.2, 129.5, 132.41, 135.2, 135.5, 136.1, 137.3, 141.4, 141.9.

$^{29}$Si NMR ($\delta$, 40 MHz, CDCl$_3$): −61.91 ppm.

SM (FAB+, NBA): m/z=453 [M+H$^+$]$^+$ (100%).

Elemental analyses: calcd. for C$_{26}$H$_{36}$N$_2$O$_3$Si: C, 69.03, H, 7.96, N, 6.19, Si, 6.19. found: C, 69.78, H, 7.89, N, 6.08, Si, 6.24(%).

Synthesis of Compound 5.

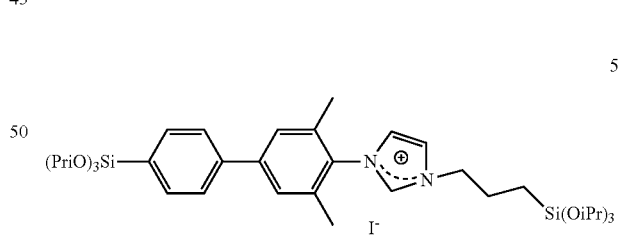

1.92 g (4.25 mmol, 1 equiv.) of 4 was added to 1.59 g (4.25 mmol, 1 equiv.) of 3-iodopropyltriisopropoxysilane in 35 mL of toluene (*J. Mater. Chem.* 2005, 15, 803). After solubilisation, the mixture was heated under reflux with stirring 72 h to give 5 in 95% yield.

Analytical Data.

$^1$H NMR ($\delta$, 200 MHz, CDCl$_3$): 0.64 (2H, m), 1.20 (18H, $^3J_{HH}$=6.0 Hz, d), 1.25 (18H, $^3J_{HH}$=6.0 Hz, d), 2.14 (2H, m), 2.22 (6H, s), 4.23 (3H, $^3J_{HH}$=6.0 Hz, sept), 4.31 (3H, $^3J_{HH}$=6.0 Hz, sept), 4.76 (2H, $^3J_{HH}$=7.0 Hz, t), 7.35 (1H, dd, 2 Hz, 2 Hz), 7.42 (2H, s), 7.56 (2H, $^3J_{HH}$=8.0 Hz, d), 7.78 (2H, $^3J_{HH}$=8.0 Hz, d), 7.83 (1H, $^3J_{HH}$=2.0 Hz, t), 10.10 (1H, s).

$^{13}$C NMR (δ, 50 MHz, CDCl$_3$): 8.9, 18.6, 21.8, 25.9, 26.0, 52.8, 65.5, 65.9, 123.6, 123.8, 126.9, 128.6, 129.4, 132.6, 133.5, 135.4, 135.9, 137.8, 141.0, 144.5.

SM (FAB+, NBA): m/z=699 (50%).

Elemental analyses: calcd. for C$_{38}$H$_{63}$N$_2$O$_6$Si$_2$I: C, 55.21, H, 7.63, N, 3.39, Si, 6.78, I, 15.38. found: C, 55.52, H, 7.92, N, 3.19, Si, 6.38, I, 14.99(%).

Synthesis of Compound 6.

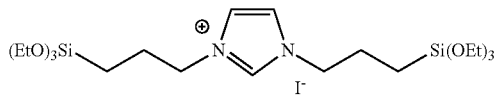

6

A dried schlenk tube under argon was charged with 12.1 g (30 mmol) of 3-iodopropyltriethoxysilane, 14.6 g (30 mmol) of 3-triethoxysilylpropyl-4,5-dihydroimidazole and 30 mL of acetonitrile. A dried condenser with an oil bubbler was adapted, and the reaction mixture was heated under reflux for 48 h. The solvent was removed under vacuum to give 15.9 g of 6 obtained as an orange oil (90%).

Analytical Data.

$^1$H NMR (300 MHz, CD$_2$Cl$_2$, 25° C.) δ: 0.6 (t, $^3$J=8.3 Hz, 4H), 1.3 (t, $^3$J=6.9 Hz, 18H), 1.5-1.9 (ma, 4H), 3.7 (t, $^3$J=7.1 Hz, 4H), 3.8 (q, $^3$J=6.9 Hz, 6H), 3.9 (s, 2H), 8.9 (s, 1H).

$^{13}$C NMR (75 MHz, CD$_2$Cl$_2$): 7.2, 18.2, 21.1, 48.4, 50.5, 58.5, 157.6 ppm.

Elemental analyses: calcd for C$_9$H$_{17}$IO$_4$Si$_{21}$: C, 41.5; H, 7.8; 1, 20.9; N, 4.6; Si, 9.2. found: C, 44.6; H, 7.9; I, 21.1; N, 5.1; Si, 9.1(%).

Synthesis of Compound 7.

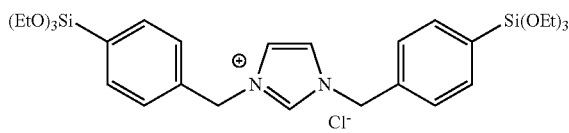

7

In the first step, 7.4 g (30 mmol) of 2 were added to a mixture of 7.0 g (30 mmol) of sodium imidazolide and 60 mL of tetrahydrofuran under Argon. The mixture was heated under reflux with magnetic stirring for 48 h. The mixture was filtered and the sodium imidazolide residual was extracted with dichloromethane (40 mL). The solvent was removed under vacuum and 7.4 g of dark brown oil was obtained (yield 88%). In the second step, 7.3 g (26.4 mmol) of this previously prepared of N,N-3-(trimethoxysilylbenzyl)imidazole were added to a solution of 2 (6.5 g 26.4 mmol) and 60 ml of toluene. The mixture was heated for 12 h under reflux under inert atmosphere. Removal of the solvent and the residual 2 under vacuum afforded 12.4 g of 7 as a dark brown solid (90%).

Analytical Data.

$^1$H NMR (300 MHz, CD$_2$Cl$_2$, 25° C.): 3.6 (s, 9H), 5.6 (s, 2H), 7.4-7.7 (ma, 2H), 7.1-7.3 (ma, 2H), 11.3 (s, 1H).

$^{13}$C NMR (75 MHz, CD$_2$Cl$_2$): 50.8, 119.3, 126.7, 129.8, 136.3, 137.3, 138.3.

Elemental analyses: Calcd: C$_{23}$H$_{33}$ClN$_2$O$_6$Si$_2$: C, 52.6; H, 6.3; Cl, 6.8; N, 5.3; Si, 10.7. found: C, 60.65; H, 6.9; Cl, 7.0; N, 6.9; Si, 10.3(%).

Synthesis of Compound 8.

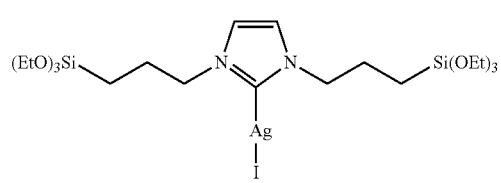

8

0.4 g of silver (I) oxide (1.72 mmol, 0.52 equiv.) was added under stirring to a mixture of 2.15 g of 6 (3.3 mmol, 1.0 equiv.) and 8 mL of methylene chloride (8 mL). The suspension was vigorously stirred at 25° C. for 2 h with exclusion of light. The excess of Ag$_2$O was filtered off, and the solution was concentrated under vacuum to give 2.21 g of 8 obtained as a dark brown oil (94%).

Analytical Data.

$^1$H NMR (300 MHz, CD$_2$Cl$_2$, 25° C.) δ: 0.59-0.75 (4H, m, CH$_2$—Si), 1.13-1.32 (18H, m, CH$_3$), 1.89-2.04 (4H, m, CH$_2$), 3.70-3.85 (12H, m, CH$_2$—O), 4.12-4.30 (4H, m, CH$_2$—N), 7.05-7.12 (2H, m, CH=CH).

$^{13}$C NMR (75.5 MHz, CD$_2$Cl$_2$, 25° C.) δ: 7.7 (CH$_2$—Si), 18.5 (CH$_3$CH$_2$O), 25.6 (CH$_2$), 58.6 (CH$_2$—N), 58.7 (CH$_2$—O), 121.2 (CH=CH), 183.1 (C—AgI).

Synthesis of Compound 9.

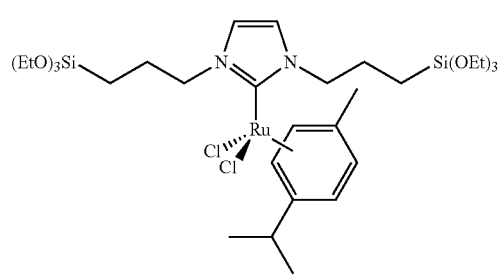

9

A dried Schlenk tube under argon was charged with [RuCl$_2$(p-cymene)]$_2$ (0.46 g, 0.75 mmol, 0.5 equiv.) and 3 mL of dichloromethane. A solution of 8 (1.07 g, 1.5 mmol, 1.0 equiv.) in 2 mL of dichloromethane was added at 25° C., and the resulting mixture was stirred at 25° C. for 2 h with exclusion of light. 5 mL of diethyl ether were added, and after decantation, the mother liquor was collected and filtered (to remove the generated silver iodide salt). This sequence was repeated four times; the fractions were combined and concentrated under vacuum to afford 1.05 g of 9 as an orange solid (90%).

Analytical Data.

$^1$H NMR (300 MHz, CD$_2$Cl$_2$, 25° C.) δ: 0.6-0.8 (4H, bs, CH$_2$—Si), 1.19-1.34 (24H, m, CH$_3$—CH$_2$O & (CH$_3$)$_2$CH), 1.72-2.00 (4H, bs, CH$_2$), 1.96 (3H, s, CH$_3$—C$_{arom}$), 2.92 (1H, sept, J$^3$=7.0 Hz, CH(CH$_3$)$_2$), 3.82 (12H, q, J$^3$=7.0 Hz, CH$_2$—O), 3.83-4.08 and 4.40-4.76 (4H, 2bs, CH$_2$—N), 5.01 (2H, d, J$^3$=6.0 Hz, CH$_{arom}$), 5.38 (2H, d, J$^3$=6.0 Hz, CH$_{arom}$), 7.13 (2H, s, CH=CH).

$^{13}$C NMR (75.5 MHz, CD$_2$Cl$_2$, 25° C.) δ: 7.8 (CH$_2$—Si), 18.5 (CH$_3$—CH$_2$O), 18.7 (CH$_3$—C$_{arom}$), 22.5 ((CH$_3$)$_2$CH), 25.7 (CH$_2$), 31.0 (CH(CH$_3$)$_2$), 53.9 (CH$_2$—N), 58.7 (CH$_2$O), 82.1 (CH$_{arom}$), 86.4 (CH$_{arom}$), 99.3 (C$_{arom}$), 108.9 (C$_{arom}$), 122.2 (CH=CH), 174.0 (C—Ru).

EXAMPLES PART II

Syntheses of Structured Hybrid Materials

General Procedure.

The surfactants P123 ($EO_{20}PO_{70}EO_{20}$) and F127 ($EO_{106}PO_{70}EO_{106}$) were obtained from BASF and used without further purification. Tetraethoxysilane (TEOS) was purchased from Aldrich and purified by distillation over Mg. The Grubbs I complex was bought from Strem. Solid state NMR spectra were recorded on a Bruker Avance 300 MHz and 500 MHz spectrometers, with repetition time of 2 s and contact time of 5 ms, and sample was spinning at 10 kHz. Chemical shifts δ are given in ppm from TMS as an external reference. $T^n$ and $Q^n$ notations are given for $((SiO)_n(R)SiO_{3-n})$ and $((SiO)_nSiO_{4-n})$ environments, respectively. Elemental analyses were performed by the Service Central d'Analyses of the CNRS (Vernaison, France). Porosity was determined by $N_2$ adsorption/desorption at 77K, surface area was determined by B.E.T. equation (Brunauer Emmett Teller), mean pores diameters were calculated using B.J.H. equation (Barrett-Joyner-Halenda).

Nomenclature:

All the materials presented below will be quoted using letters and figures:

For materials containing organic fragments in the pores, they will be quoted by the letter P with the number referring to the silylated organic precursor introduced within the material in exponent and the number referring to the expected dilution of the organic precursor in the material (i.e. the ratio of dilutant/the silylated precursor) in index leading to $P_y^x$.

N.B: When no dilutant is introduced the figure y in index is 0.

As an example, $P_{30}^1$ corresponds to the hybrid material functionalized in the pores and obtained using the precursor 1 (3-chloropropyltrimethoxysilane) and 30 equivalents of dilutant (T. E. O. S)

The same nomenclature will be used for materials being functionalized in the walls with the letter W: As an example, $W_{19}^6$ corresponds to the hybrid material functionalized in the walls and obtained using the precursor 6 and 19 equivalents of dilutant (T.E.O.S)

When in-situ reactions are achieved in the materials, letters and figures will be added to the above-mentioned symbols $P_y^x$ and $W_y^x$:

in exponent when these reactions concern the organic fragments contained in the material:
1) When the organic fragment contained in a material will be transformed into an imidazolium unit with a part of the silylated precursor X as a first substituent and one mesityl group or one methyl group as the second substituent, the letter Mes or Me will be added in exponent to $P_y^x$ leading to $P_y^{xMes}$ or $P_y^{xMe}$
2) When the metal will be loaded into the imidazolium containing material, the base or the silver complex used will be quoted in exponent by K (for KHMDS), by B (for BEMP) and by Ag (for the silver complex) and the chemical symbol of the loaded metal will also be added in exponent (Ru for Ruthenium, Ir for Iridium, Pd for Palladium—Concerning Palladium, as several precursors have be loaded onto the materials, they are mentioned in exponent: PdOAc, $PdCl_2$ and $PdCl_2COD$). For example, a material containing mesityl substituted imidazolium units loaded with ruthenium via the use of KHMDS as the deprotonating agent will be quoted as $P_y^{xMesKRu}$ in index, when these reactions concern the inorganic surface of the material:
1) When the material has been treated with aqueous acidic solutions ($HCl/H_2O$ or $HI/H_2O$) so as to transform surface Si—OR groups (R=Me or Et) in Si—OH groups the letter H will be added in index leading to $P_{yH}^x$ as an example.
2) When the material has been treated with a silylated agent such as hexamethyldisilazane or bromotrimethylsilane so as to transform Si—OH groups into siloxy Si—$OSiMe_3$ groups the letters Si will be added in index leading to $P_{yHSi}^x$ as an example.
3) When the material has been treated with methanol to transform the Si—OR groups and Si—OH groups into SiOMe group the letters OMe will be added in index leading to $P_{yOMe}^x$ as an example.

Synthesis of the Iodopropyl-Functionnalised Material $P_{19}^1$ (r=19).

Representative procedure (J. Alauzun, A. Mehdi, C. Reyé, R. J. P. Corriu, *New J. Chem.*, 31, 911-915 (2007)).

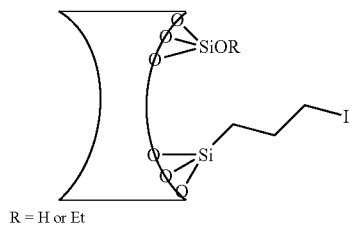

R = H or Et

A mixture of 4.0 g of P123 in aqueous HI solution (160 mL, pH≈1.5) was added to a mixture of TEOS (8.85 g, 42.56 mmol) and 3-iodopropyltriethoxysilane (0.74 g, 2.24 mmol) at ambient temperature. The mixture was stirred for 90 min giving rise to a micro-emulsion. After heating this perfectly transparent solution at 60° C., a small amount of NaF (80 mg) was added under stirring (molar composition of the reaction mixture: 0.04 $F^-$:1 TEOS: 0.05 of 3-iodopropyltriethoxysilane: 0.02 P123:0.12 HI: 220 $H_2O$. The mixture was left at 60° C. under stirring for 72 h. The resulting solid was filtered and washed with acetone. The surfactant was removed by an extraction with ethanol using a Soxhlet during 24 h. After filtration and drying at 120° C. under vacuum, 2.75 g (90%) of $P_{19}^1$ were obtained as a white solid.

Analytical Data.

Powder X-ray diffraction. The pattern exhibits an intense diffraction peak (d=97 Å and a=112 Å) (FIG. 1).

Transmission Electron Microscopy (TEM). The micrograph shown in FIG. 2 confirms that the material exhibits a local hexagonal symmetry.

Figure 3:
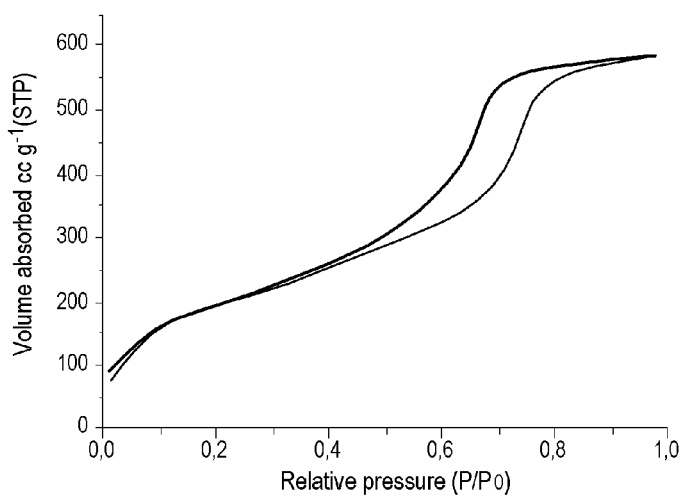
FIG. 3 is an N2 adsorption-desorption isotherm of Iodopropyl-functionalised material $P_{19}^1$ of FIG. 1 according to an embodiment of the present disclosure.

The $N_2$ adsorption-desorption experiment. Isotherm of type IV, characteristic of mesoporous materials with a narrow pore size distribution (FIG. 3). $S_{BET}$:900 $m^2/g$, Vp=1.0 $cm^3/g$ and $Dp_{BHJ}$=5.8 nm.

$^{13}C$ CP-MAS solid state NMR: 27.1 ($CH_2$—I), 16.4 ($CH_2$—$CH_2$—$CH_2$) and 8.1 ppm ($CH_2$—Si). $^{29}Si$ CP-MAS NMR: −65.5 ($T^3$), −92.2 ($Q^2$), −101.0 ($Q^3$) and −110.1 ($Q^4$).

The XRD diffraction of $P_{19}^1$ is represented in FIG. 1.

Figure 2:
FIG. 2 is a Transmission Electron Microscopy (TEM) micrograph of the Iodopropyl-functionalised material $P_1^{19}$ of FIG. 1 according to an embodiment of the present disclosure.

The TEM micrograph of $P_{19}^1$. Scale bar=100 nm is represented in FIG. 2.

The Nitrogen adsorption-desorption isotherm of $P_{19}^1$ is represented in FIG. 3.

Synthesis of the Iodopropyl-Functionalised Material $P_{30}^1$.

A mixture of 4.0 g of P123 in aqueous HI solution (160 mL, pH≈1.5) was added to a mixture of TEOS (8.85 g, 42.56 mmol) and 3-iodopropyltriethoxysilane (0.59 g, 1.33 mmol) at ambient temperature. The mixture was stirred for 90 min giving rise to a micro-emulsion. After heating this perfectly transparent solution at 60° C., a small amount of NaF (79 mg, 1.88 mmol) was added under stirring (molar composition of the reaction mixture: 0.04 F$^-$:1 TEOS: 0.031 of 3-iodopropyltriethoxysilane: 0.02: P123:0.12 HI: 220 H$_2$O. The mixture was left at 60° C. under stirring for 72 h. The resulting solid was filtered and washed with acetone. The surfactant was removed by an extraction with ethanol using a Soxhlet during 24 h. After filtration and drying at 120° C. under vacuum, 2.75 g (90%) of $P_{30}^1$ were obtained as a white solid.

Analytical Data.

Powder X-ray diffraction. The pattern exhibits an intense diffraction peak (d=102 Å and a a=118 Å).

Transmission Electron Microscopy (TEM). The micrograph confirms that the material exhibits a local hexagonal symmetry.

The N$_2$ adsorption-desorption experiment. Isotherm of type IV, characteristic of mesoporous materials with a narrow pore size distribution. $S_{BET}$:811 m$^2$/g, Vp=0.77 cm$^3$/g and $Dp_{BJH}$=6.2 nm.

$^{13}$C CP-MAS solid state NMR: 8.1, 16.4 and 27.1 ppm.

$^{29}$Si CP-MAS NMR: −65.5 (T$^3$), −92.2 (Q$^2$), −101.0 (Q$^3$) and −110.1 (Q$^4$).

Synthesis of the Chlorobenzyl-Functionnalised Material $P_{30}^2$.

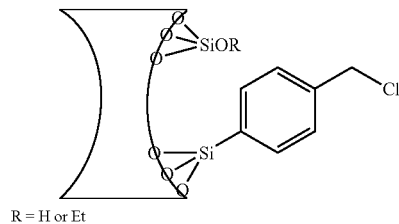

R = H or Et

A mixture of 4.21 g of P123 dissolved in an aqueous HCl solution (168 mL, pH≈1.5) was added on a mixture of TEOS (9.47 g, 45.51 mmol) and para-chlorobenzyltriethoxysilane (0.37 g, 1.51 mmol) at room temperature. The reaction mixture was stirred for 90 min giving rise to a micro-emulsion (transparent mixture). To the reaction mixture heated at 45° C., a small amount of NaF (79 mg, 1.88 mmol) was added under stirring (mixture composition: 0.04 F$^-$:1 TEOS: 0.033 of chlorobenzyltriethoxysilane: 0.016 P123:0.12 HCl: 220 H$_2$O). The mixture was left at 45° C. under stirring for 72 h. The resulting solid was filtered and washed with acetone. The surfactant was removed by an extraction with ethanol using a Soxhlet during 24 h.

After filtration and drying at 135° C. under vacuum, 2.93 g of $P_{30}^2$ were obtained as a white solid (98%).

Analytical Data.

$^{13}$C CP-MAS solid state NMR: δ=15.9, 43.8, 59.5, 127, 130, 134, 140 ppm.

$^{29}$Si CP-MAS solid state NMR: −79 (T$^3$), −91.2 (Q$^2$), −101 (Q$^3$) and −110.5 (Q$^4$)

Elemental analyses: C, 6.07; Si, 37.71; Cl, 1.3.(%).

Powder X-ray diffraction (FIG. 4): The pattern exhibits an intense diffraction peak (d=105 Å and a=121 Å)

Transmission Electron Microscopy (FIG. 5): the micrographs are consistent with a material exhibiting local hexagonal symmetry.

Figure 6:
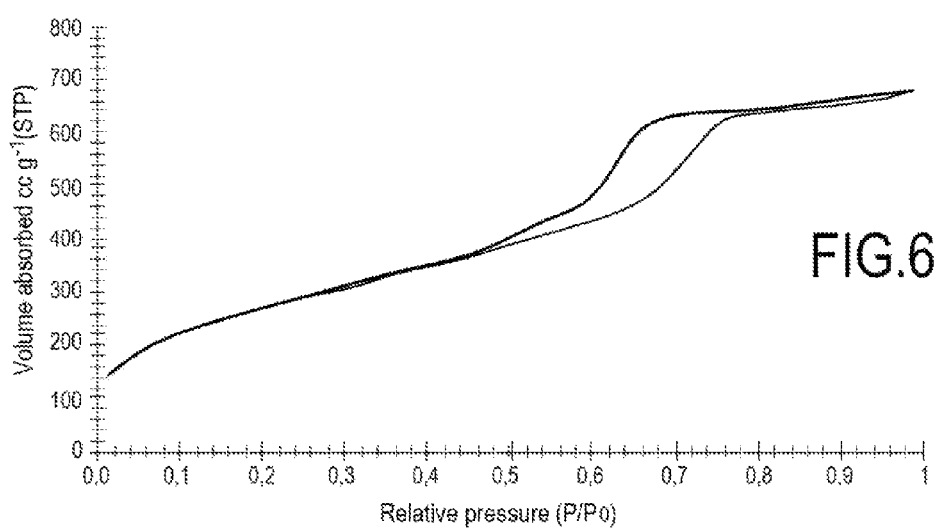
FIG. 6 is an N2 adsorption-desorption experiment Isotherm of type IV of the Chlorobenzyl-functionalised material $P_{30}^2$ of FIG. 4 according to another embodiment of the present disclosure.

The N$_2$ adsorption-desorption experiment (FIG. 6). Isotherm of type IV, characteristic of mesoporous materials with a narrow pore size distribution $S_{BET}$:956 m$^2$/g, Vp: 0.8-1.0 cm$^3$/g and $Dp_{BJH}$:5.2 nm.

Figure 4:
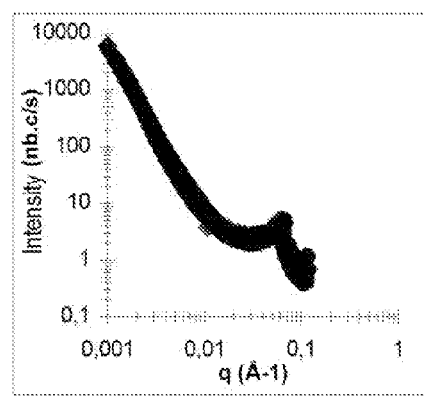
FIG. 4 is a powder X-ray diffraction of Chlorobenzyl-functionalised material $P_{30}^2$ according to another embodiment of the present disclosure.

The XRD pattern of $P_{30}^2$ is represented in FIG. 4.

Figure 5:
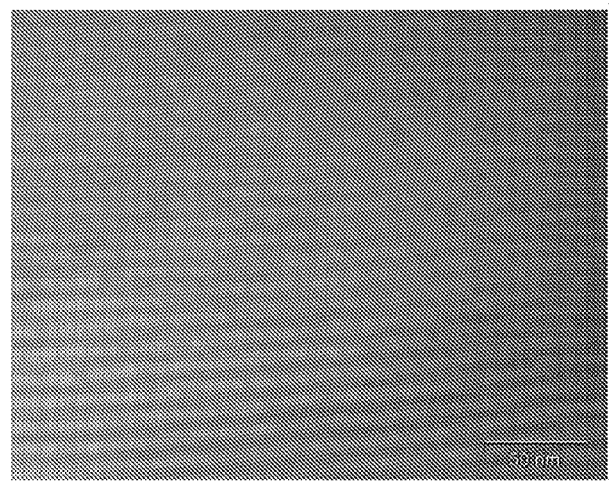
FIG. 5 is a TEM micrograph of the Chlorobenzyl-functionalised material $P_{30}^2$ of FIG. 4 according to another embodiment of the present disclosure.

The TEM micrograph of $P_{30}^2$. Scale bar=100 nm is represented in FIG. 5.

The Nitrogen adsorption-desorption isotherm of $P_{30}^2$ is represented in FIG. 6.

Synthesis of Material $P_{30}^3$.

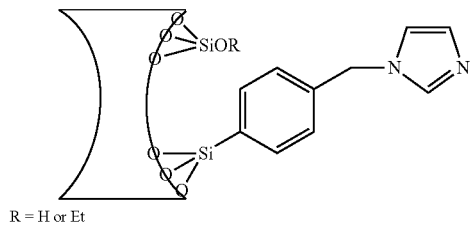

R = H or Et

In a 100 mL erlenmeyer, 1.02 g (2.85 mmol) of monohydrate hexadecylpyridiniumchloride was added to an aqueous ammoniac solution (prepared from 28.9 g of 25% NH$_4$OH and 26.6 g of H$_2$O). The reaction mixture was vigorously stirred until a transparent solution was obtained, to which was then rapidly added a mixture of TEOS (4.464 g, 21.43 mmol) and the precursor 3 (0.192 g, 0.70 mmol). The reaction mixture was then heated to 80° C., under stirring for 48 h. Finally the powder obtained was washed with H$_2$O, ethanol, acetone then diethyl ether. The surfactant was removed by three washings with ethanolic solution of HCl (3 g of HCl 37%) and ethanol (200 mL) for 2 h. The material was washed with water, ethanol, acetone, diethyl ether, and then dried by heating at 135° C. under high vacuum (10$^{-5}$ mbar) for 12 h to give 1.28 g of $P_{30}^3$.

Analytical Data.

$^1$H solid state NMR (500 MHz): 1.0, 1.8, 3.96, 7.6, 8.4, 9.3, 14.3 ppm.

Figure 7:
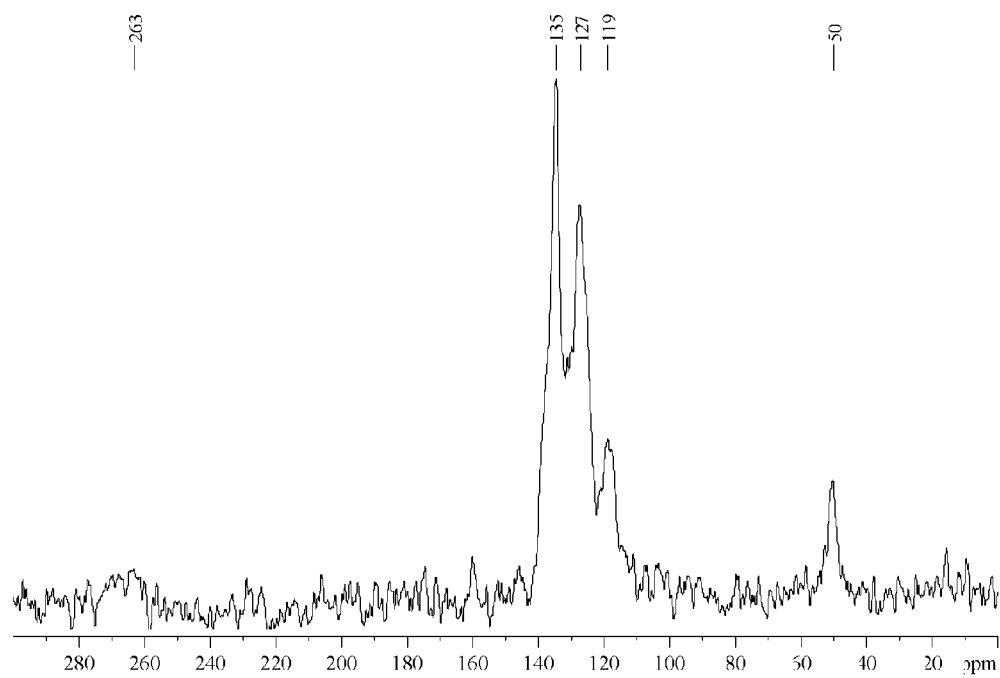
FIG. 7 is a $^{13}C$ NMR spectrograph of material $P_{30}^3$ according to another embodiment of the present disclosure.

$^{13}$C{1H} NMR (125.7 MHz): 45, 119, 127, 135 ppm (FIG. 7).

Figure 8:
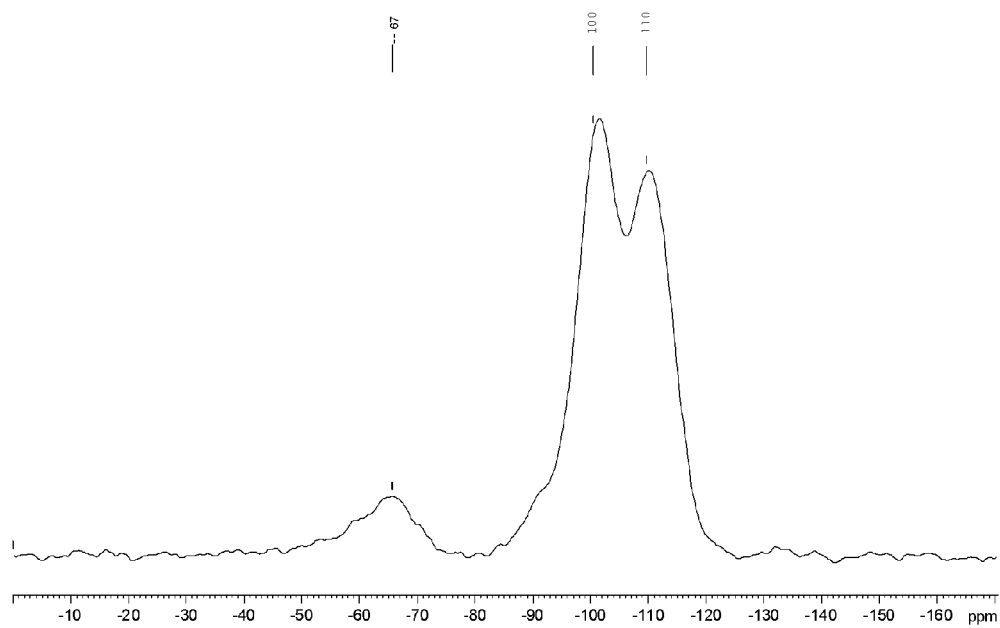
FIG. 8 is a $^{29}Si$ solid state NMR spectrograph of the Chlorobenzyl-functionalised material $P_{30}^3$ of FIG. 7 according to another embodiment of the present disclosure.

$^{29}$Si solid state NMR (CP MAS): −XX (T3), −102 (Q3) and −111 (Q4) (FIG. 8).

Elemental analyses: C, 5.6; N, 1.2; Si, 40.5(%).

Figure 9:
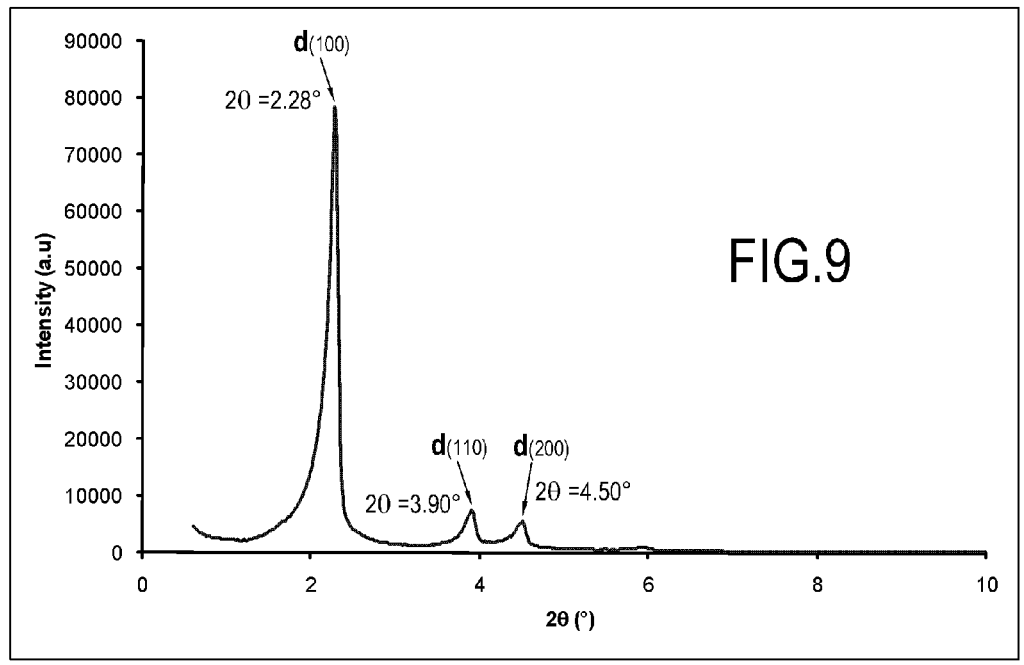
FIG. 9 is an X-ray diffraction spectrograph of the material $P_{30}^3$ of FIG. 7 according to another embodiment of the present disclosure.

X ray diffraction: The pattern exhibits an intense diffraction peak and 2 broad and weak signals in accordance with a 2D hexagonal structure (d=39 Å and a=45 Å) (FIG. 9).

Transmission Electron Microscopy (FIG. 10): the micrographs confirms that the material exhibits a local hexagonal symmetry.

The N$^2$ adsorption-desorption experiment (FIG. 11): $S_{BET}$: 933 m$^2$/g; Vp: 0.8 cm$^3$/g; $Dp_{BJH}$:34 Å.

The $^{13}$C solid state CP MAS NMR spectrum of the material $P_{30}^3$ is represented in FIG. 7.

The $^{29}$Si solid state CPMAS NMR spectrum of the material $P_{30}^3$ is represented in FIG. 8.

The Small angle X ray diffraction pattern of material $P_{30}^3$ is represented in FIG. 9.

Figure 10:
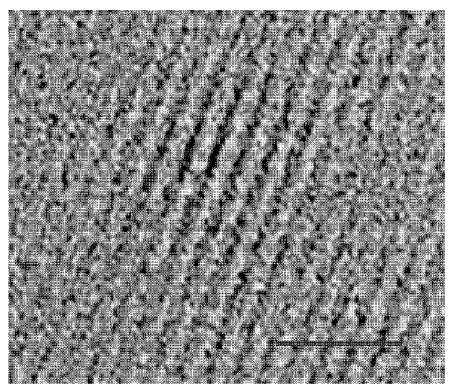
FIG. 10 is a TEM of the material $P_{30}^3$ of FIG. 7 according to another embodiment of the present disclosure.
Figure 10:
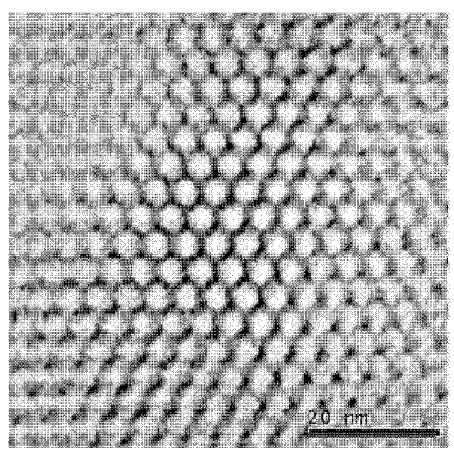

The TEM micrographs of material $P_{30}^3$-scale bar=20 nm are represented in FIG. 10.

Figure 11:
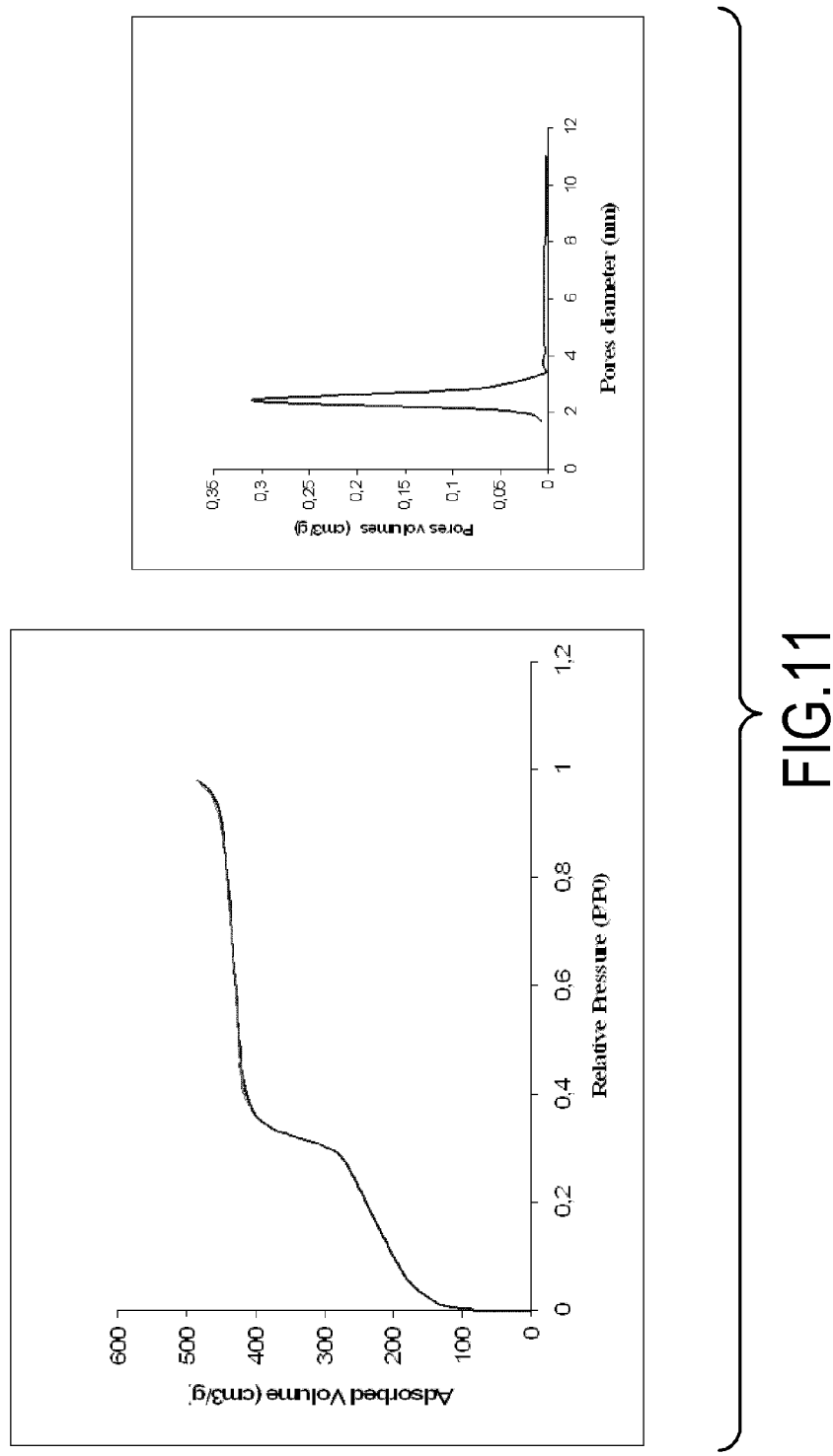
FIG. 11 is an N2 adsorption-desorption experiment and a pores diameter distribution of the material $P_{30}^3$ of FIG. 7 according to another embodiment of the present disclosure.

The Isotherm of $N_2$ adsorption/desorption at 77K; and the pores diameter distribution (calculated from BJH method) for material $P_{30}^{3}$ are represented in FIG. 11.

Synthesis of the Iodohexyl-Functionnalised Material $P_{30}^{1'}$.

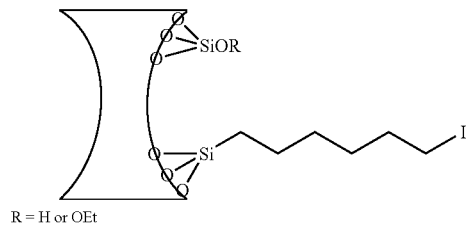

R = H or OEt

This material was prepared using the experimental procedure described for the preparation of $P_{30}^{1}$: aqueous solution of HI (435 mL), 1.47 g of 6-iodohexyltriethoxysilane, 24.25 g of TEOS and 10.78 g of P123.

Analytical Data.

Transmission Electron Microscopy (TEM). The micrograph confirms that the material exhibits a local hexagonal symmetry.

The $N_2$ adsorption-desorption experiment. Isotherm of type IV, characteristic of mesoporous materials with a narrow pore size distribution: $S_{BET}$:850 m²/g, Vp: 0.9 cm³/g and $Dp_{BJH}$:5.1 nm $^{13}C$ CP-MAS solid state NMR: 8, 16 and 27 ppm.

$^{29}Si$ CP-MAS NMR: −65.5 ($T^3$), −92.2 ($Q^2$), −101.0 ($Q^3$) and −110.1 ($Q^4$).

Synthesis of the Imidazole Functionalized Hybrid Material $P_{30}^{4}$.

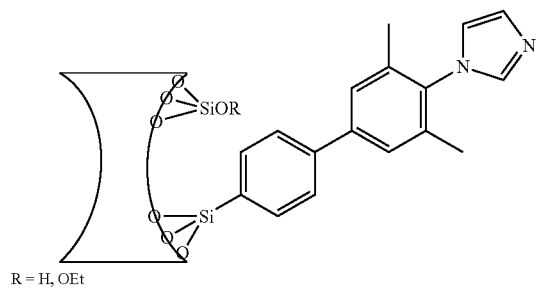

R = H, OEt

This compound was prepared using the experimental procedure described for the preparation of $P_{30}^{2}$: TEOS 6.07 g (29.2 mmol), 4 0.440 g (0.97 mmol), P123 2.70 g, H₂O (pH 1.5) 109 mL, NaF (15 mg).

Analytical Data.

Elemental analyses: C, 7.91; N, 1.02; Si, 40.0(%).

X-ray diffraction: the pattern of this material exhibits three reflexions in the low angle region indicating a high degree of mesostructural order (FIG. 12b). These reflections can be indexed as (100), (110) and (200) in accordance with a 2D hexagonal structure.

Transmission electron microscopy (TEM): image confirms this structure.

$N_2$ adsorption-desorption experiment (FIG. 12a): type IV isotherm, characteristic of mesoporous materials with a narrow pore size distribution. $S_{BET}$:563 m²g⁻¹; Vp 1.28 cm³g⁻¹; $Dp_{BJH}$:7.6 nm.

Figure 12:
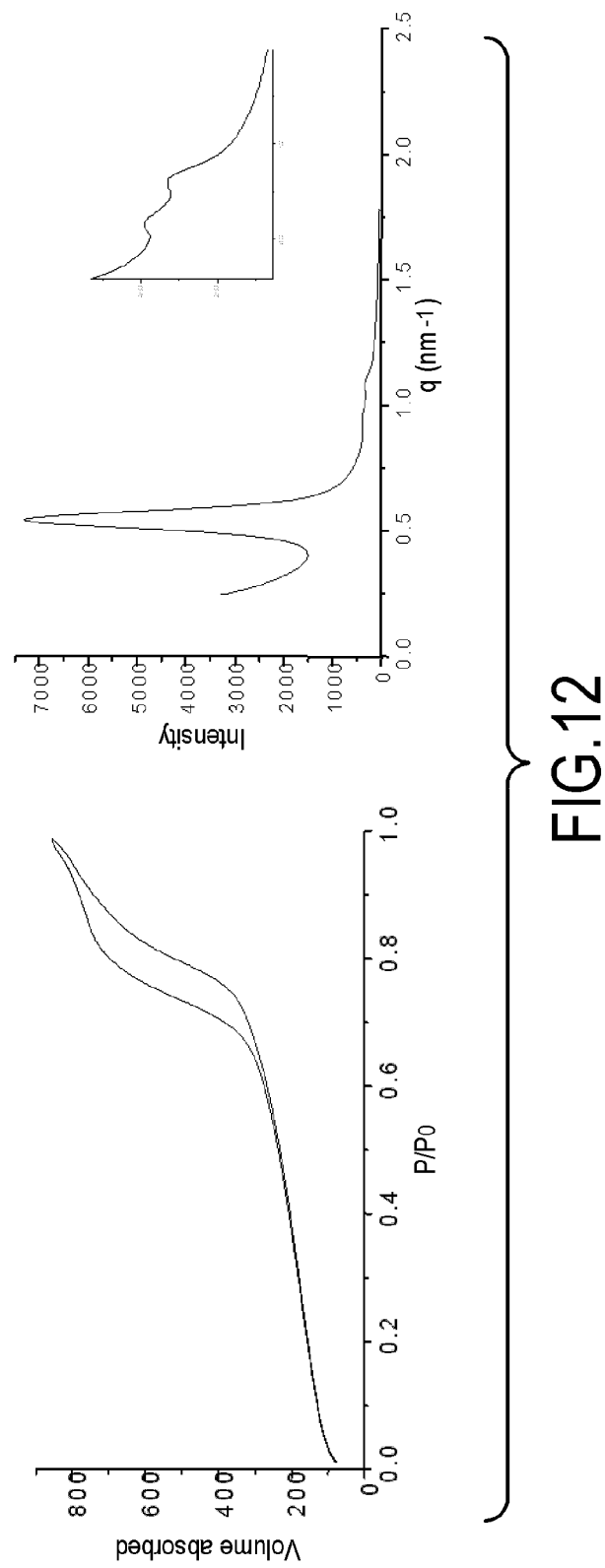
FIG. 12 is an N2 adsorption-desorption experiment, and an X-ray diffraction of an imidazole functionalized hybrid material $P_{30}^4$ according to another embodiment of the present disclosure.

The Nitrogen adsorption-desorption isotherm of $P_{30}^{4}$, and the X-Ray diffraction pattern of $P_{30}^{4}$ are represented in FIG. 12.

Synthesis of the Imidazol Functionnalized Hybrid Material $P_{30}^{4}$ Cubic (Mesoporous Organosilica with Cage Like Pores).

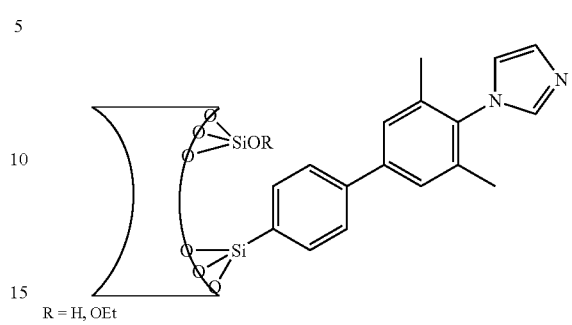

R = H, OEt

In a polypropylene bottle, 0.77 g of F127 was added to an aqueous HCl solution (prepared from 35 mL of H₂O and 1.51 g of HCl 37%). After about 2 h stirring, the transparent solution was heated at 45° C., 2.16 g of n-butanol were added and the reaction mixture was stirred for 1 h at 45° C. Then, 204 mg of 4 and 3.35 g of TEOS were added, and the mixture was stirred vigorously for 48 h at 45° C. Surfactant removal was accomplished by Soxlhet extraction with H₂O for 24 h. The solid was then filtered and washed three times with ethanol, acetone and ether. After drying at 120° C. overnight under vacuum, $P_{30}^{4}$ Cubic was obtained (67%).

Analytical Data.

Elemental analyses: C, 10.76%; N, 0.64%; Si, 33.8%.

X-ray diffraction (FIG. 13): the pattern of this material exhibits three reflexions in the low angle region indicating a high degree of mesostructural order and consistent with cage-like pores arranged in a cubic close packed mesostructure.

Transmission electron microscopy (FIG. 14): confirmation of the cubic structure.

$N_2$ adsorption-desorption experiment: type IV isotherm, characteristic of mesoporous materials with a narrow pore size. $S_{BET}$:116 m²g⁻¹; Vp: 0.4 cm³g⁻¹; $Dp_{BJH}$:3.2 nm.

Figure 13:
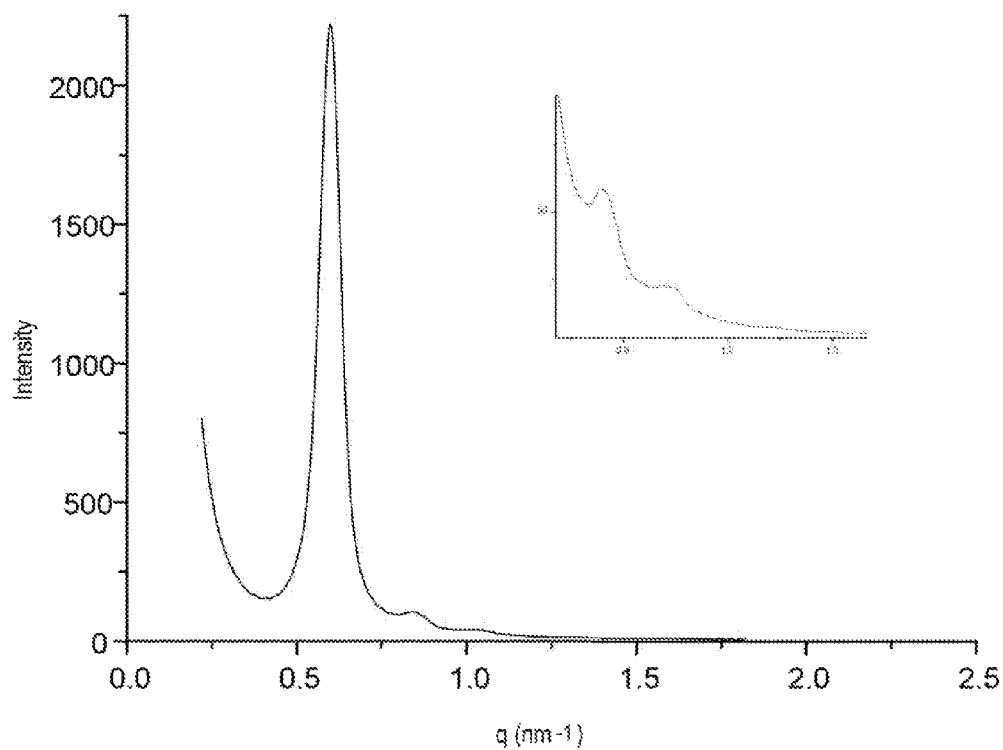
FIG. 13 is an X-ray diffraction spectrograph of the imidazole functionalized hybrid material $P_{40}^3$ of FIG. 12 according to another embodiment of the present disclosure.

The X-Ray diffraction pattern of $P_{30}^{4}$ Cubic is represented in FIG. 13.

Figure 14:
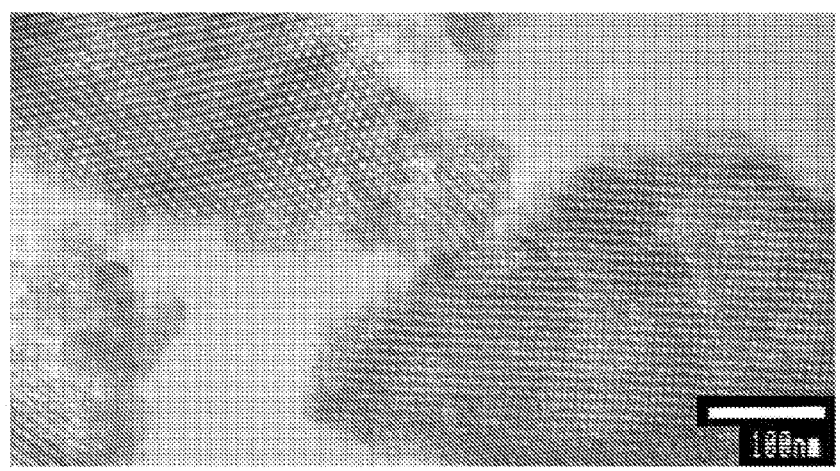
FIG. 14 is a TEM of the imidazole functionalized hybrid material $P_{30}^4$ of FIG. 12 according to another embodiment of the present disclosure.

The TEM micrograph of $P_{30}^{4}$ Cubic (Scale bar=100 nm) is represented in FIG. 14.

Synthesis of material $W_{19}^{6}$ (55).

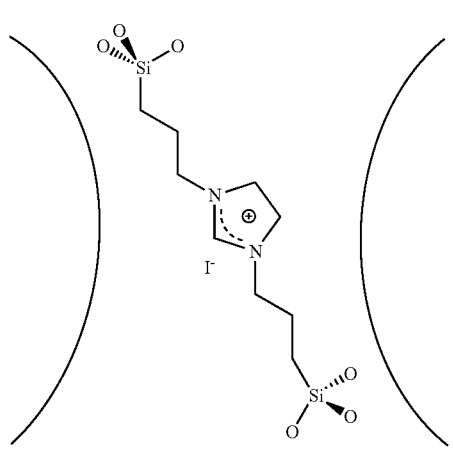

Procedure using 55% of surfactant.

In a 250 mL Erlenmeyer, 3.84 g of P123 (0.6 mmol, 0.36 equiv.) were dissolved in 3.2 g of an aqueous HCl solution (pH 1.5) and 7.3 g TEOS (0.035 mmol, 19.0 equiv.) were added. The reaction mixture was vigorously stirred until a transparent solution was obtained, and then 1.04 g of precursor 6 (1.842 mmol, 1.0 equiv.) was added. The reaction mixture was further stirred for 30 min. and ethanol was removed under vacuum to give a pale yellow gel within 20 min. After keeping for 24 h at room temperature, 0.8 mL of water was added, the mixture was further heated at 100° C. for 24 h. The gel was finally ground into a fine powder, which was washed with water, ethanol, acetone, and then diethyl ether. The surfactant was removed by Soxhlet extraction in hot ethanol for 3 days. The material was washed with water, ethanol, acetone, diethyl ether, and then dried under high vacuum ($10^{-5}$ mbar) at 140° C. for 12 h to give 3.30 g of a white material $W_{19}^{6}$ (quantitative yield).

Analytical Data.

$^{13}$C CP-MAS solid state NMR (75.5 MHz): 9, 20, 49, 157 ppm.

$^{29}$Si solid state NMR (75.5 MHz, HPDec): −62, ($T^2$); −66 ($T^3$); −104 ($Q^3$); −109 ($Q^4$).

Elemental analyses: C, 8.2; H, 2.86; N, 1.6; Si, 38.2(%).

X ray diffraction (FIG. 15): The pattern exhibits an intense diffraction peak and one broad and weak signal in accordance with a 2D hexagonal structure. (d=82 Å, a=95 Å).

Transmission electron microscopy (FIG. 16): The micrographs confirm that the material exhibits a local 2D hexagonal structure.

$N_2$ adsorption-desorption experiment (FIG. 17): $S_{BET}$:608 m²/g; Vp: 1.0 cm³/g; $Dp_{BJH}$:63 Å.

Figure 15:
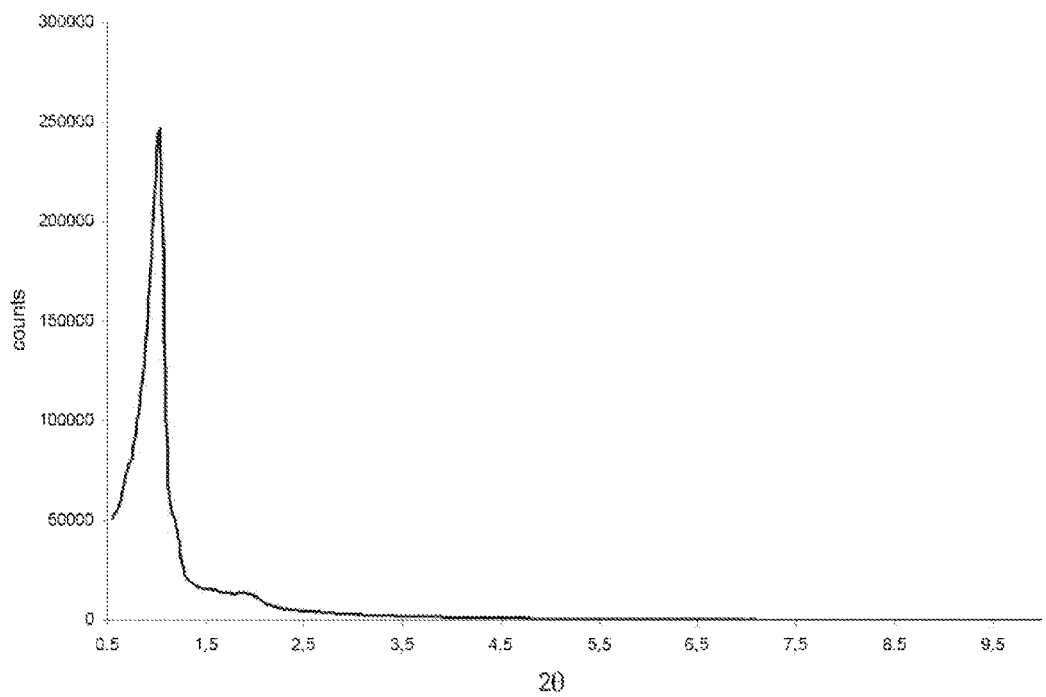
FIG. 15 is an X-ray diffraction spectrograph of material $W_{19}^6$ (55) according to another embodiment of the present disclosure.

The Small angle X-ray diffraction patterns of material $W_{19}^{6}$(55) is represented in FIG. 15.

Figure 16:
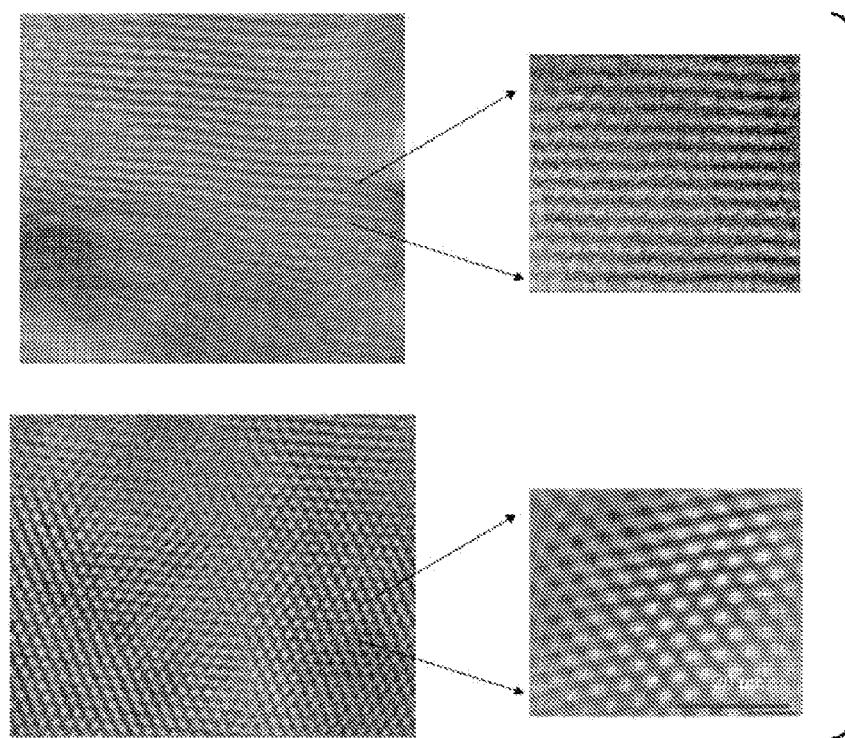
FIG. 16 is a TEM of the material $W_{19}^6$ (55) of FIG. 15 according to another embodiment of the present disclosure.

The TEM micrographs of $W_{19}^{6}$(55) are represented in FIG. 16.

Figure 17:
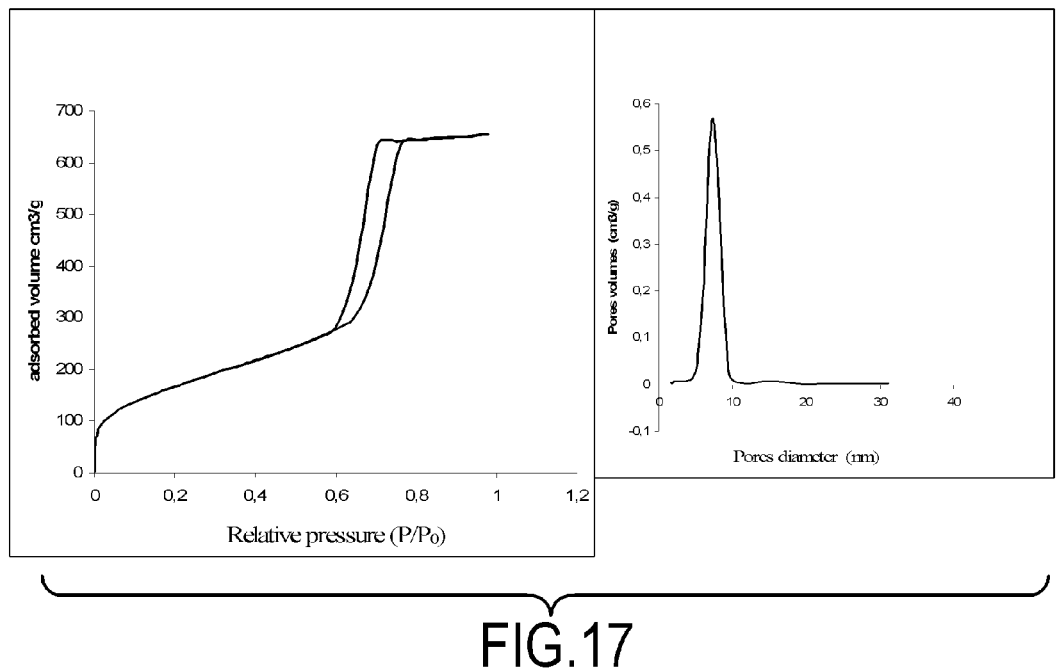
FIG. 17 is an N2 adsorption-desorption experiment, and a pores diameter distribution of the material $W_{19}^6$ (55) of FIG. 15 according to another embodiment of the present disclosure.

The Isotherm of $N_2$ adsorption/desorption at 77K and the pores diameter distribution (calculated from BJH method) for material $W_{19}^{6}$(55) are represented in FIG. 17.

Figure 18:
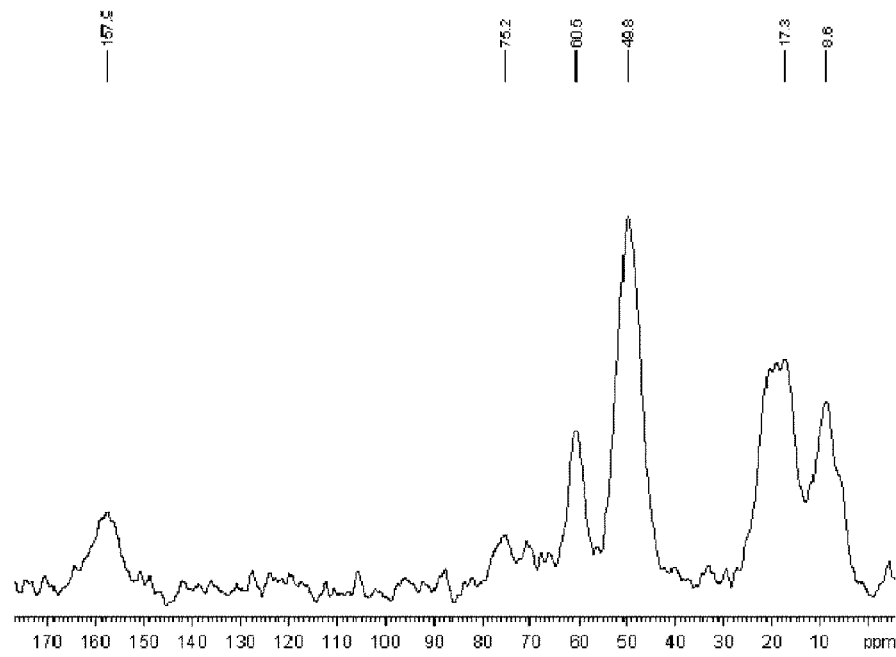
FIG. 18 is a $^{13}C$ solid state CP MAS NMR spectrum of the material $W_{19}^6$ (55) of FIG. 15 according to another embodiment of the present disclosure.

The $^{13}$C solid state CP MAS NMR spectrum of the material $W_{19}^{6}$(55) is represented in FIG. 18.

Figure 19:
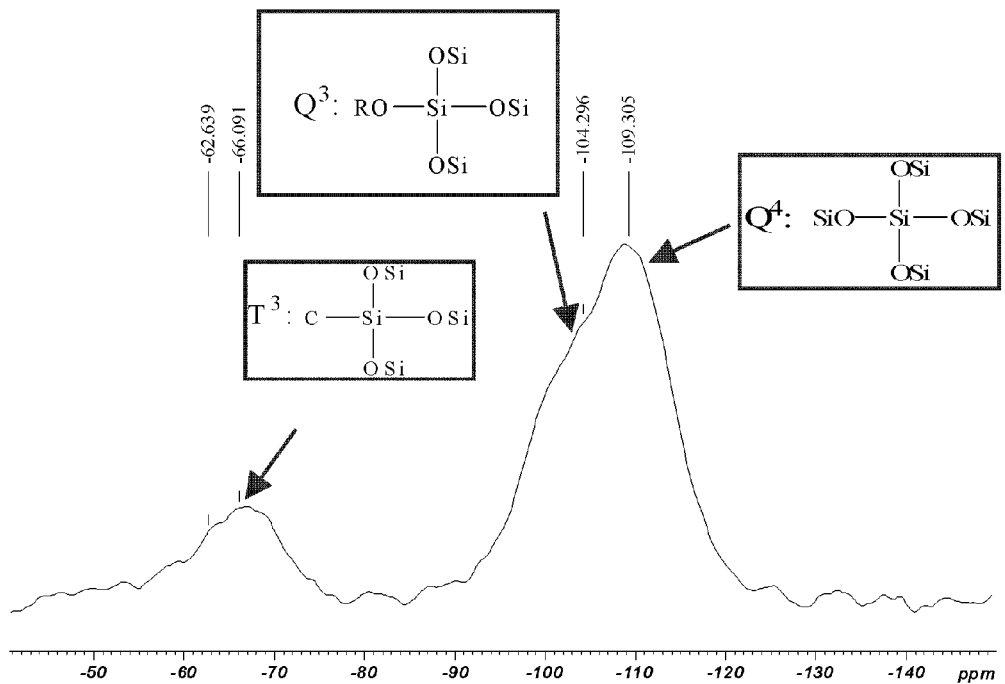
FIG. 19 is the $^{29}Si$ solid state HPDEC NMR spectrum of the material $W_{19}^6$ (55) of FIG. 15 according to another embodiment of the present disclosure.

The $^{29}$Si solid state HPDEC NMR spectrum of the material $W_{19}^{6}$(55) is represented in FIG. 19.

Synthesis of Material $W_{19}^{6}$(30).

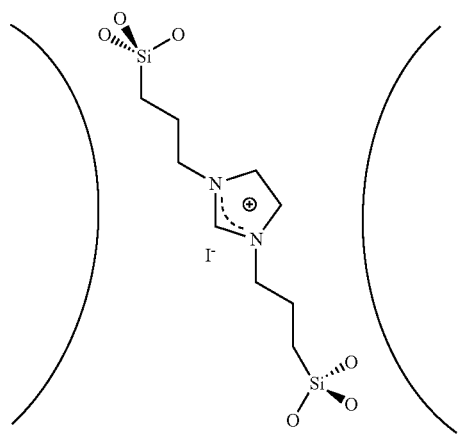

Procedure using 30% of surfactant.

The preparation of $W_{19}^{6}$(30) used a similar experimental procedure to this described for $W_{19}^{6}$(55) with the following modification: P123 (1.28 g, 0.2 mmol), 3.2 mL of aqueous HCl solution (pH 1.5), 0.4 g of 6 (1.84 mmol), yielding 3.2 g of $W_{19}^{6}$(30) (quantitative yield).

Analytical Data.

$^{13}$C CP-MAS solid state NMR (75.5 MHz): 8.9, 19.7, 48.5, 157.1 ppm.

$^{29}$Si solid state NMR (75.5 MHz, direct detection): −62, ($T^2$); −66 ($T^3$); −104 ($Q^3$); −109 ($Q^4$).

Elemental analyses: C, 8.2; N, 1.6; Si, 38.2(%).

X ray diffraction (FIG. 20): The pattern exhibits a broad diffraction peak in accordance with a wormlike structuration (d=100 Å).

Transmission electron microscopy (FIG. 21): The micrograph is consistent with a worm-like structure.

$N_2$ adsorption-desorption experiment (FIG. 22): $S_{BET}$:625 m²/g; Vp: 0.43 cm³/g; $Dp_{BJH}$:28 Å

Figure 20:
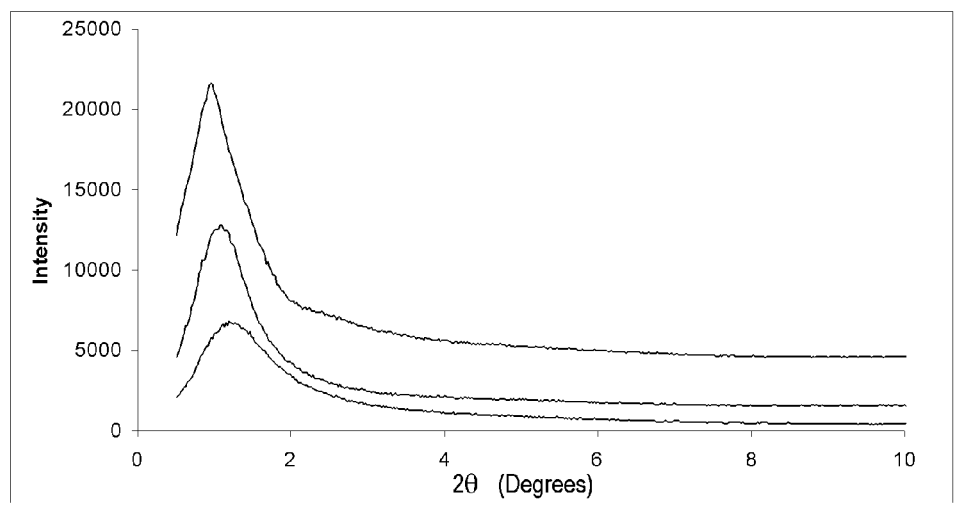
FIG. 20 is an X-ray diffraction of material $W_{19}^6$ (30) according to another embodiment of the present disclosure.

The Small angle X ray diffraction patterns of material $W_{19}^{6}$(30), $W_{19}^{7}$(55) and $W_{19}^{7}$(30) is represented in FIG. 20.

Figure 21:
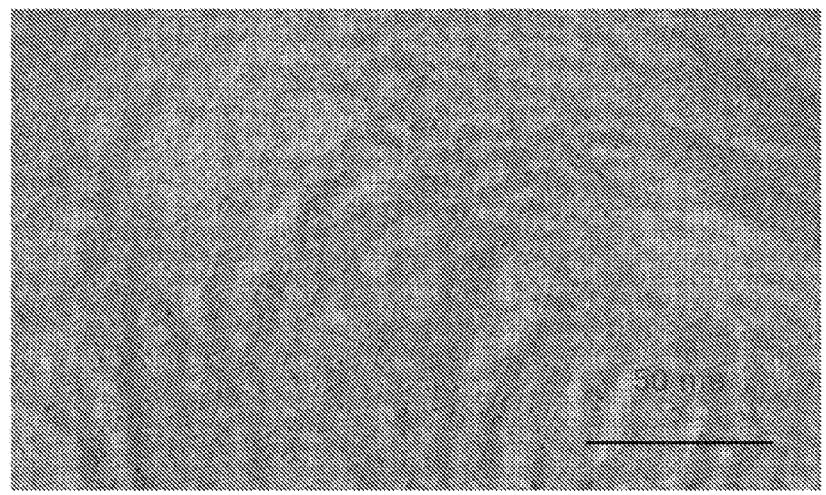
FIG. 21 is a TEM of the of material $W_{19}^6$ (30) of FIG. 20 according to another embodiment of the present disclosure.

The TEM micrographs of $W_{19}^{6}$(30) are represented in FIG. 21.

Figure 22:
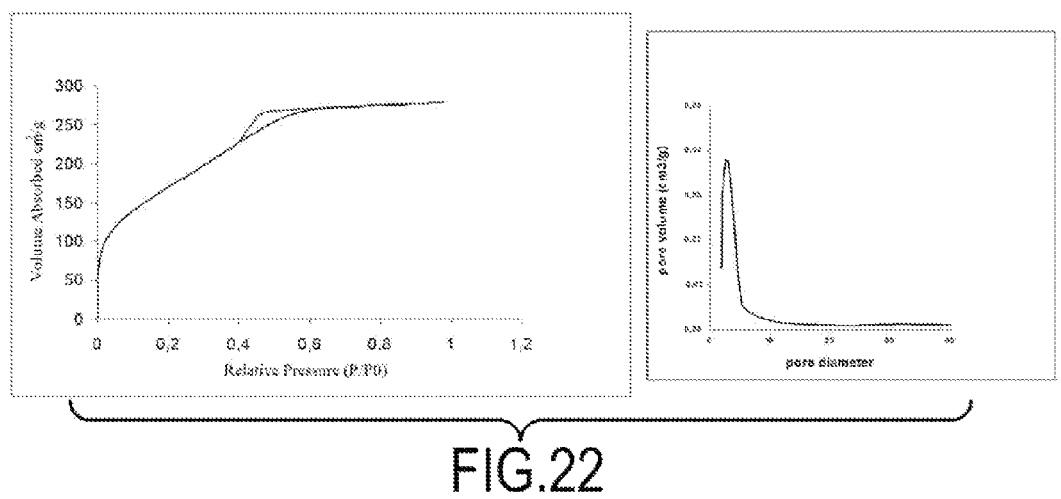
FIG. 22 is an N2 adsorption-desorption experiment, and a pores diameter distribution of the material $W_{19}^6$ (30) of FIG. 20 according to another embodiment of the present disclosure.

The Isotherm of $N_2$ adsorption/desorption at 77K; and the pores diameter distribution (calculated from BJH method) for material $W_{19}^{6}$(30) are represented in FIG. 22.

Synthesis of Material $W_{19}^{7}$(55).

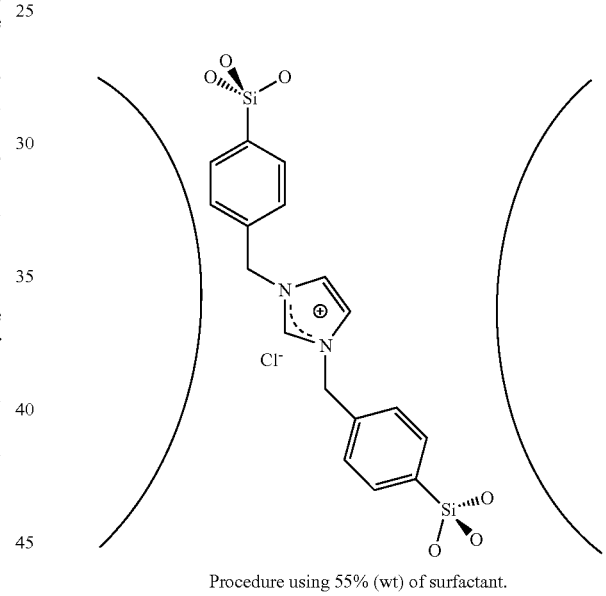

Procedure using 55% (wt) of surfactant.

$W_{19}^{7}$(55) was prepared using the experimental procedure described for the synthesis of $W_{19}^{6}$(55) with the following amounts of reactants: P123 (3.84 g, 0.6 mmol), 3.2 mL of aqueous HCl solution (pH 1.5), TEAS (7.3 g, 26.4 mmol), 7 (0.94 g, 1.84 mmol), yielding 3.4 g of $W_{19}^{7}$(55) (quantitative yield).

Analytical Data.

$^{13}$C solid state CP-MAS NMR (75.5 MHz): 8.9, 19.7, 48.5, 157.06 ppm.

$^{29}$Si solid state NMR (75.5 MHz, direct detection): −62, ($T^2$); −66 ($T^3$); −104 ($Q^3$); −109 ($Q^4$).

Elemental analyses: C, 13.5; N, 1.5; Si, 33.9(%).

X ray diffraction: The pattern exhibits a broad diffraction peak in accordance with a wormlike structuration (d=81 Å).

$N_2$ adsorption-desorption experiment (FIG. 23): $S_{BET}$:625 m²/g; Vp: 0.43 cm³/g; $Dp_{BJH}$:54 Å.

Figure 23:
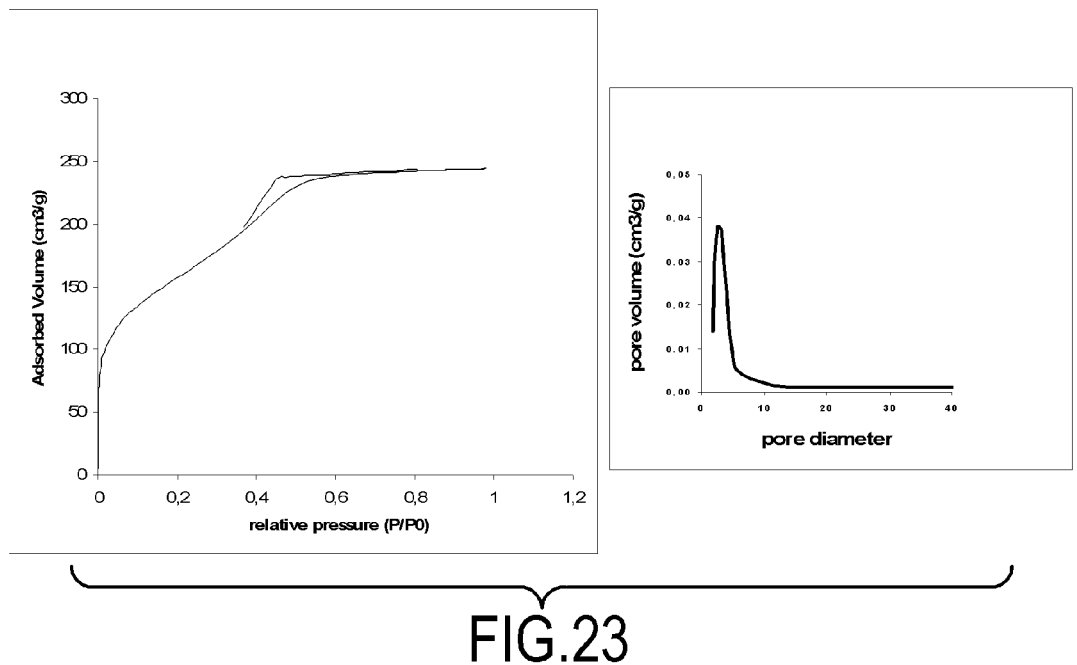
FIG. 23 is an N2 adsorption-desorption experiment, and a pores diameter distribution of the material $W_{19}^7$ (55) according to another embodiment of the present disclosure.

The Isotherm of $N_2$ adsorption/desorption at 77K; and the pores diameter distribution (calculated from BJH method) for material $W_{19}^{7}$(55) are represented in FIG. 23.

Synthesis of Material $W_{19}^{7}(30)$.

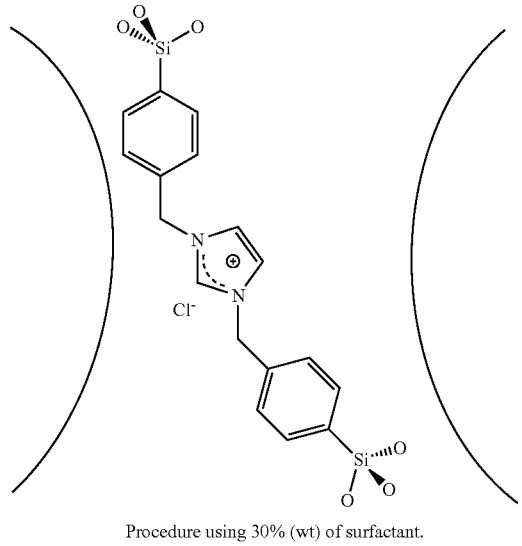

Procedure using 30% (wt) of surfactant.

Using the experimental procedure described for the preparation of $W_{19}^{6}(30)$ with the following modification: P123 (1.28 g, 0.2 mmol), 3.2 mL of aqueous HCl (pH 1.5), TEOS (7.3 g, 26.4 mmol) and 7 (0.94 g, 1.84 mmol), 3.30 g of $W_{19}^{7}(30)$ was obtained as a white powder (quantitative yield).

Analytical Data.

$^{13}$C solid state CP-MAS NMR (75.5 MHz): 8, 19, 48, 157 ppm.

$^{29}$Si solid state NMR (75.5 MHz, HPDEC): −62, (T$^2$); −66 (T$^3$); −104 (Q$^3$); −109 (Q$^4$).

Elemental analyses: C, 10.0; N, 1.8; Si, 35.5(%).

X ray diffraction: the pattern exhibits a broad diffraction peak in accordance with a wormlike structuration ($d_{100}$=93 Å).

N$_2$ adsorption-desorption experiment: $S_{BET}$:608±4 m$^2$/g; Vp: 1.0 cm$^3$/g; Dp$_{BJH}$:34 Å.

Synthesis of Material $W_{30}^{5}$.

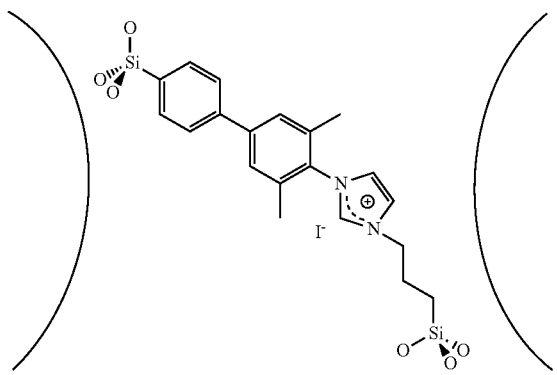

In a 100 mL Erlenmeyer, 3.06 g of P123 (EO$_{20}$PO$_{70}$EO$_{20}$) dissolved in aqueous HCl (15 mL of H$_2$O and 90 mL of 2M HCl) was added to a mixture of TEOS (6.24 g, 30 mmol) and 5 (0.826 mg, 1 mmol). This reaction mixture was stirred at 40° C. for 24 h, transferred into a polypropylene bottle and then heated to 100° C. for 64 h. The surfactant template removal was accomplished by Soxhlet extraction with ethanol for 24 h. The solid was then filtered and washed three times with ethanol, acetone and ether. After drying overnight under vacuum at 120° C., $W_{30}^{5}$ was obtained as a white powder with 63% yield.

Analytical Data.

Elemental analyses: C, 11.62; N, 0.55; Si, 38.2(%).

X-Ray diffraction (FIG. 24): the X-ray diffraction pattern of this material exhibited three reflexions in the low angle region indicating a high degree of mesostructural order. These reflections can be indexed as (100), (110) and (200) in accordance with a 2D hexagonal structure.

Transmission electron microscopy (FIG. 25): the image confirms this structure.

N$_2$ adsorption-desorption isotherm (FIG. 26): Type IV isotherm, characteristic of mesoporous materials with a narrow pore size distribution $S_{BET}$ 832 m$^2$g$^{-1}$; Vp: 1.03 cm$^3$g$^{-1}$; Dp$_{BJH}$:6.4 nm.

Figure 24:
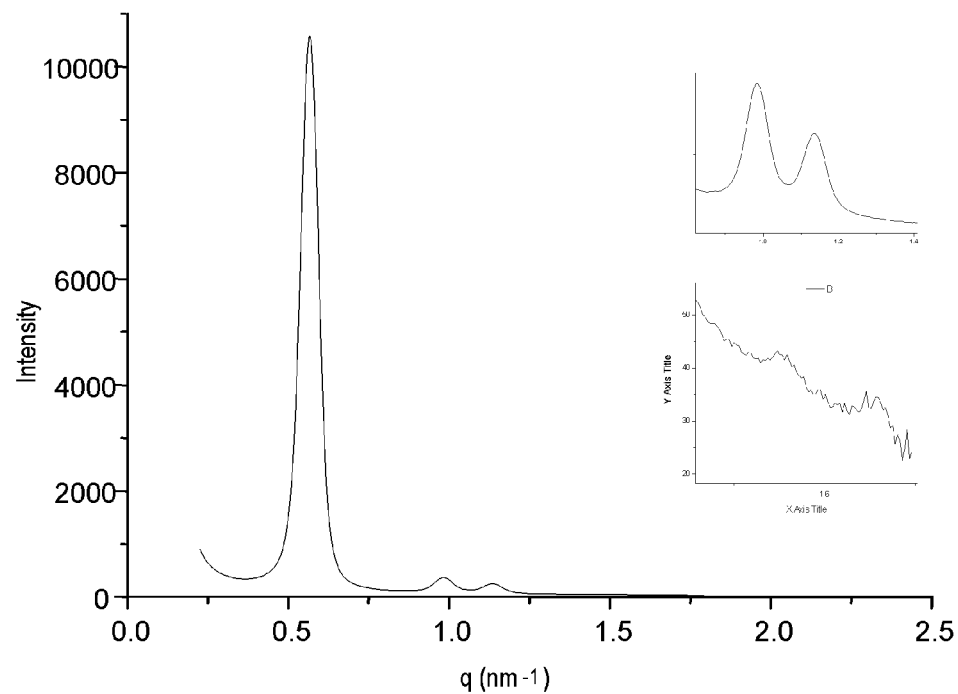
FIG. 24 is an X-ray diffraction of material $W_{30}^5$ according to an embodiment of the present disclosure.

The X-Ray diffraction pattern of $W_{30}^{5}$ is represented in FIG. 24.

Figure 25:
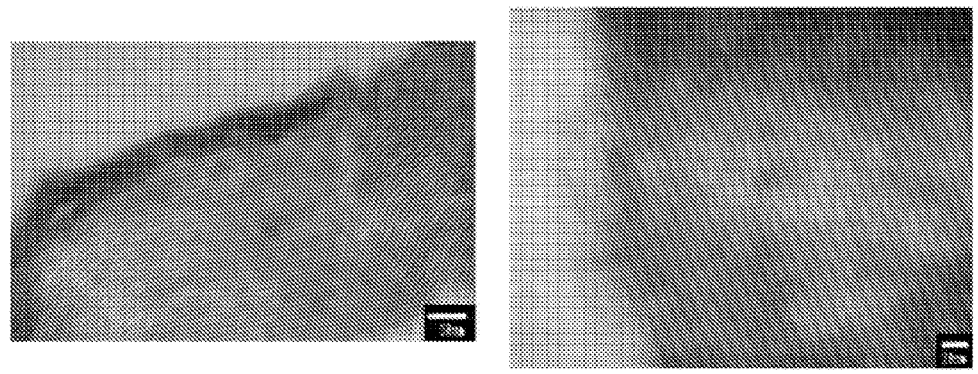
FIG. 25 is a TEM micrograph of the material $W_{30}^5$ of FIG. 24 according to another embodiment of the present disclosure.

The TEM micrograph of $W_{30}^{5}$ Scale bar=50 nm and 20 nm is represented in FIG. 25.

Figure 26:
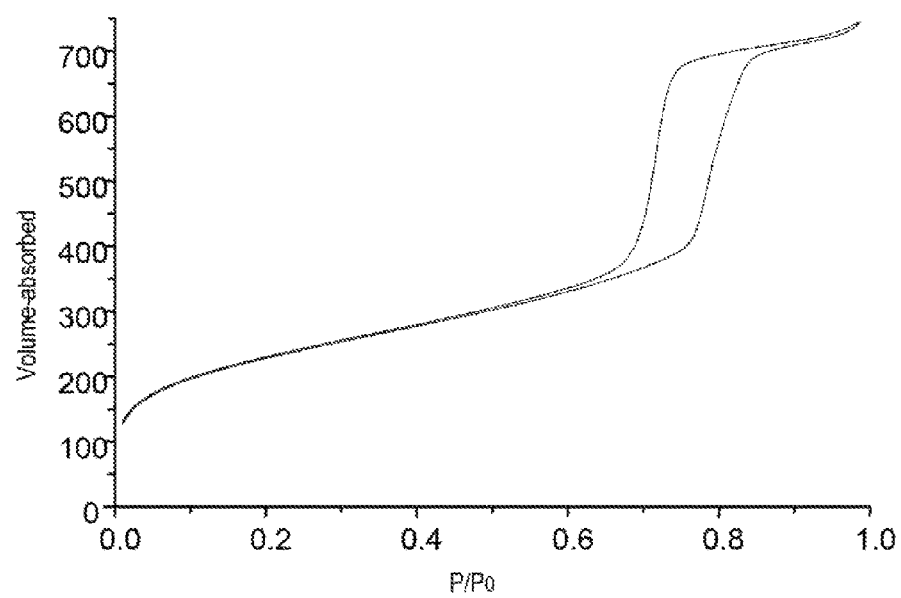
FIG. 26 is an $N_2$ adsorption-desorption isotherm of the material $W_{30}^5$ of FIG. 24 according to another embodiment of the present disclosure.

The Nitrogen adsorption-desorption isotherm of $W_{30}^{5}$ is represented in FIG. 26.

EXAMPLES PART III

Synthesis of Non Structured Materials

Preparation of Material $W_{0}^{8}$.

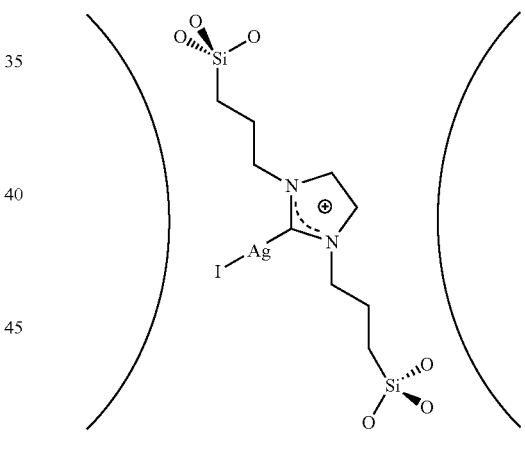

To a mixture of F127 (3.36 g, 0.4 mmol, 0.05 equiv.) and water (1.09 g, 60.5 mmol, 7.5 equiv.) was added under stirring 8 (5.7 g, 8 mmol, 1.0 equiv.) in 91 mL of methanol. The resulting reaction mixture was vigorously stirred for 3 h at 25° C., heated to 60° C., and then NaF (0.017 g, 0.4 mmol, 0.04 equiv.) was added. The reaction mixture was further stirred at 60° C. for 72 h. The obtained suspension was filtered at room temperature, and the resulting solid was washed with water, ethanol, acetone and then diethyl ether. After removal of the surfactant by Soxhlet extraction with ethanol for 3 days, the solid material was washed with water, ethanol, acetone, diethyl ether, and then dried by heating at 140° C. under high vacuum (10$^{-5}$ mbar) for 12 h to give 2.35 g of the beige material $W_{0}^{8}$ (60%).

Analytical Data.

Figure 27:
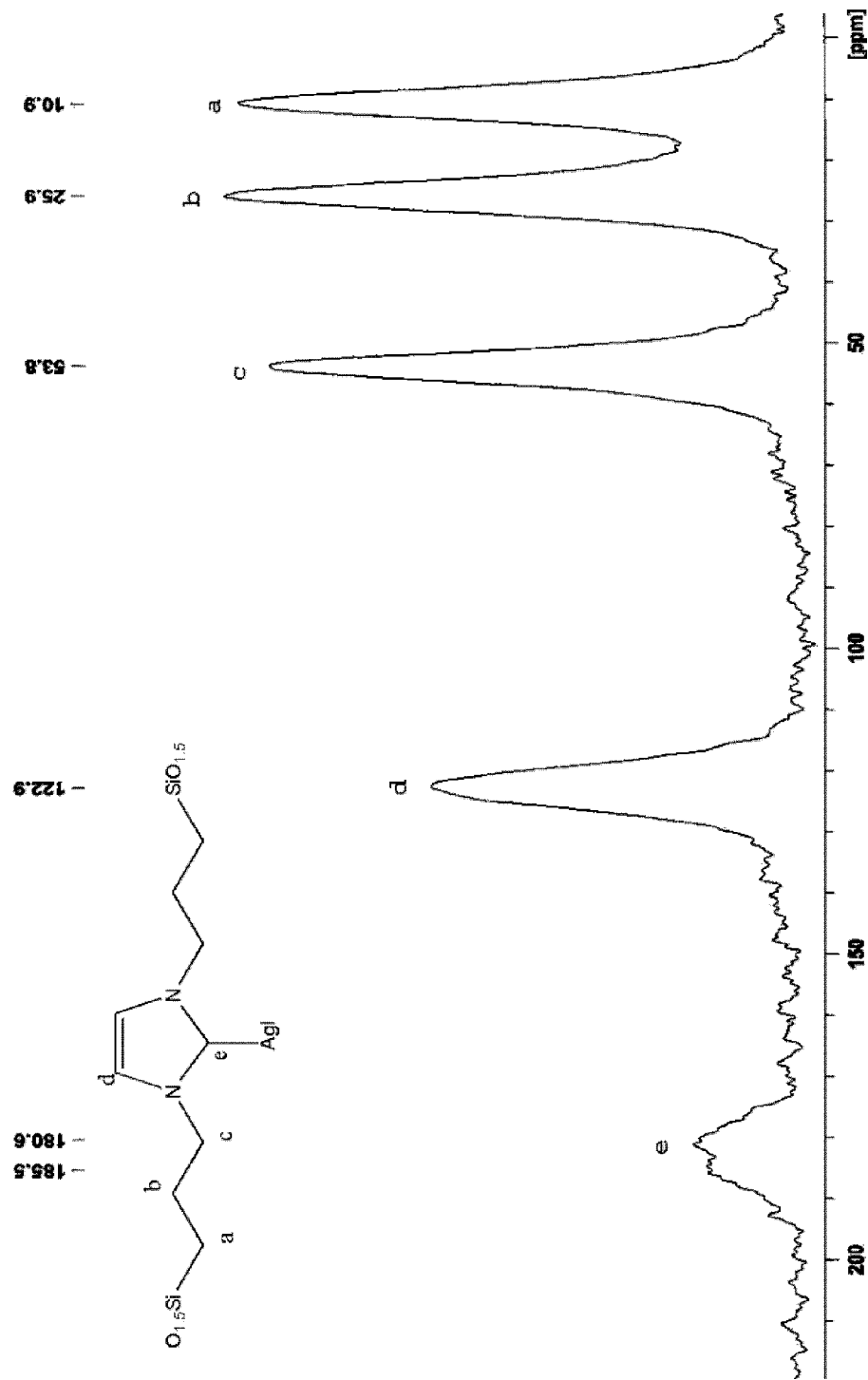
FIG. 27 is a $^{13}C$ CP-MAS solid state NMR spectrograph of material $W_{30}^5$ according to another embodiment of the present disclosure.

$^{13}$C CP-MAS solid state NMR (75.5 MHz) δ: 11, 26, 54, 123, 183 (br) (FIG. 27).

$^{29}$Si CP-MAS solid state NMR (59.6 MHz) δ: −67 (T$^3$).

Elemental analyses: C, 20.47, H, 2.90, N, 4.76, Si, 12.52, Ag, 19.39(%).

The $^{13}$C solid state CP MAS NMR spectrum of the Ag—NHC containing hybrid material W$_0$$^8$ is represented in FIG. 27.

Preparation of Material W$_0$$^9$.

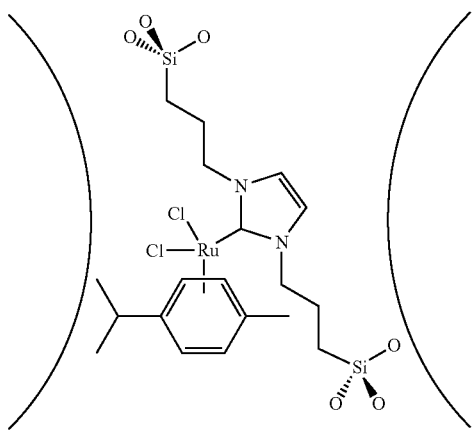

To a mixture of 9 (3.3 g, 4.2 mmol, 1 equiv.) in THF (4 mL) was added at 25° C. NaF (5 mg, 0.12 mmol, 0.028 equiv.) in water (0.25 mL; 13.9 mmol, 3.3 equiv.). The resulting reaction mixture was stirred at 25° C. for 1 min, and then kept at 25° C. without stirring for 5 days. The solid was powdered, washed with water, ethanol, acetone, diethyl ether, and then dried at 25° C. under high vacuum (10$^{-5}$ mbar) for 12 h to give 2.15 g of an orange material W$_0$$^9$ (90%).

$^{13}$C CP-MAS solid state NMR (75.5 MHz). δ: 10, 15, 19, 25, 31, 53, 65, 78, 95, 123, 172.

$^{29}$Si CP-MAS solid state NMR (59.6 MHz, 25° C.). δ: −60 (T$^2$), −67 (T$^3$).

Elemental analysis: C, 39.06, H, 5.58, N, 4.33, Cl, 10.14, I 1.79, Si, 12.38, Ru, 14.50(%).

Figure 28:
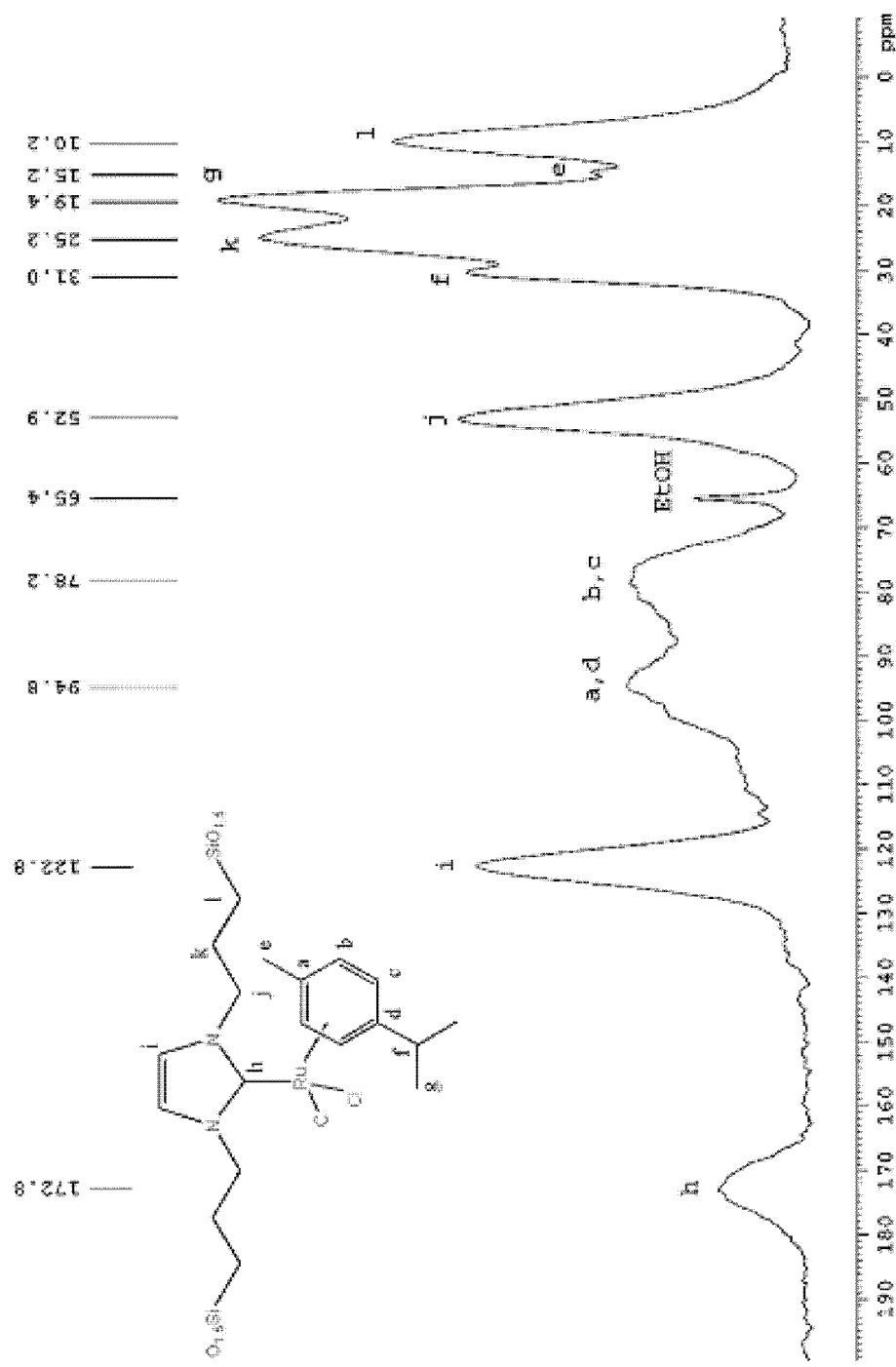
FIG. 28 is a $^{13}$C solid state CP MAS NMR spectrum of Ru-NHC containing hybrid material $W_0^9$ according to another embodiment of the present disclosure.

The $^{13}$C solid state CP MAS NMR spectrum of the Ru—NHC containing hybrid material W$_0$$^9$ is represented in FIG. 28.

EXAMPLES PART IV

Overall Synthesis of Ir—NHC Containing Hybrid Material Using P$_{30}$$^3$ as the Starting Material.

Synthesis of Material P$_{30H}$$^{3Me}$

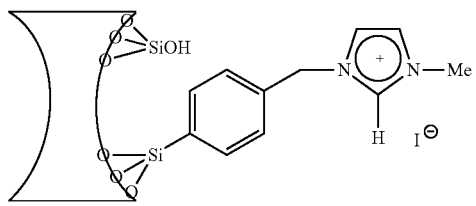

The material P$_{30}$$^3$ (1.0 g) was suspended in 200 mL of aqueous 2M HCl, and heated at 45° C. for 2 h. After filtration and washings with H$_2$O (3×50 mL), the material was dried (135° C., 10$^{-5}$ mm Hg, 12 h) and then treated with CH$_3$I (5 mmol, 10 equiv.) in THF. The resulting suspension was heated under reflux under argon for 24 h, and the volatiles were evacuated in vacuo. The solid was filtered and was dried at 135° C. under high vacuum to give 1 g of material P$_{30H}$$^{3Me}$.

Analytical Data.

$^1$H solid state NMR (500 MHz): 1H NMR (500 MHz): 1.2, 6.5-7.6 ppm.

$^{13}$C CP-MAS solid state NMR (125.7 MHz): 17, 23, 52, 128, 135 ppm.

Synthesis of Material P$_{30HSi}$$^{3Me}$

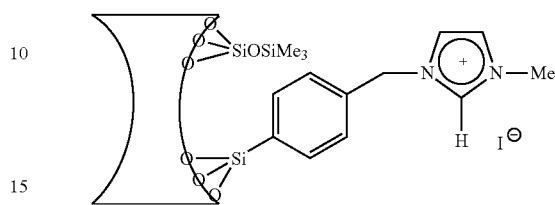

Material P$_{30H}$$^{3Me}$ (400 mg, 0.18 mmol) was treated with 2 mL of hexamethyldisilazane (12.4 mmol) in 5 mL of toluene, and the reaction mixture was heated at 120° C. for 2 days. After cooling at room temperature, the reaction mixture was filtered, and the collected solid was washed with toluene, methanol and ether, and then dried under vacuum. After Soxhlet extraction with dry methanol for 2 days, the solid was dried under vacuum (135° C., 10$^{-5}$ mm Hg) for 14 h to give 0.36 g of P$_{30HSi}$$^{3Me}$.

Analytical Data.

$^1$H solid state NMR (500 MHz): 1H NMR (500 MHz): 0.0, 1.2, 6.5-7.6 ppm.

$^{13}$C CP-MAS solid state NMR (125.7 MHz): 0, 17, 23, 52, 128, 135 ppm.

Synthesis of Material P$_{30HOMe}$$^{3Me}$

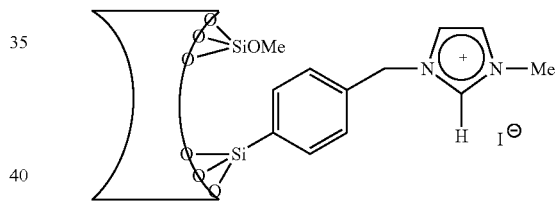

The material P$_{30H}$$^{3Me}$ (1.5 g, 0.7 mmol) was extracted using a soxhlet apparatus with freshly prepared dry methanol (500 mL of MeOH was kept under white Mg-cake) for 2 days. Then, the product P$_{30HOMe}$$^{3Me}$ was transferred into a Schlenk tube inside the globe-box, dried under high vacuum (135° C., 10$^{-5}$ mm Hg) for 14 h which afforded 1.2 g of P$_{30HOMe}$$^{3Me}$.

Analytical data.

$^1$H solid state NMR (500 MHz): 3.4, 6.7, 7.1, 7.8 ppm.

$^{13}$C CP-MAS solid state NMR (125.7 MHz): 49, 126, 129, 134 ppm.

Synthesis of Material P$_{30HOMeSi}$$^{3Me}$

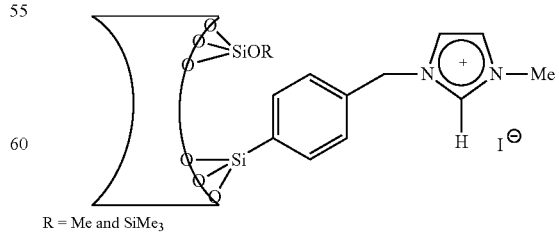

R = Me and SiMe$_3$

To the material P$_{30HOMe}$$^{3Me}$ (450 mg, 0.2 mmol), toluene (15 mL), triethylamine (2 mL) and then 0.5 mL of bromotrimethylsilane (3.2 mmol) were successively added. After stirring the reaction mixture at 25° C. for 12 h, it was filtered and the resulting solid was washed successively with toluene, methanol and ether. The collected white solid was dried under vacuum and it was purified by Soxhlet extraction with dry methanol for 2 days, which afforded 410 mg of P$_{30HOMeSi}^{3Me}$ after drying under vacuum (135° C., 10$^{-5}$ mm Hg) for 14 h.

The above mentioned treatment was performed to protect the residual silanol group (if any) present in the material P$_{30HOMe}^{3Me}$. The solid state NMR of the product P$_{30HOMeSi}^{3Me}$ indicates the presence of TMS group in a very trace amount (<5%).

Analytical Data.

$^1$H solid state NMR (500 MHz): 1H NMR (500 MHz): 0.0, 1.2, 3.4, 6.74, 7.05, 7.73 ppm.

$^{13}$C CP-MAS solid state NMR (125.7 MHz): 0, 49, 126, 129, 134 ppm.

Synthesis of Material P$_{30HSi}^{3MeAgIr}$.

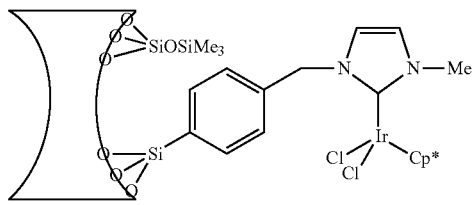

To a mixture of the material P$_{30HSi}^{3Me}$ (220 mg, 0.1 mmol) and AgOC(CF$_3$)$_3$ (55 mg, 0.15 mmol), acetonitrile (2 mL) and toluene (3 mL) were added and stirred for 12 h at room temperature under argon in absence of light. Then, [Cp*IrCl$_2$]$_2$ (120 mg, 0.15 mmol) in acetonitrile (1 mL) was added dropwise to it at room temperature. The resulting reaction mixture was stirred for 24 h at 60° C., filtered, and the collected solid was washed several times with acetonitrile, dichloromethane and methanol until the filtrate became colourless and then dried for 12 h under high vacuum which afforded 0.25 g of product as a grey solid P$_{30HSi}^{3MeAgIr}$.

Analytical Data.

$^1$H solid state NMR (500 MHz): 0.0, 0.75, 1.16, 2.07, 7.05, 7.72 ppm.

$^{13}$C CP-MAS solid state NMR (125.7 MHz): 0, 8, 18, 23, 26, 53, 127, 128, 135 ppm.

Elemental analyses: Si: 31.55; Ir: 1.69(%).

Synthesis of Material P$_{30HOMeSi}^{3MeAgIr}$

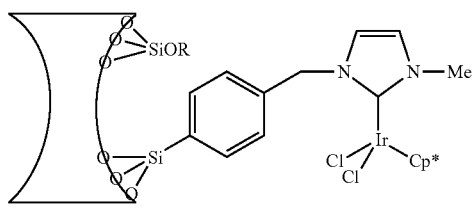

R = Me and SiMe$_3$

The material P$_{30HOMeSi}^{3MeAgIr}$ was prepared according to the procedure described above for P$_{30HSi}^{3MeAgIr}$, but using the following modification: P$_{30HOMeSi}^{3Me}$ (200 mg, 0.08 mmol), AgOC(CF$_3$)$_3$ (34 mg, 0.099 mmol, [Cp*IrCl$_2$]$_2$ (27 mg, 0.033 mmol), yielded 0.24 g of material.

Analytical Data.

$^1$H solid state NMR (500 MHz): 0.0, 1.5, 3.4, 7.0, 7.6 ppm.

$^{13}$C CP-MAS solid state NMR (125.7 MHz): 0, 7, 49, 126, 128, 134 ppm.

Elemental analyses: Ir: 8.08, Si: 30.14(%).

Synthesis of Material P$_{30HOMeSi}^{3MeKIr}$.

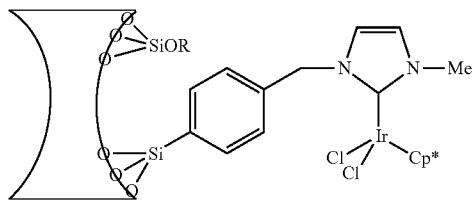

R = Me and SiMe$_3$

A solution of [K(N(SiMe$_3$)$_2$] (0.5M in toluene, 0.28 ml, 0.14 mmol) was added to a suspension of P$_{30HOMeSi}^{3Me}$ (300 mg, 0.12 mmol) in 5 mL of anhydrous toluene. After 20 min of stirring, [Cp*IrCl$_2$]$_2$ (111 mg, 0.14 mmol) in 1 mL of dry toluene was added dropwise, and the reaction mixture was stirred for 24 h at 60° C. After filtration, the solid was washed several times with anhydrous toluene, acetonitrile and methanol until the filtrate became colourless, and the material was then dried under vacuum (10$^{-5}$ mm Hg) at room temperature to yield 0.25 g of a very pale off-white material P$_{30HOMeSi}^{3MeKIr}$.

Analytical Data.

$^1$H solid state NMR (500 MHz): 0.0, 1.4, 3.4, 7.0, 7.6 ppm.

$^{13}$C CP-MAS solid state NMR (125.7 MHz): 0, 6, 49, 85, 126, 130, 134 ppm.

Elemental analyses: Ir: 2.76, Si: 29.86(%).

Synthesis of Material P$_{30HOMe}^{3MeAg}$.

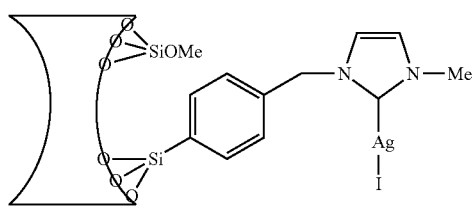

A mixture of P$_{30HOMe}^{3Me}$ (150 mg, 0.06 mmol) and AgOC(CF$_3$)$_3$ (48 mg, 0.14 mmol) in dry acetonitrile (2 mL) was stirred vigorously for 12 h at room temperature under argon atmosphere in absence of light. Then, the reaction mixture was filtered, and the collected solid was washed several times with acetonitrile, dichloromethane and methanol to remove the excess of reagents and by-products. The compound was dried for 6 h under vacuum (10$^{-5}$ mm Hg) to give 142 mg of product as a grey solid P$_{30HOMe}^{3MeAg}$.

Analytical Data.

$^1$H solid state NMR (500 MHz): 1.0, 3.4, 7.1, 7.7 ppm.

$^{13}$C CP-MAS solid state NMR (125.7 MHz): 27, 29, 48, 118, 126, 128, 134 ppm.

Synthesis of Material $P_{30HOMe}^{3MeAgRu}$.

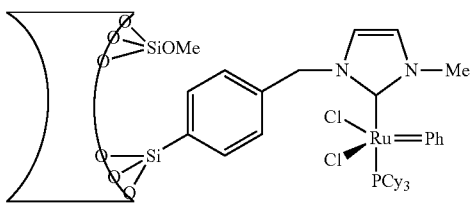

To the $P_{30HOMe}^{3MeAg}$ (120 mg, 0.053 mmol) in 2 mL of dry toluene, $Cl_2(PCy_3)_2Ru$=CHPh (60 mg, 0.073 mmol) in dry toluene (1 mL). was added dropwise at room temperature. The reaction mixture was stirred for 12 h at room temperature under argon atmosphere in absence of light. Then, it was filtered, and the collected solid was washed several times with toluene and dichloromethane to remove the excess of reagents and by-products. The compound $P_{30HOMe}^{3MeAgRu}$ was dried for 6 h under vacuum (10-5 mm Hg) to afford 107 mg as a grey solid.

Overall Synthesis of Ru—NHC or Ir—NHC Containing Hybrid Material Using $P_{30}^2$ as the Starting Material.

Synthesis of Material $P_{30HSi}^2$.

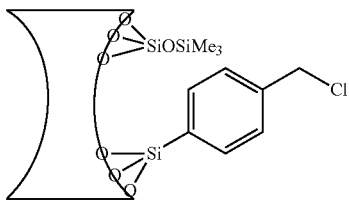

The material $P_{30}^2$ (1.5 g) was suspended in 300 mL of 2 M aqueous HCl, and heated at 45° C. for 2 h. After filtration, washings with $H_2O$ (3×50 mL), and drying (135° C., 10-5 mmHg, 12 h), the resulting material $P_{30H}^2$ was further contacted with toluene (150 mL), triethylamine (22.5 mL) and then trimethylsilylbromide (10.5 mL). The reaction mixture was stirred overnight, filtered and the solid was washed successively with toluene, ethanol and diethyl ether. The material was dried under vacuum overnight (135° C., 10-5 mmHg) affording 1.7 g of white material $P_{30HSi}^2$.

Analytical Data.

$^1$H solid state NMR (500 MHz): 0.0, 3.4, 7.1-7.6 ppm.

$^{13}$C CP-MAS solid state NMR (125.7 MHz): 0.0, 44, 127, 130, 134, 140 ppm.

Synthesis of Material $P_{30H}^{2Mes}$.

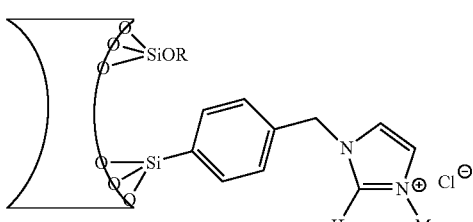

R = H

The material $P_{30}^2$ (1.5 g) was suspended in 300 mL of a 2M aqueous HCl solution, and heated at 45° C. for 2 h. After filtration, washings (3×50 mL of $H_2O$), and drying (135° C., $10^{-5}$ mm Hg, 12 h), the material was further treated with mesitylimidazole (2.43 g, 0.013 mol) and toluene (30 mL), and the reaction mixture was heated to reflux for 48 h. After filtration, the solid was washed successively with toluene, methanol and diethylether. It was then dried under vacuum overnight (135° C., $10^{-5}$ mm Hg) which afforded 1.7 g of the white material $P_{30H}^{2Mes}$.

Analytical Data.

$^1$H solid state NMR (500 MHz): 1.0, 7.1, 7.6 ppm.

$^{13}$C CP-MAS solid state NMR (125.7 MHz): 16, 126, 131, 134, 139, 140 ppm.

Synthesis of Material $P_{30HSi}^{2Mes}$ via $P_{30HSi}^2$

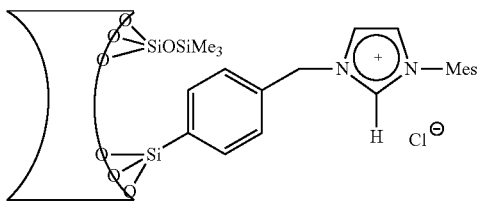

Mesitylimidazole (2.43 g, 0.013 mol), $P_{30HSi}^2$ (1.7 g) and toluene (30 mL) were stirred and heated under reflux for 90 h. After filtration, the solid was extracted with ethanol in a Soxhlet for 48 h. The material was then washed successively with methanol, acetone, diethyl ether and dried under vacuum overnight (135° C., $10^{-5}$ mm Hg) affording 1.7 g of a white material $P_{30HSi}^{2Mes}$.

Analytical Data.

$^1$H solid state NMR (500 MHz): 0.0, 7.1-7.6 ppm.

$^{13}$C CP-MAS solid state NMR (125.7 MHz): 0.0, 16, 45, 127, 134, 139-141 ppm.

Elemental analyses: Si: 33.43%; N: 0.57%

Synthesis of Material $P_{30HSi}^{2Mes}$ via $P_{30H}^{2Mes}$.

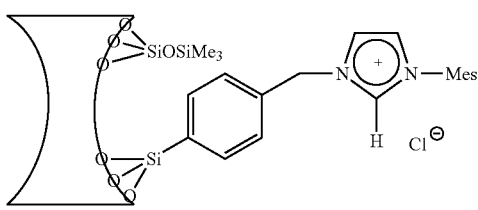

To a suspension of $P_{30H}^{2Mes}$ (1.5 g) in toluene (150 mL), triethylamine (22.5 mL) and trimethylsilylbromide (10.5 mL) were added. After stirring overnight at 25° C., the reaction mixture was filtered, and the solid was washed successively with toluene, methanol and diethyl ether to give 1.6 g of $P_{30HSi}^{2Mes}$ after drying under vacuum overnight (135° C., $10^{-5}$ mm Hg).

Analytical Data.

$^1$H solid state NMR (500 MHz): 0.0, 7.1-7.6 ppm.

$^{13}$C CP-MAS solid state NMR (125.7 MHz): 0.0, 16, 127, 134, 139, 141 ppm.

Synthesis of Material $P_{30HOMe}^{2Mes}$.

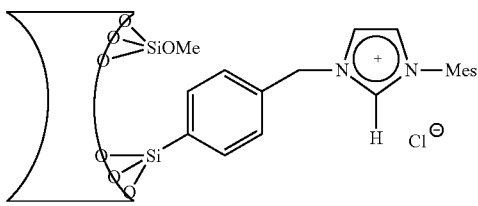

The dried solid $P_{30H}^{2Mes}$ (0.55 g) was extracted using a Soxhlet apparatus with freshly prepared dry methanol (distilled from white Mg-cake) for 2 days and then dried under high vacuum (135° C., 10-5 mm Hg) for 14 h to give 0.46 g of $P_{30HOMe}^{2Mes}$.

Analytical Data.

$^1$H solid state NMR (500 MHz): 3.4, 7.0, 7.6 ppm.

$^{13}$C CP-MAS solid state NMR (125.7 MHz): 16 (br), 49, 125, 141(br) ppm.

Figure 29:
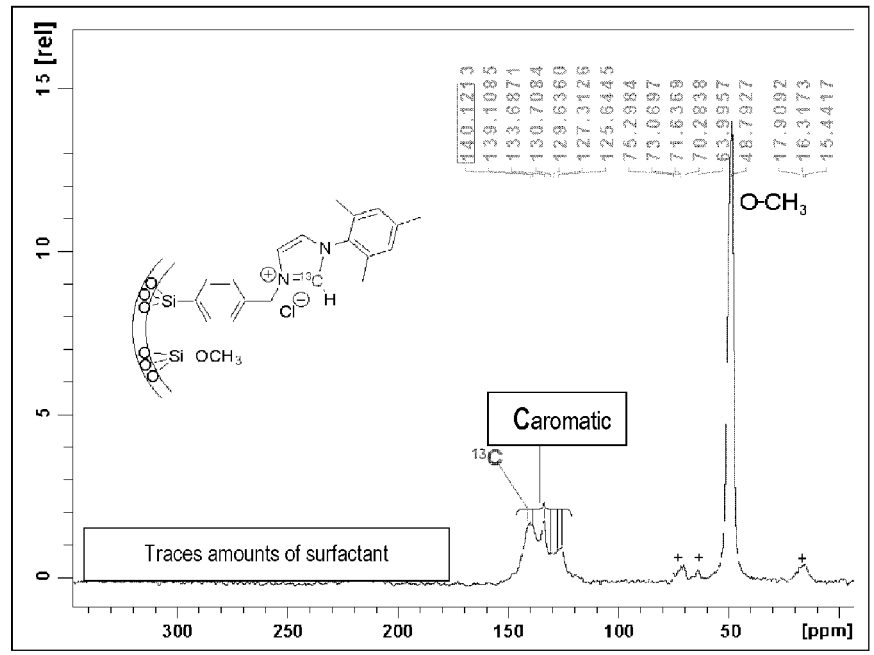
FIG. 29 is a $^{13}$C solid state NMR spectrum of the $^{13}$C labelled $P_{30HOMe}^{2Mes}$ according to another embodiment of the present disclosure.

The $^{13}$C solid state NMR spectrum of the $^{13}$C labelled $P_{30HOMe}^{2Mes}$ is represented in FIG. 29.

Synthesis of Material $P_{30HOMeSi}^{2Mes}$.

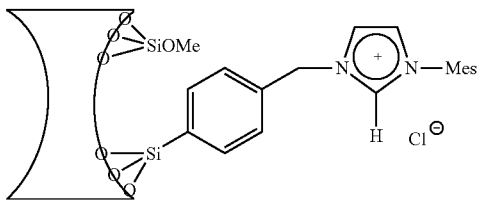

To the material $P_{30HOMe}^{2Mes}$ (300 mg) in toluene (20 mL), triethylamine (3 mL) and 1 mL of bromotrimethylsilane (6 mmol) were added dropwise successively. After stirring at 25° C. for 12 h, the reaction mixture was filtered and the resulting solid was washed successively with toluene, methanol and ether. After drying under vacuum the solid was purified by Soxhlet extraction with dry methanol for 2 days which afforded 290 mg of $P_{30HOMeSi}^{2Mes}$ after drying under vacuum (135° C., $10^{-5}$ mm Hg) for 14 h.

The above mentioned treatment was performed to protect the residual silanol groups (if any) present in the material $P_{30HOMe}^{3Mes}$. NMR of the product $P_{30HOMeSi}^{2Mes}$ indicates the presence of TMS group in a very trace amount (<5%).

Analytical Data.

$^1$H solid state NMR (500 MHz): 1H NMR (500 MHz): 0.0, 1.2, 3.4, 7.05, 7.62 ppm.

$^{13}$C CP-MAS solid state NMR (125.7 MHz): 0, 9, 16, 18, 48, 126, 129, 134, 139, 141 ppm Synthesis of $P_{30HOMe}^{2MesAg}$.

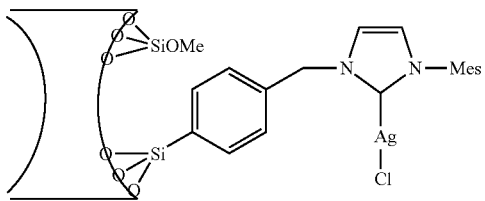

$P_{30HOMe}^{2Mes}$ (100 mg, 0.033 mmol) and AgOC(CF$_3$)$_3$ (18 mg, 0.05 mmol) were taken in acetonitrile-toluene (1+1 mL), and the mixture was stirred vigorously for 12 h at room temperature under argon atmosphere in absence of light. The solid was filtered, washed three times with acetonitrile, ether and dried under vacuum ($10^{-2}$ mm Hg) at room temperature overnight which afforded 38 mg of the grey material $P_{30HOMe}^{2MesAg}$.

Analytical Data.

$^1$H solid state NMR (500 MHz): 0.0, 3.4, 6.0-7.6 ppm.

Figure 30:
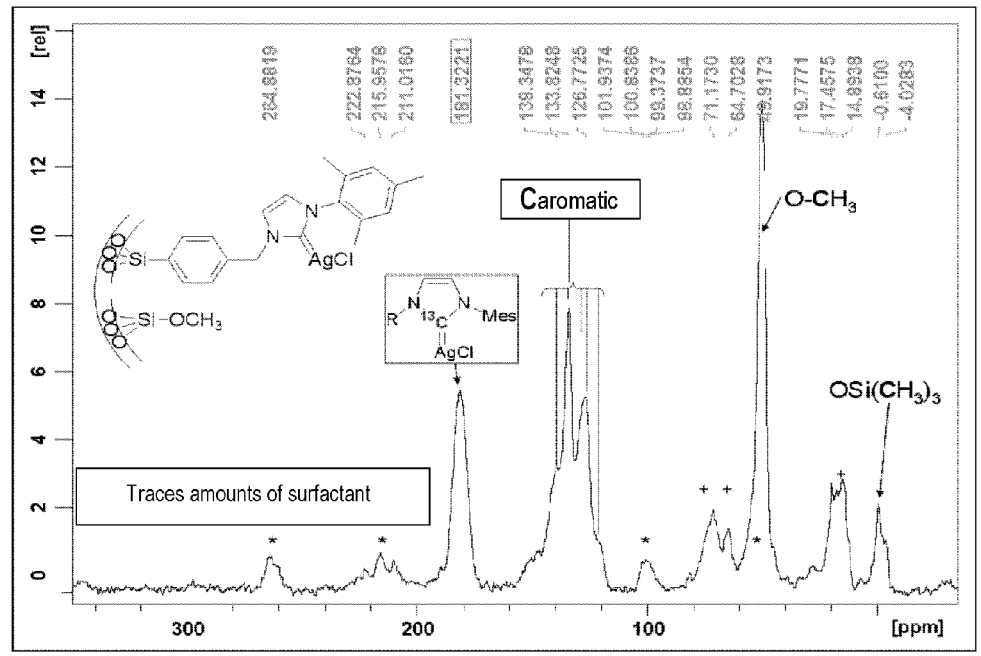
FIG. 30 is a $^{13}$C solid state NMR spectrum of the $^{13}$C labelled $P_{30HOMe}^{2MesAg}$ according to another embodiment of the present disclosure.

$^{13}$C CP-MAS solid state NMR (125.7 MHz): 0, 8, 18 (br), 50, 127, 134, 139, 181 ppm The $^{13}$C solid state NMR spectrum of the $^{13}$C labelled $P_{30HOMe}^{2MesAg}$ is represented in FIG. 30.

Synthesis of Material $P_{30HSi}^{2MesKRu_1}$.

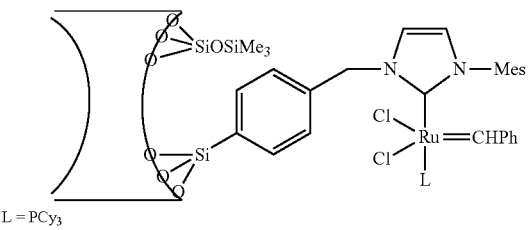

L = PCy$_3$

To a suspension of the material $P_{30HSi}^{2Mes}$ (0.25 g, ca. 0.091 mmol) in toluene (0.5 mL) was added 0.2 mL of a 0.5 M toluene solution of [K(N(SiMe$_3$)$_2$] (0.1 mmol). After stirring for 30 min, a solution of Cl$_2$(PCy$_3$)$_2$Ru(=CHPh) (0.1 g, 0.12 mmol) in 1 mL of toluene was added, and the reaction mixture was stirred for 16 h. After filtration, the solid was washed several times with toluene and dichloromethane until the filtrate became colourless. The material was then dried under vacuum ($10^{-5}$ mm Hg) at room temperature to yield 230 mg of a light beige solid $P_{30HSi}^{2MesKRu_1}$.

Analytical Data.

$^1$H solid state NMR (500 MHz): 0.0, 7.1, 7.6 ppm.

$^{13}$C CP-MAS solid state NMR (125.7 MHz): 0, 16, 26, 44, 127, 134, 140 ppm.

Elemental analyses: Si: 34.9%; N: 0.47%; Ru: 0.47%

Material $P_{30HSi}^{2MesKRu_{0.2}}$.

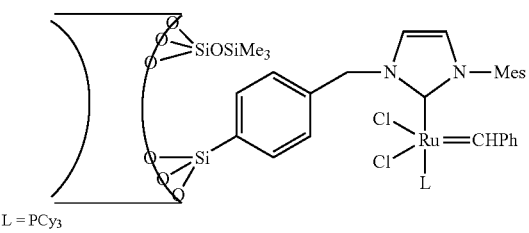

L = PCy$_3$

To a suspension of the material $P_{30HSi}^{2Mes}$ (0.25 g, ca. 0.091 mmol) in toluene (0.5 mL) was added 0.05 mL of a 0.5 M toluene solution of [K(N(SiMe$_3$)$_2$] (0.025 mmol). After stirring for 30 min, a solution of Cl$_2$(PCy$_3$)$_2$Ru(=CHPh) (0.02 g, 0.024 mmol) in 1 mL of dry toluene was added, and the reaction mixture was stirred for 16 h. After filtration, the solid was washed several times with toluene and anhydrous dichloromethane until the filtrate became colourless. The material was then dried under vacuum ($10^{-5}$ mm Hg) at room temperature to yield 220 mg of a light beige solid $P_{30HSi}^{2MesKRu_{0.2}}$.

Analytical Data.

$^1$H solid state NMR (500 MHz): 0.0, 7.1, 7.6 ppm.

$^{13}$C CP-MAS solid state NMR (125.7 MHz): 0.0, 16, 26, 44, 127, 134, 140 ppm.

Elemental analyses: Si: 33.01; N: 0.52; Ru: 0.19; P: 0.063 ppm (%).

Synthesis of Material $P_{30HOMeSi}^{2MesKRu}$.

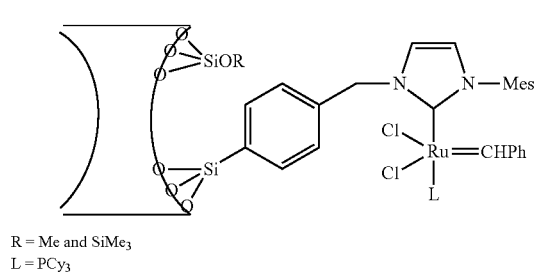

R = Me and SiMe$_3$
L = PCy$_3$

To a suspension of the material $P_{30HOMeSi}^{2Mes}$ (0.10 g, ca. 0.04 mmol) in toluene (1.0 mL), 0.1 mL of a 0.5 M toluene solution of [K(N(SiMe$_3$)$_2$] (0.05 mmol) was added. After stirring for 30 min, a solution of Cl$_2$(PCy$_3$)$_2$Ru(=CHPh) (0.08 g, 0.1 mmol) in 1 mL of dry toluene was added at 0° C., and the reaction mixture was stirred for 16 h at room temperature. After filtration, the solid was washed several times with toluene and anhydrous dichloromethane until the filtrate became colourless. The material was then dried under vacuum (10$^{-5}$ mm Hg) at room temperature to yield 90 mg of a light greenish material $P_{30HOMeSi}^{2MesKRu}$.

Analytical Data.

$^1$H solid state NMR (500 MHz): 0.0, 3.4, 7.1, 7.6 ppm.

$^{13}$C CP-MAS solid state NMR (125.7 MHz): 0.0, 16, 26, 49, 127, 135, 140 ppm.

Elemental analyses: Si: 34.82; Ru: 0.4(%).

Synthesis of Material $P_{30HSi}^{2MesKIr}$.

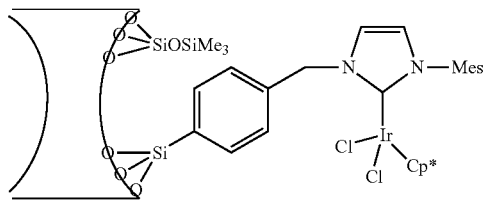

To a suspension of the material $P_{30HSi}^{2Mes}$ (0.10 g, ca. 0.046 mmol) in toluene (2.0 mL), 0.1 mL of a 0.5 M toluene solution of [K(N(SiMe$_3$)$_2$] (0.05 mmol) was added dropwise. After stirring for 20 min, a solution of [Cp*IrCl$_2$]$_2$ (0.04 g, 0.05 mmol) in 1 mL of tetrahydrofuran was added dropwise, and the reaction mixture was stirred for 14 h at 60° C. After filtration, the solid was washed several times with toluene, acetonitrile and methanol until the filtrate became colourless. The material was then dried under vacuum (10$^{-5}$ mm Hg) at room temperature to yield 0.11 g of a pale brown material $P_{30HSi}^{2MesKIr}$.

Analytical Data.

$^1$H solid state NMR (500 MHz): 0.0, 3.0, 6.1-7.6 ppm.

$^{13}$C CP-MAS solid state NMR (125.7 MHz): 0, 8, 14, 17, 25, 49, 126, 134 ppm

Synthesis of Material $P_{30HSi}^{2MesKIr}$.

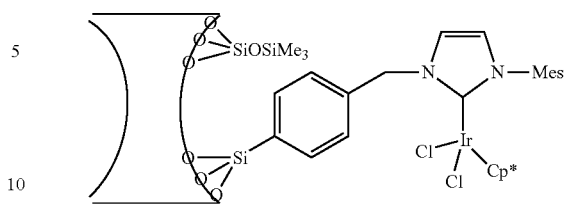

To a suspension of the material $P_{30HSi}^{2Mes}$ (0.10 g, ca. 0.046 mmol) in toluene (2.0 mL) was added 0.4 mL of a 0.5 M toluene solution of [K(N(SiMe$_3$)$_2$] (0.20 mmol). After stirring for 20 min, a solution of [Cp*IrCl$_2$]$_2$ (0.08 g, 0.10 mmol) in 1.5 mL of tetrahydrofuran was added dropwise, and the reaction mixture was stirred for 14 h at 60° C. After filtration, the solid was washed several times with toluene, acetonitrile and methanol until the filtrate became colourless. The material was then dried under vacuum (10$^{-5}$ mm Hg) at room temperature to yield 0.11 g of a pale brown material $P_{30HSi}^{2MesKIr}$.

Analytical Data.

$^1$H solid state NMR (500 MHz): 0.0, 1.0, 3.4, 6.0-7.6 ppm.

$^{13}$C CP-MAS solid state NMR (125.7 MHz): 0, 8, 17, 25, 49, 126, 134 ppm.

Elemental analyses: Si: 31.94; Ir: 3.24; Cl: 4.37(%).

Synthesis of Material $P_{30HOMe}^{2MesAg}$.

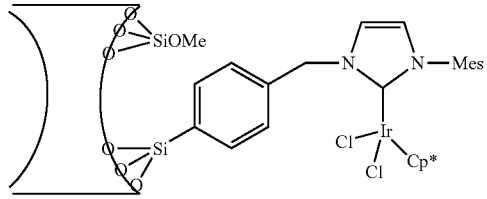

To a mixture of $P_{30HOMe}^{2MesAg}$ (100 mg, 0.033 mmol) and AgOC(CF$_3$)$_3$ (18 mg, 0.05 mmol), acetonitrile (1 mL) and toluene (1 mL) were added and stirred for 12 h at room temperature under argon atmosphere in the absence of light and then, [Cp*IrCl$_2$]$_2$ (20 mg, 0.02 mmol) in acetonitrile (0.5 ml) was added dropwise. After stirring for 24 h at 60° C., the reaction mixture was filtered, and the solid was washed several times with acetonitrile, dichloromethane and methanol until the filtrate was colourless) and finally dried.

Analytical Data.

$^1$H solid state NMR (500 MHz): 0.0, 3.4, 6.0-7.6 ppm.

$^{13}$C CP-MAS solid state NMR (125.7 MHz): 0, 8, 16-19 (br), 50, 128, 134, 152, 175 ppm.

Elemental analyses: Si: 25.61%; Ir: 6.83%

Figure 31:
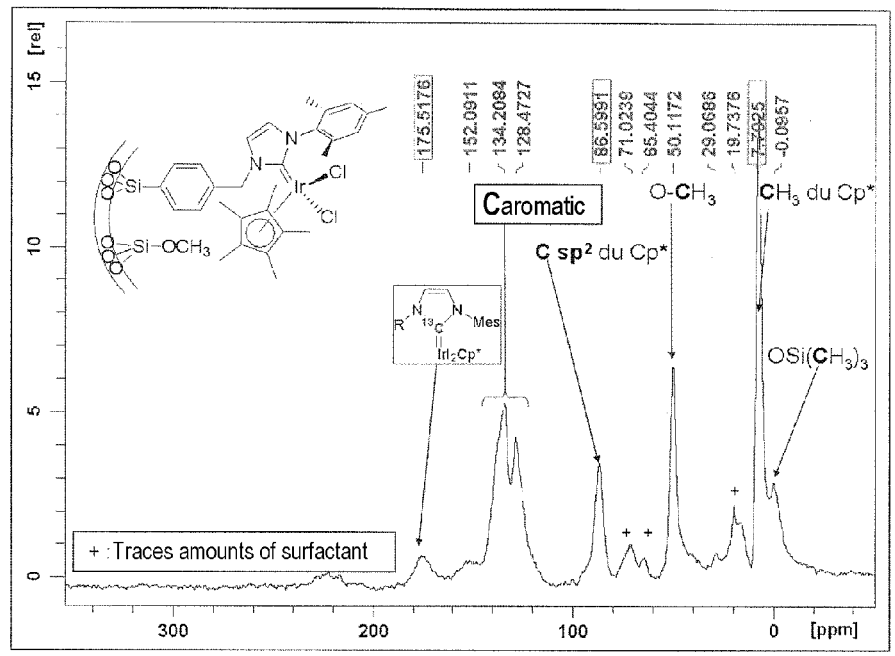
FIG. 31 is a $^{13}$C solid state NMR spectrum of the $^{13}$C labelled $P_{30HOMe}^{2MesAgIr}$ according to another embodiment of the present disclosure.

The $^{13}$C solid state NMR spectrum of the $^{13}$C labelled $P_{30HOMe}^{2MesAgIr}$ is represented in FIG. 31.

Synthesis of Material $P_{30HSi}^{2MesAg}$.

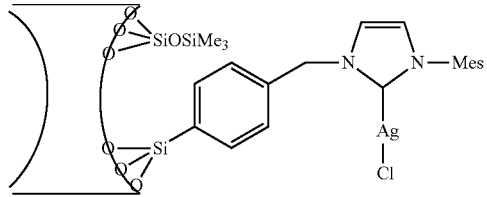

A mixture of $P_{30HSi}^{2Mes}$ (130 mg, 0.045 mmol) and AgOC(CF$_3$)$_3$ (40 mg, 0.11 mmol) in acetonitrile (2 mL) was stirred vigorously for 12 h at room temperature under argon atmosphere in absence of light. After filtration of the reaction mixture, the collected solid was washed several times with acetonitrile, dichloromethane and methanol to remove the excess of reagents and by-products. The compound was dried for 6 h under vacuum (10$^{-5}$ mm Hg) to give 129 mg of $P_{30HSi}^{2MesAg}$ as a grey solid.

Analytical Data.
$^1$H solid state NMR (500 MHz): 0.0, 2.9, 6.6, 7.1 ppm.
$^{13}$C CP-MAS solid state NMR (125.7 MHz): 0, 15, 18, 49, 125, 127, 130, 134, 140, 182 ppm Synthesis of Material $P_{30HOMeSi}^{2MesAg}$

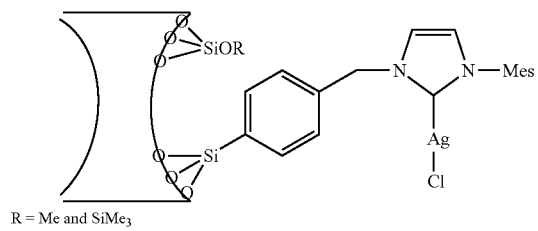

R = Me and SiMe$_3$ $P_{30HOMeSi}^{2Mes}$ (120 mg, 0.045 mmol) and AgOC(CF$_3$)$_3$ (40 mg, 0.11 mmol) was taken in dry acetonitrile (2 mL) and the mixture was well-stirred for 12 h at room temperature under argon atmosphere in absence of light. Then, the reaction mixture was filtered through sinter funnel. The collected solid was washed several times with acetonitrile, dichloromethane and methanol to remove the excess of reagents and by-product. The compound was dried for 6 h under vacuum (10$^{-5}$ mm Hg) which afforded 123 mg of $P_{30HOMeSi}^{2MesAg}$ as a grey solid.

Analytical Data.
$^1$H solid state NMR (500 MHz): 0.0, 3.50, 7.12, 7.81 ppm.
$^{13}$C CP-MAS solid state NMR (125.7 MHz): 0, 16, 19, 51, 127, 135, 137, 140, 182 ppm Overall Synthesis of Ru—NHC Containing Hybrid Material Using $P_{30}^1$ as the Starting Material.

Synthesis of Material $P_{30}^{1Mes}$.

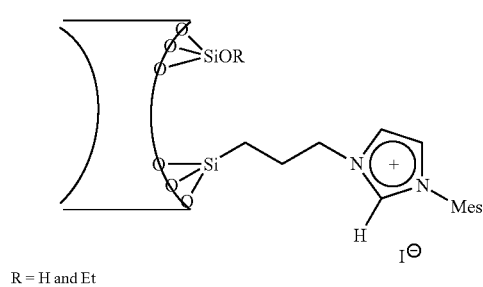

R = H and Et

A solution of mesitylimidazole (5.5 g, 0.03 mol) in toluene (60 mL) was added onto 3.0 g of $P_{30}^1$, and the reaction mixture was heated to reflux for 48 h. After filtration, the solid was washed successively with toluene, ethanol and diethyl ether. The solid was then extracted with ethanol for 48 h in a Soxhlet, and then washed with ethanol, acetone, diethylether before drying under vacuum overnight (135° C., 10$^{-5}$ mm Hg) to afford 3.1 g of a white material $P_{30}^{1Mes}$.

Analytical Data.
$^1$H solid state NMR (500 MHz): 0.7, 1.2, 3.4, 6.5 ppm.
$^{13}$C CP-MAS solid state NMR (125.7 MHz): 8.6, 16.3, 52, 59.1, 121-142 ppm.
Elemental analyses: Si: 32.01; N: 0.94(%).

Synthesis of Material $P_{30HSi}^{1Mes}$.

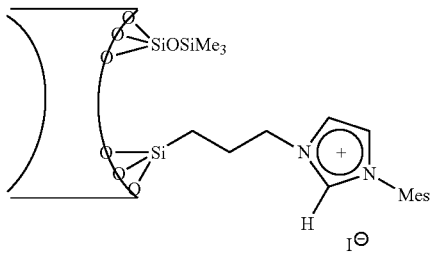

A mixture of a 1M aqueous solution of HI (300 mL) and 3.0 g of material $P_{30}^{1Mes}$ was stirred at 50° C. for 3 h, filtered, and the resulting solid was washed with water, acetone and diethyl ether. After drying under vacuum overnight at 135° C. (10$^{-5}$ mm Hg), the solid was treated with 75 mL of hexamethyldisilazane, and the resulting reaction mixture was heated at reflux under argon for 48 h. After filtration at room temperature, the solid was washed with toluene (3 times), acetone (3 times) and diethyl ether (3 times). Drying under vacuum overnight at 135° C. (10$^{-5}$ mm Hg) afforded 2.7 g of a yellowish solid material $P_{30HSi}^{1Mes}$.

Analytical Data.
$^1$H solid state NMR (500 MHz): 0.0, 6.0-7.6 ppm.
$^{13}$C CP-MAS solid state NMR (125.7 MHz): 0.0, 7.7, 16-19.7, 50.0, 126-134.0, 175.5 ppm
Elemental analyses: Si: 34.08; N: 0.74(%).

Synthesis of Material $P_{30OMeSi}^{1Mes}$.

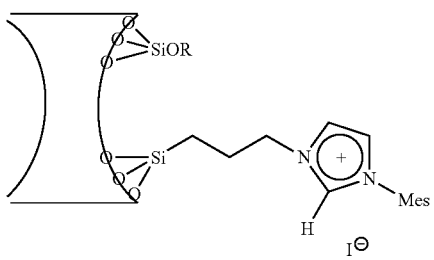

R = Me and SiMe$_3$

The material $P_{30}^{1Mes}$ (1.4 g) was treated in a Soxhlet with anhydrous methanol dried over Mg for 48 h, and then washed with methanol, diethyl ether. After drying under vacuum overnight (135° C., 10$^{-5}$ mm Hg), the white powder was treated with PTSA (6 mg, 0.03 mmol) and anhydrous methanol (30 mL), and the reaction mixture was heated to reflux for 4 h. The supernatant solution was filtered off, and replaced by a fresh solution of PTSA (6 mg, 0.03 mmol) in anhydrous methanol (30 mL) for an additional treatment at reflux for 12 h. After filtration at room temperature, the solid was successively washed with methanol (3 times), dichloromethane (3 times) and diethylether (3 times), and then dried under vacuum (10$^{-5}$ mm Hg, overnight at 135° C.) to yield 1.1 g of a white material. Then, this material was suspended in toluene (30 mL) and triethylamine (0.9 mL) before addition of bromotrimethylsilane (0.25 mL). After stirring at 25° C. for 12 h, the reaction mixture was filtered and the resulting solid was washed successively with toluene, methanol and ether, and then dried under vacuum ($10^{-5}$ mm Hg, overnight at 135° C.) to yield 1.05 g of a white material $P_{30OMeSi}^{1Mes}$.

Analytical Data.

$^1$H solid state NMR (500 MHz): 0.0, 2.1, 3.4, 6-7.6 ppm.

$^{13}$C CP-MAS solid state NMR (125.7 MHz): 0.0, 9, 18, 22.7, 25.7, 50, 129-141 ppm Elemental analyses: Si: 36.1; N: 0.71, C: 6.9(%).

Synthesis of Material $P_{30HOMe}^{1MesAg}$

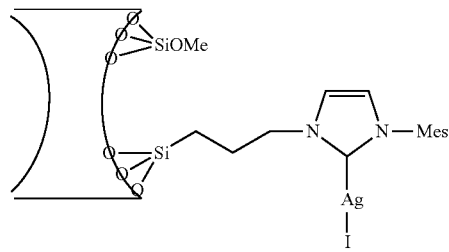

A mixture of $P_{30HOMe}^{1Mes}$ (150 mg, 0,048 mmol) and AgOC(CF$_3$)$_3$ (48 mg, 0.14 mmol) in acetonitrile (2 mL) was stirred vigorously for 12 h at room temperature under argon atmosphere in absence of light. Then, the reaction mixture was filtered, and the collected solid was washed successively several times with acetonitrile, dichloromethane and methanol to remove the excess of reagents and by-product. The compound $P_{30HOMe}^{1MesAg}$ was dried for 6 h under vacuum ($10^{-5}$ mm Hg) to give 128 mg of a grey solid.

Analytical Data.

$^1$H solid state NMR (500 MHz): 1.1, 3.4, 5.7, 6.7 ppm.

$^{13}$C CP-MAS solid state NMR (125.7 MHz): 7, 9, 15, 17, 25, 48, 122, 123, 128, 129, 135, 138, 139 ppm.

Synthesis of Material $P_{30HOMe}^{1MesAgRu}$

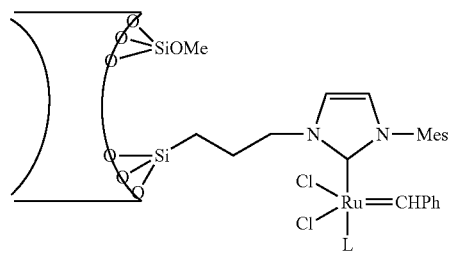

To $P_{30HOMe}^{1MesAg}$ (135 mg, 0.058 mmol) in 2 mL of dry toluene was added a mixture of Cl$_2$(PCy$_3$)$_2$Ru(=CHPh) (60 mg, 0.073 mmol) in dry toluene (1 mL). After stirring for 12 h at room temperature under argon atmosphere in absence of light, the reaction mixture was filtered, and the collected solid was washed several times with toluene and dichloromethane to remove the excess of reagents and by-products. The compound $P_{30HOMe}^{1MesAgRu}$ was dried for 6 h under vacuum ($10^{-5}$ mm Hg) to afford 117 mg of a grey solid.

Synthesis of Material $P_{30HSi}^{1MesAgRu}$

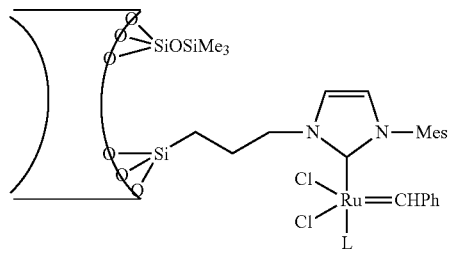

A mixture of $P_{30HSi}^{1MesAg}$ (150 mg) and AgOC(CF$_3$)$_3$ (50 mg, 0.14 mmol) in tetrahydrofuran (1 mL) was stirred vigorously for 12 h at room temperature under argon atmosphere in absence of light. After that, the reaction mixture was treated with a solution of Cl$_2$(PCy$_3$)2Ru(=CHPh) (130 mg, 0.16 mmol) in 2 mL of toluene and stirred for 12 h. Then, the reaction mixture was filtered, and the collected solid was washed successively several times with toluene, dichloromethane and ether to remove the excess of reagents and by-product. The compound $P_{30HSi}^{1MesAgRu}$ was dried for 6 h under vacuum ($10^{-5}$ mm Hg) to give 125 mg of a grey solid.

Analytical Data.

$^1$H solid state NMR (500 MHz): 0.0, 1.1, 1.8, 3.7, 6.8 ppm.

$^{13}$C CP-MAS solid state NMR (125.7 MHz): 0, 9, 17, 26, 51, 118, 121, 124, 128, 131, 134, 138, 139 ppm.

$^{31}$P{1H}NMR: 28-37 (br), 41-42 (br) ppm.

Synthesis of Material $P_{30HSi}^{1MesKRu}$.

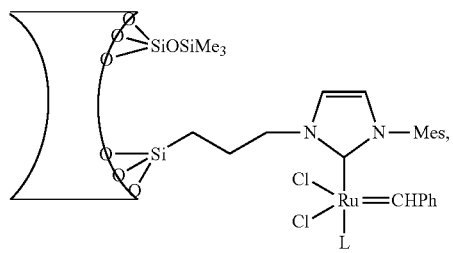

L = PCy$_3$

To a suspension of $P_{30HSi}^{1Mes}$ (200 mg) in 0.5 mL of chlorobenzene was added 0.2 mL of a 0.5 M toluene solution of [K(N(SiMe$_3$)$_2$]. After stirring for 30 min, the reaction mixture was treated with a solution of Cl$_2$(PCy$_3$)$_2$Ru(=CHPh) (0.075 g, 0.09 mmol) in 2 mL of chlorobenzene and stirred for 16 h. After filtration, the solid was washed several times with toluene and anhydrous dichloromethane until the filtrate became colorless, and then dried under vacuum ($10^{-5}$ mm Hg) at room temperature to yield 165 mg of a light grey material $P_{30HSi}^{1MesKRu}$.

Analytical Data.

$^1$H solid state NMR (500 MHz): 0.0, 3.1, 6.5 ppm.

$^{13}$C CP-MAS solid state NMR (125.7 MHz): 0.0, 9, 18, 24, 26, 32, 52, 121-141 ppm.

$^{31}$P{1H}NMR: 32-34, 49.9 ppm.

Elemental analyses: Si: 19.8; N: 0.43; Ru: 1.08; P: 0.98 (%).

Synthesis of Material $P_{30OMeSi}^{1MesKRu}$.

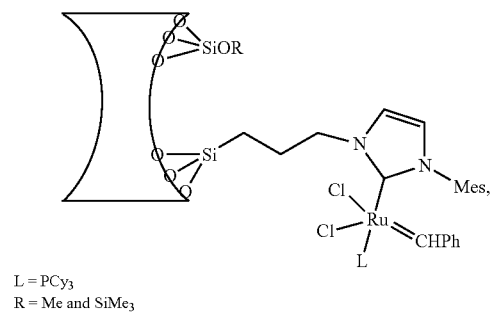

L = PCy$_3$
R = Me and SiMe$_3$

To a suspension of $P_{30OMeSi}^{1Mes}$ (150 mg) in 1 mL of toluene was added 0.14 mL of a 0.5 M toluene solution of [K(N(SiMe$_3$)$_2$]. After stirring for 30 min, the reaction mixture was treated with a solution of Cl$_2$(PCy$_3$)$_2$Ru(=CHPh) (0.56 g) in 5 mL of toluene and stirred for 16 h. After filtration, the solid was washed several times with toluene and anhydrous dichloromethane until the filtrate became colorless, and then dried under vacuum (10$^{-5}$ mm Hg) at room temperature to yield 135 mg of a light brown material $P_{30OMeSi}^{1MesKRu_1}$.

Analytical Data.
$^1$H solid state NMR (500 MHz): 0, 3.5, 6.5 ppm.
$^{13}$C CP-MAS solid state NMR (125.7 MHz): 0.0, 9, 18, 26, 50, 121-141 ppm.
Elemental analyses: Si: 29.64; Ru: 0.68; P: 0.34(%).

Synthesis of Pd—NHC Containing Hybrid Material Using as the Starting Material

Synthesis of Material $W_{19HSi}^{7}$

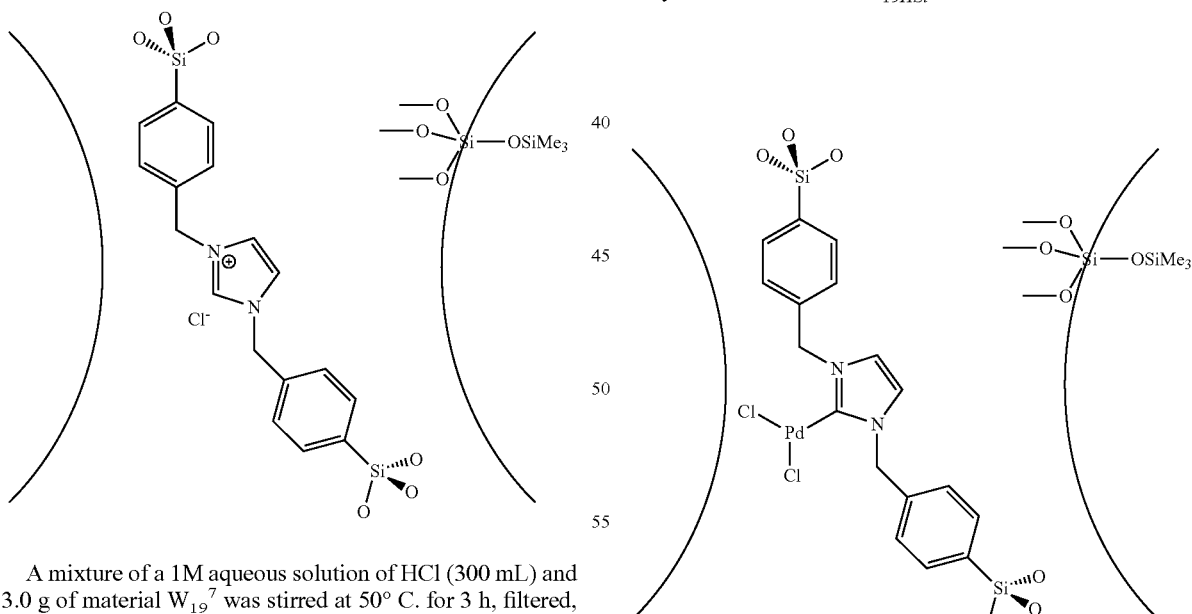

A mixture of a 1M aqueous solution of HCl (300 mL) and 3.0 g of material $W_{19}^{7}$ was stirred at 50° C. for 3 h, filtered, and the resulting solid was washed with water, acetone and diethyl ether. After drying under vacuum overnight at 135° C. (10$^{-5}$ mm Hg), the solid was treated with 75 mL of hexamethyldisilazane, and the resulting reaction mixture was heated at reflux under argon for 48 h. After filtration at room temperature, the solid was washed with toluene (3 times), acetone (3 times) and diethyl ether (3 times). Drying under vacuum overnight at 135° C. (10$^{-5}$ mm Hg) afforded 2.7 g of a brownish solid material $W_{19HSi}^{7}$.

Synthesis of Material $W_{19HSi}^{7Pd(OAc)_2}$

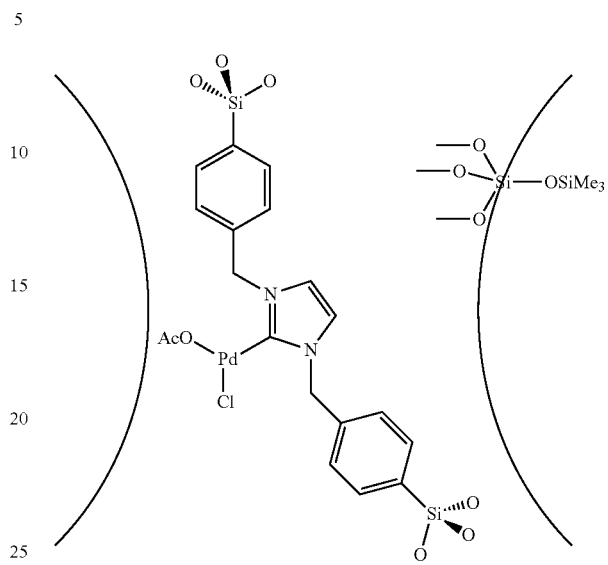

The solid $W_{19HSi}^{7}$ (300 mg, 0.19 mmol) was suspended under Argon in a mixture of Pd(OAc)$_2$ (44 mg, 0.19 mmol) in THF (8 mL). The reaction mixture was stirred at room temperature for 5 h, the solvent was evaporated and the material was washed 3 times with THF and dried under vacuum (10$^{-5}$ mbar, 12 h).

Synthesis of Material $W_{19HSi}^{7BPdCl_2}$.

The solid $W_{19HSi}^{7}$ (300 mg, 0.19 mmol) was suspended under Argon in a mixture of PdCl$_2$ (33.7 mg, 0.19 mmol) and BEMP (52 mg, 0.19 mmol) in THF (8 mL). The reaction mixture was stirred at room temperature for 5 h, the solvent was evaporated and the material was washed 3 times with THF and dried under vacuum (10$^{-5}$ mbar, 12 h).

Synthesis of Material $W_{19HSi}{}^{7BPdCl_2COD}$.

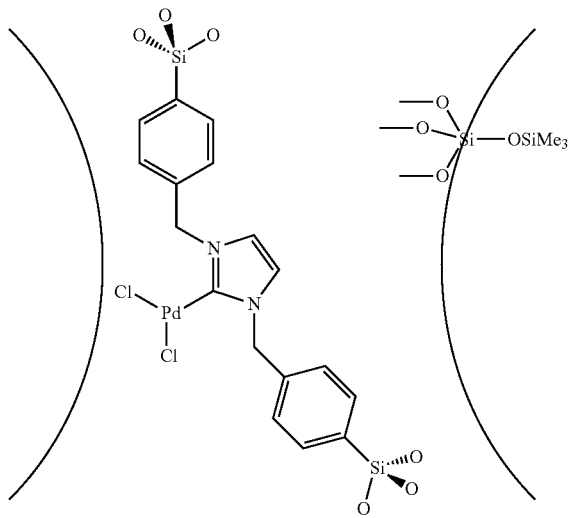

The solid $W_{19HSi}{}^7$ (300 mg, 0.19 mmol) was suspended under Argon in a mixture of CODPdCl$_2$ (53 mg, 0.19 mmol) and BEMP (52 mg, 0.19 mmol) in THF (8 mL). The reaction mixture was stirred at room temperature for 5 h, the solvent was evaporated and the material was washed 3 times with THF and dried under vacuum (10$^{-5}$ mbar, 12 h).

Catalytic Performances of Ruthenium Containing Materials Starting from $P_{30}{}^2$:

Ethyl Oleate self-metathesis with material $P_{30Si}{}^{2MesKRu_1}$.

Representative procedure. In a glove—Representative procedure. In a glove-box, 2 mL of ethyl oleate (5.54 mmol) was added onto 10 mg of $P_{30Si}{}^{2MesKRu_1}$ (0.47% Ru) (EO/Ru=12000). Aliquots of the supernatant solution were withdrawn, quenched with ethyl acetate and filtered over a Celite pad, and the conversion (conv.) was monitored by gas chromatography using a FAME column (Molref).

$$Conv. = \frac{\sum Diester + \sum Alkene}{\sum Diester + \sum Alkene + \sum Ester} \times 100$$

TABLE 1

| Catalyst | EO/Ru | Temp/°C. | Conv. (time) | TOF$^a$ | Eq. time/min |
|---|---|---|---|---|---|
| $P_{30Si}{}^{2MesKRu_1}$ | 12000 | 30 | 3.5% (1 h) | 48 (5 min) | 8880 |
| $P_{30Si}{}^{2MesKRu_1}$ | 12000 | 40 | 8% (1 h) | 48 (5 min) | 1800 |
| $P_{30Si}{}^{2MesKRu_{0.2}}$ | 29740 | 30 | 5% (5 h) | 5 (5 h) | 5760$^c$ |
| $P_{30Si}{}^{2MesKRu_{0.2}}$ | 29740 | 40 | 20% (5 h) | 30 (10 min) | 1800 |
| G2-Bn | 42000 | 30 | 12.6% (5 h) | 30$^b$ | 1440 |
| $P_{30HSi}{}^{1MesKRu_1}$ | 9340 | 30 | 10.8% (1 h) | 16 (1 h) | 1440 |
| $P_{30OMeSi}{}^{1MesKRu_1}$ | 10000 | 20 | 3.2% (1 h) | 5 (1 h) | 1800$^c$ |

TABLE 1-continued

| Catalyst | EO/Ru | Temp/°C. | Conv. (time) | TOF$^a$ | Eq. time/min |
|---|---|---|---|---|---|
| $P_{30OMeSi}{}^{1MesKRu_1}$ | 10000 | 40 | 17.5% (1 h) | 67 (5 min) | 1200 |
| G2-Pr | 42560 | 30 | 2.3% (1 h) | 50 (1 h) | 600 |

$^a$The TOF (min$^{-1}$) at a defined time (between brackets).
$^b$The TOF was measured after the end of the induction period.
$^c$The experiment was stopped after reaching 45% conversion.

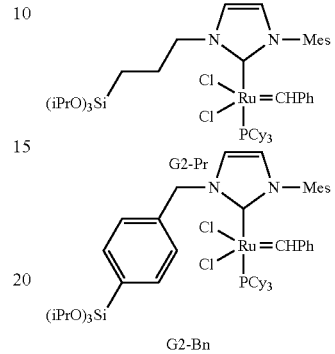

G2-Pr

G2-Bn

Recycling. In a glovebox, 0.4 mL of ethyl oleate (1.11 mmol) was added onto 50 mg of material P8a $P_{30HSi}{}^{2MesKRu_1}$ (0.47% Ru) (EO/Ru=480) at room temperature (30° C.) during 6 hours. After decantation, an aliquot of supernatant solution was taken, filtered over a Celite pad and analysed by GC-FAME. After the supernatant liquid phase was removed and the solid phase was washed twice with 2 mL of toluene, then a fresh substrate (0.4 mL) was added for the next run. Seven consecutive runs have been performed using this procedure with no loss of conversion.

Figure 32:
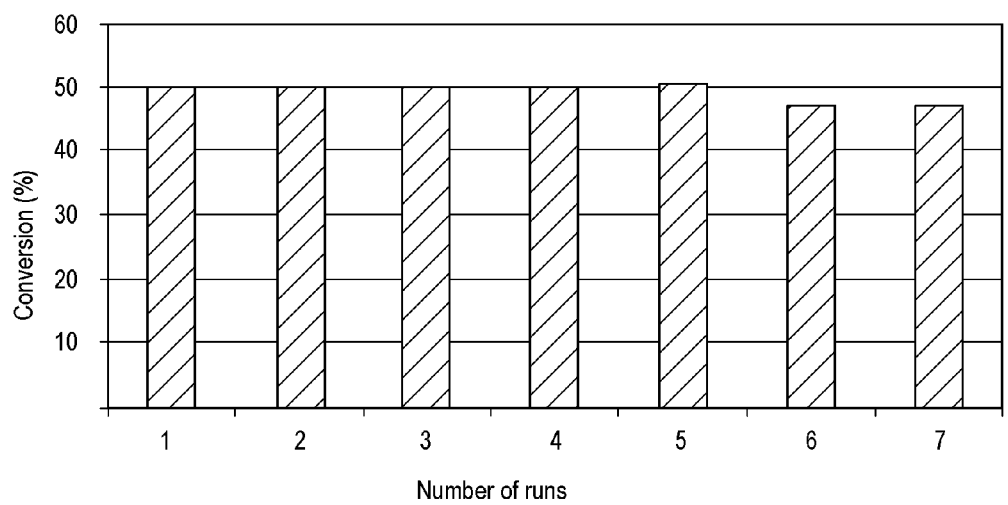
FIG. 32 is a recycling of $P^{30HSi}_{2MesKRu}1$ (Ratio Substrate/Catalyst=480) according to another embodiment of the present disclosure.

The recycling of $P_{30HSi}{}^{2MesKRu_1}$ (Ratio Substrat/Catalyst=480) is represented in FIG. 32.

Leaching. Analysis by ICP of the supernatant solution resulting from the catalytic self-metathesis of Ethyl Oleate with Ru-loaded materials $P_{30HSi}{}^{2MesKRu_1}$ showed the absence of Ru (<50 ppm).

Catalytic Performances of Iridium Containing Materials:

HID exchange reaction. Representative procedure. Acetophenone, 2% mol of catalyst and 4 mol % of AgOTf in methanol-d4 were stirred at 100° C. in Young-style NMR-tube, and the reaction was monitored by NMR. Acetophenone showed quantitative deuteration at the alpha-positions

TABLE 2

| Catalyst | Substrate/Cat. | Converions (%) | Time (min) |
|---|---|---|---|
| Ir-Me | 50 | 99.8 | 5 |
| Ir-Ms | 50 | 98.5 | 5 |
| $P_{30HOMeSi}{}^{3MeAgIr}$ | 50 | 94.7 | 15 |
| $P_{30HOMi}{}^{2MesAgIr}$ | 50 | 93.8 | 15 |

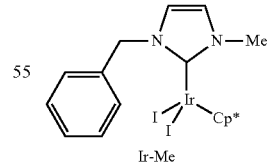

Ir-Me

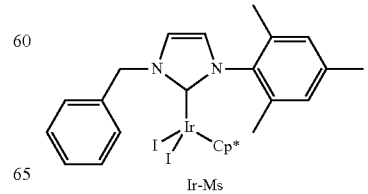

Ir-Ms

Recycling Test of $P_{30HOMeSi}^{3MeAgIr}$. Representative procedure. To Material $P_{30HOMeSi}^{3MeAgIr}$ (30 mg, 2 mol ° A) of Ir; Substrate/Ir=50) and AgOTf (10 mg, 4 mol %) in a Young-style NMR tube. Acetophenone (60 mg, 0.5 mmol) was added $CD_3OD$ (0.5 mL), and the reaction mixture was heated at 100° C. for 15 min. After cooling the NMR-tube, proton NMR was recorded. Then, after the solid settled down, the supernatant was removed, the solid was washed twice with $CD_3OD$ (0.5 mL+0.5 mL), and then a fresh batch of substrate (60 mg, 0.5 mmol) was added for the next run. Three consecutive runs have been performed following the same procedure, which indicated no loss of activity of the material.

Recycling Test of $P_{30HOMi}^{2MesAgIr}$. Recycling test with $P_{30HOMi}^{2MesAgIr}$ showed similar results to what has been obtained for $P_{30HOMeSi}^{3MeAgIr}$.

EXAMPLES PART V

Catalytic Performances of Palladium Containing Materials Starting from $W_{19HSi}^{7Pd(OAc)_2}$:

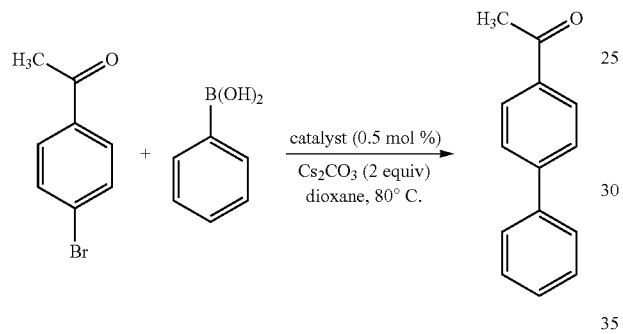

Cross-Coupling of Phenylboronic Acid and p-Bromoacetophenone with the Material as the Catalyst. Representative Procedure.

A mixture of 100 mg of material $W_{19HSi}^{7Pd(OAc)2}$ (0.00445 mmol of Pd, 0.5 $_{mol}$% Pd), boronic acid (163 mg (1.33 mmol)), p-bromoacetophenone (177 mg, 0.89 mmol) and cesium carbonate (570 mg, 3 mmol) and dioxane (3 mL) was stirred at 80° C. The conversion of p-bromoacetophenone was monitored over time using gas chromatography equipped with a HP5 column.

Cross-Coupling of Phenylboronic Acid and p-Bromoacetophenone with a Homogeneous Catalyst. Representative Procedure.

A mixture of $Pd(OAc)_2$ (16.8 mg, 0.075 mmol, 0.5 $_{mol}$% Pd), bis-mesitylimidazolium chloride (25.6 mg, 0.075 mmol) and $CsCO_3$ (5.76 g (30 mmol)) in 30 mL of dioxane was heated for 30 min at 80° C. under vigorous stirring. To the reaction mixture cooled down were added boronic acid (2.74 g, 22.5 mmol) and p-bromoacetophenone (3.0 g, 15 mmol). Then the reaction mixture was heated at 80° C. The conversion of p-bromoacetophenone was monitored over time using gas chromatography equipped with a HP5 column.

TABLE 3

| Catalyst | Reaction | Time | Conv. |
|---|---|---|---|
| $Pd(OAc)_2$ + IMes.Hcl | Suzuki | 300 min | 100% |
| $W_{19HSi}^{7Pd(OAc)2}$ | Suzuki | 300 min | 92% |

The invention claimed is:

1. Porous structured material obtained by a sol-gel method using a structure directing agent, which comprises organometallic-inorganic component (A) comprising a stabilized carbene, silylene, or germylene chosen among the components of formula II:

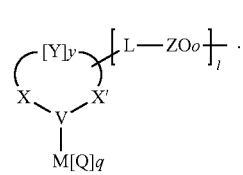

wherein:
Z is a silicon atom:
o is 1.5;
V is a carbon atom (C), a silicon atom (Si), or a germanium atom (Ge);
M is a metal selected from the group consisting of lanthanides and metals from group 3 elements to group 11 elements (III B to I B):
Q is a ligand, and q is an integer between 0 and 11 as a function of the metal, the ligands Q could be the same or different and could be linked together to form a cyclic group in a 3 to 8 membered ring;
Q is selected from the group consisting of hydrogen, halide, $C_{1-20}$ alkyl, $C_{5-20}$ aryl, $C_{1-20}$ alkoxy and thio$C_{1-20}$alkoxy, $C_{5-20}$ aryloxy an thio$C_{5-20}$aryloxy, $C_{1-20}$ alkyldiketonate, diketiminate ligand (such as the NacNac: $CH[C(Me)NAr]_2^-$, Ar=2,6-$Me_2C_6H_3$), $C_{1-20}$ alkoxycarbonyl, $C_{5-20}$ arylcarbonyl, $C_{1-20}$ acyl, $C_{1-20}$ alkylsulfonato, $C_{5-20}$ arylsulfonato, $C_{1-20}$ alkylsulfanyl, $C_{5-20}$ arylsulfanyl $C_{1-20}$ alkylsulfinyl, $C_{5-20}$ arylsulfinyl $C_{1-20}$ alkylcarboxylate, $C_{5-20}$ arylcarboxylate, $C_{1-20}$ alkylsilyl, $C_{5-20}$ arylsilyl, such groups being unsubstituted or substituted with one or more moieties selected from the group consisting of $C_{1-10}$ alkoxy, $C_{1-10}$ alkyl, $C_{5-10}$ aryl, cyclopentadienyl, amido, imido, phosphido, nitrido, alkene, alkyne, arene, phosphane, sulfonated phosphane, phosphate, phosphinite, arsine, ether, amine, amide, imine, sulfoxide, carboxyl, nitrosyl, pyridine, substituted pyridine, imidazole, substituted imidazole, pyrazine, substituted pyrazine, and thioether;
X and X' are each independently selected from the group consisting of carbon and a heteroatom, the heteroatom being selected from the group consisting of nitrogen (N), oxygen (O), sulphur (S), and phosphorus (P), provided that at least one of X or X' is a heteroatom, eventually substituted if not bonded to L, by an hydrogen atom H or a R substituent;
y is an integer between 0 and 10;
Y is a divalent radical from 1 to 6 atoms including a substituted hydrocarbylene, a hydrocarbylene comprising at least a heteroatom, or a substituted hydrocarbylene comprising at least a heteroatom and forming a ring between X and X' when y is between 1 and 10, or if y is 0, X and X' can be directly linked or not;
L is a divalent radical comprising a hydrocarbylene bonding X or X' or any of the divalent radical Y, respectively including a substituted hydrocarbylene, a hydrocarbylene comprising a heteroatom, or substituted hydrocarbylene comprising a heteroatom, like a $C_{1-10}$ alkylene, a $C_{6-40}$ arylene substituted or not;

l is an integer comprised between 1 and 2(2+y);

R is selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine, and thioether;

R may be identical or different from one organometallic organic-inorganic component to another; and said component (A) is an integral part of the porous structured material and being regularly distributed within the porous structured material via siloxy bonds.

2. The material of claim 1, wherein the material is obtained by a method comprising at least the following steps:
a) a sol-gel step, with at least a mono or disilylated carbene, silylene or germylene precursor of formula V:

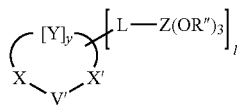

V wherein:
R" is selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine, and thioether, and optionally with trialkoxyalkylmetalloid and/or peralkoxymetal/metalloid of formula $RaSi(ORb)_3$, or $Z'(ORa)_x Z'(OH)x$ or $Z'(O-)_{x}.(x/n)(E^{n+})$ where Ra and Rb may be identical or different and are each selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine, and thioether, x, n and E being a cation chosen among $K^+$, $Na^+$, and $Ca^{2+}$; and the sol-gel step is done in a presence of a structure directing agent and can be achieved in water with or without co-solvents or in an appropriate polar solvent along with water, using hydrolysis-condensation catalysts chosen among bases, acids, or nucleophilic compounds to obtain a compound of formula III:

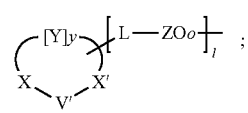

III b) optionally treating the compound of formula III to remove surfactant;
c) contacting the compound of formula III with a base or a silver compound; and
d) simultaneously or subsequently reacting the material obtained in step c) with a metal complex under conditions so as to form a material of formula IV:

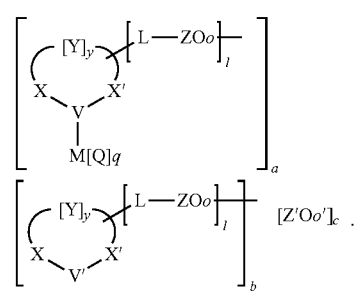

IV

3. The material of claim 1, wherein the material is obtained by a method comprising at least the following steps:
a) a sol-gel step, with at least an organometallic mono or disilylated carbene, silylene or germylene precursor of formula VI:

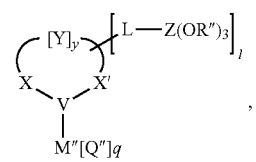

VI wherein:
M" is M or another selected from the group consisting of lanthanides and metals from group 3 elements to group 11 elements (III B to I B);
Q" is Q or another ligand according to the Q definition; and
R" is selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine, and thioether, and optionally with trialkoxyalkylmetalloid and/or peralkoxymetal/metalloid of formula $RaSi(ORb)_3$, or $Z'(ORa)_x Z'(OH)x$ or $Z'(O-)_{x}.(x/n)(E^{n+})$ where Ra and Rb may be identical or different and are each selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine, and thioether, x, n and E being a cation, preferably chosen among $K^+$, $Na^+$, and $Ca^{2+}$, and the sol-gel step is done in a presence of a structure directing agent and can be achieved in water with or without co-solvents or in an appropriate polar solvent along with water, using hydrolysis-condensation catalysts chosen among bases, acids or nucleophilic compounds to obtain a compound of formula III:

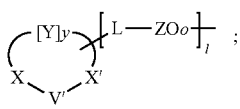

b) optionally treating the compound of formula III to remove surfactant; and c) optionally, when M" is different from M, subjecting the compound of formula III obtained to an in-situ transmetallation or contacting the compound of formula III with an appropriate component to obtain a desired material of formula IV:

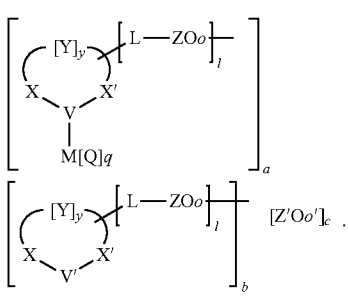

4. The material of claim 1, wherein the organometallic-inorganic component is chosen among the components of formulas IIa or IIb:

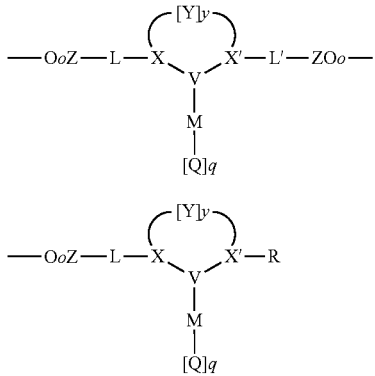

wherein;

Z, o, V, M, Q, y, and R are as previously defined;

X' X and X' are each independently selected from carbon or heteroatom, the heteroatom being selected from nitrogen N, oxygen O, sulphur S or phosphorus P, provided that at least one of X or X' is a heteroatom, L and L' are divalent linkers, each individually comprising a hydrocarbylene bonding X or X', respectively including a substituted hydrocarbylene, a hydrocarbylene comprising a heteroatom, or substituted hydrocarbylene comprising a heteroatom, like a $C_{1-10}$ alkylene, a $C_{6-40}$ arylene substituted or not, provided that when the organometallic part is a part of the organic-inorganic framework via only one covalent bond one of the L or L' is replaced by an R substituent, Y is a divalent radical from 1 to 6 atoms including an unsubstituted hydrocarbylene, a substituted hydrocarbylene, a hydrocarbylene comprising at least a heteroatom, or a substituted hydrocarbylene comprising at least a heteroatom and forming a ring between X and X' when y is comprised between 1 to 10, or if y is 0, X and X' can be directly linked or not.

5. The material of claim 1, wherein said porous structured material further comprises at least a component (B) comprising at least:

an inorganic part selected from metalloid-oxygen units of formula $—ZO_o$, wherein Z and o are as previously defined; and an organic part consisting of (i) a stabilized carbene, silylene, or germylene, or (ii) a precursor of a stabilized carbene, silylene, or germylene, wherein:

the organic part is bonded to the inorganic part via at least one covalent bond, the component (B) is an integral part of the porous structured material and is regularly distributed within the porous structured material via siloxy bonds, the components (A) and (B) have an identical or a different inorganic part, and the components (A) and (B) have an identical or a different stabilized carbene, silylene or germylene.

6. The material of the previous claim 5, wherein the organic-inorganic component may be chosen among radicals of formula III:

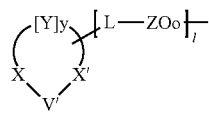

wherein:

V' can be identical to V or be a precursor to V that can be a $sp^2$ C—H along with a counter-anion, or a $sp^a$ C(—H)(A), A is selected from the group consisting of $C_{1-20}$ alkyl, halogeno-$C_{1-20}$ alkyl, $C_{5-20}$ aryl, halogeno-$C_{5-20}$ aryl, $C_{1-20}$ alkoxy, $C_{5-20}$ aryloxy, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine, and thioether; and L, l, X, X', Y, Z, and o are as defined herein above and may be identical or different from one organic-inorganic component to another.

7. The material of claim 5, wherein the organic-inorganic component may be chosen among the components of formulas IIIa and IIIb:

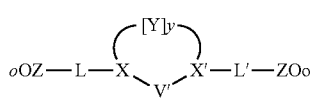

-continued

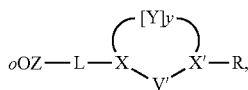
IIIb wherein V', R, L, l, X, X', Y, Z, and o are as defined herein above and may be identical or different from one organic-inorganic component to another.

8. The material of claim 1, further comprising at least an inorganic component (C) selected from a metalloid-oxide defined as $Z'O_{o'}$, wherein:
the Z' atom may be selected from the group consisting of silicon (Si), zirconium (Zr), titanium (Ti), aluminium (Al), Nobium (Nb), Indium (In), and Tantalum (Ta);
o' is 2 when Z' is Si, Zr, or Ti;
o' is 1.5 when Z' is Al or In; and
o' is 2.5 when Z' is Nb or Ta.

9. The material of the previous claim 8, wherein Z' is silicon and o' is 2.

10. The material of claim 1 consisting of the compounds of formula IV:

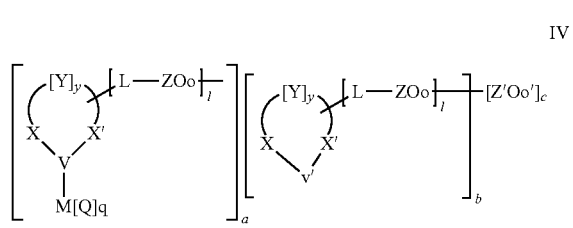
IV with b/a=r' with 0≤r'≤1000; and
with 1≤(a+b+c)/(a+b)≤1000:
wherein:
L, X, X', Y, Z, V, l, o, and y are as defined herein above and may be identical or different from one organometallic-inorganic component to another; they may be identical or different from one organic-inorganic component to another, identical or different from the organometallic-inorganic component to the organic-inorganic component;
L' is a divalent linker comprising a hydrocarbylene bonding X', including a substituted hydrocarbylene, a hydrocarbylene comprising a heteroatom, or substituted hydrocarbylene comprising a heteroatom, like a $C_{1-10}$ alkylene, a $C_{6-40}$ arylene substituted or not, provided that when the organometallic part is a part of the organic-inorganic framework via only one covalent bond one of the L or L' is replaced by an R substituent;
V' can be identical to V or be a precursor to V that can be a $sp^2$ C—H along with a counter-anion, or a $sp^3$C(—H)(A), A is selected from the group consisting of $C_{1-20}$ alkyl, halogeno-$C_{1-20}$ alkyl, $C_{5-20}$ aryl, halogen-$C_{5-20}$ aryl, $C_{1-20}$ alkoxy, $C_{5-20}$ aryloxy, which can be substituted with one or more moieties selected from the group consisting of $C_{1-10}$ alkoxy, phosphine, sulfonatedphosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether;
Z' is selected from silicon (Si), zirconium (Zr), titanium (Ti), aluminium (Al), Nobium (Nb), Indiwn (In), and Tantalum (Ta):

o' is 2 when Z' is Si, Zr, or Ti;
o' is 1.5 when Z' is Al or In; and
o' is 2.5 when Z' is Nb or Ta.

11. The material of claim 1, the porous material being structured in a one or two dimensional hexagonal array of pores or in a cubic or wormlike arrangement of the pores.

12. The material of claim 1, said material comprising a three-dimensional framework that can be crystalline, amorphous or quasi-crystalline and further contains a series of pores and/or channels.

13. The material of claim 1, said material having a mean pore diameter from 20 to 500 Å.

14. The material of claim 1, further comprising:
a component (B) comprising:
an inorganic part selected from metalloid-oxygen units of formula —$ZO_o$, wherein Z and o are as previously defined; and
an organic part consisting of (i) a stabilized carbene, silylene, or germylene, or (ii) a precursor of a stabilized carbene, silylene, or germylene, the organic part being bonded to the inorganic part via at least one covalent bond; and
an inorganic component (C) selected from a metalloid-oxide defined as $Z'O_{o'}$, wherein the Z' atom is selected from silicon (Si), zirconium (Zr), titanium (Ti), aluminium (Al), Nobium (Nb), Indium (In), and Tantalum (Ta) and o' is 2 when Z' is Si, Zr or Ti, o' is 1.5 when Z' is Al or In and o' is 2.5 when Z' is Nb or Ta,
wherein:
the component (B) is an integral part of the porous structured material and is regularly distributed within the porous structured material via siloxy bonds
the components (A) and (B) have an identical or a different inorganic part
the components (A) and (B) have an identical or a different stabilized carbene, silylene or germylene; and
a molar ratio between the total amount of components (A), (B), and (C) divided by the total amount of components (A) and (B) ranges from 1 to about 1000.

15. The material of claim 1, wherein the stabilized carbene, silylene or germylene is a carbene-carbon, a silylene-silicium or a germylene-germanium which is bonded directly to at least one heteroatom.

16. The material of claim 1, wherein the organometallic part of the component consists of a stabilized carbene bonded to a metal.

17. The material of claim 1, wherein the organic part of the component consists of a stabilized carbene or a precursor of a stabilized carbene.

18. The material of claim 17, wherein the stabilized carbene is a substituted N-heterocyclic carbene.

19. The material of claim 17, wherein the precursor of the stabilized carbene is a substituted N-heterocyclic group.

20. The material of claim 1, wherein the precursor of the stabilized carbene is a substituted imidazolium unit.

21. The material of claim 1, wherein the metal is selected from the group consisting of Group 3 elements through Group 11 elements of the Periodic Table of Elements.

22. The material of claim 1, wherein the metal is selected from the group consisting of ruthenium (Ru), molybdenum (Mo), tungsten (W), and rhenium (Re).

23. The material of claim 1, wherein the metal is selected from the group consisting of iron (Fe), copper (Cu), nickel (Ni), palladium (Pd), and gold (Au).

24. The material of claim 1, wherein the metal is selected from the group consisting of vanadium (V), chromium (Cr), molybdenum (Mo), tungsten (W), rhenium (Re), iron (Fe), ruthenium (Ru), osmium (Os), platinum (Pt), and gold (Au).

25. The material of claim 1, wherein the metal is selected from the group consisting of lanthanides, neodinium (Nd), yttrium (Y), titanium (Ti), zirconium (Zr), hafnium (Hf), chromium (Cr), and nickel (Ni).

26. The material of claim 1, wherein the metal is selected from the group consisting of cobalt (Co), rhodium (Rh), and iridium (Ir).

27. The material of claim 1, wherein the metal is selected from the group consisting of titanium (Ti), ruthenium (Ru), rhodium (Rh), and Iridium (Ir).

28. A method for forming a material of claim 1 comprising at least the following steps:

a) a sol-gel step, with at least a mono or disilylated carbene, silylene or germylene precursor of formula V:

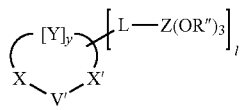

V wherein V', L, X, X', Y, Z, y are as defined herein above and R'' is selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether, and optionally with trialkoxyalkylmetalloid and/or peralkoxymetal/metalloid of formula $RaSi(ORb)_3$, or $Z'(ORa)_x$ $Z'(OH)x$ or $Z'(O-)_x \cdot (x/n)(E^{n+})$ with Ra and Rb identical or different selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether and x, n and E being a cation chosen among $K^+$, $Na^+$, $Ca^{2+}$ the sol-gel step is done in a presence of a structure directing agent and can be achieved in water with or without co-solvents or in an appropriate polar solvent along with water, using hydrolysis-condensation catalysts chosen among bases, acids or nucleophilic compounds to obtain a compound of formula III:

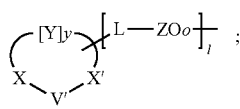

III b) optionally treating the compound of formula III to remove surfactant;

c) contacting the compound of formula III with a base or a silver compound; and d) simultaneously or subsequently reacting the material obtained in step c) with a metal complex under conditions so as to form a material of formula IV:

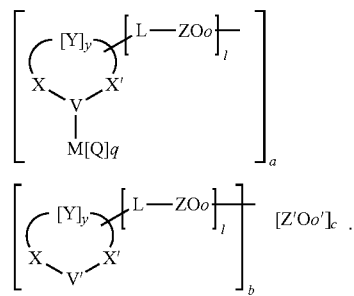

IV

29. A method for forming a material of claim 1 comprising at least the following steps:

a) a sol-gel step, with at least an organometallic mono or disilylated carbene, silylene or germylene precursor of formula VI:

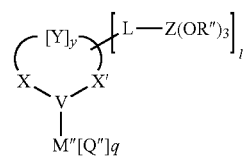

VI wherein:

M'' is M or another metal, selected from the group consisting of lanthanides and metals from group 3 elements to group 11 elements (III B to I B);

Q'' is Q or another ligand according to the Q definition and

R'' is selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether, and optionally with trialkoxyalkylmetalloid and/or peralkoxymetal/metalloid of formula $RaSi(ORb)_3$, or $Z'(ORa)_x$ $Z'(OH)x$ or $Z'(O-)_x \cdot (x/n)(E^{n+})$ where Ra and Rb may be identical or different and are each selected from the group consisting of hydrogen, $C_{1-20}$ alkyl, $C_{5-20}$ aryl, which can be substituted with one or more moieties selected from the group consisting of $C_{1-10}$ alkoxy, phosphine, sulfonated phosphine, phosphate, phosphinite, arsine, ether, amine, amide, imine, sulfoxide, carboxyl, nitrosyl, pyridine, substituted pyridine, imidazole, substituted imidazole, pyrazine, substituted pyrazine and thioether, x, n and E being a cation, preferably chosen among $K^+$, $Na^+$, and $Ca^{2+}$; and the sol-gel step is done in a presence of a structure directing agent and can be achieved in water with or without co-solvents or in an appropriate polar solvent along with water, using hydrolysis-condensation catalysts chosen among bases, acids or nucleophilic compounds to obtain a compound of formula III:

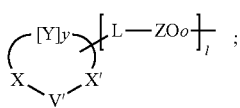

III b) optionally treating the compound of formula III to remove surfactant; and
c) optionally, when M" is different from M, subjecting the compound of formula III obtained to an in-situ transmetallation or contacting the compound of formula III with an appropriate component to obtain a desired material of formula IV:

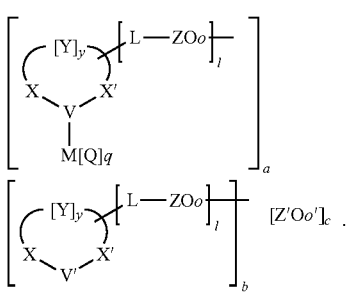

IV

30. The method of claim 28, wherein a further step a' is included after the step a, which consists in removing the residual hydroxyl or alkoxy-groups.

31. The method of claim 28, wherein the co-solvents are selected from the group consisting of alcohols, amides, ethers, and esters.

32. The method of claim 28, wherein the polar solvents are selected from the group consisting of alcohols, amides, ethers, and esters.

33. The method of claim 28, wherein the structure directing agent is selected from the group consisting of:
  1) anionic surfactants (sodium dodecyl sulfate);
  2) cationic surfactants: ammonium salts (cetyltrimethylammonium bromide), imidazolium salts (1-hexadecane-3-methylimidazolium bromide $C_{16}H_{33}$-methylimidazoliumBr), pyridinium salts (n-hexadecylpyridinium chloride), phosphonium salts; and
  3) non-ionic surfactants:
    amines (hexadecylamine ($C_{16}H_{33}NH_2$),
    alkylpolyethyleneoxides or alkylarylpolyethylene oxides (Brij 52 ($C_{16}H_{33}O(CH_2CH_2O)_2H$), Tergitol 15-S-12 ($C_{11-15}H_{23-31}O(CH_2CH_2O)_{12}H$), Triton X 100 ($C_{14}H_{22}O(C_2H_4O)_n$, n=9-10), Montanox 20 (Sorbitan.20EO.monooleyl ester), Octylphenol-10EO (p-$C_8H_{17}C_6H_4O(CH_2CH_2O)_{10}H$), Lauryl ether-nEO ($C_{12}H_{25}O(CH_2CH_2O)_nH$ n~2,4,8)),
    polysorbate surfactants (such as Tween 20 (IUPAC name: polyoxyethylene (20) sorbitan monolaurate) and,
    amphiphilic block copolymers (like Pluronic P123 triblock copolymer ($EO_{20}$-$PO_{70}$-$EO_{20}$), Pluronic F127 ($EO_{100}$-$PO_{70}$-$EO_{100}$) or F108 ($EO_{132}$-$PO_{50}$-$EO_{132}$)).

34. The method of claim 28, wherein the hydrolysis polycondensation catalyst is a base selected from the group consisting of amines, an inorganic acid, organic acids and a nucleophilic compound.

35. The method of claim 28, wherein the surfactant is removed by washing with the proper polar solvent with or without the presence of an acid or Soxhlet extraction.

36. The method of claim 35, wherein the base in step c is selected from the group consisting of potassium hexamethyldisilazide (KHMDS), tBuOK, DBU: 1,8-diazabicyclo[5.4.0]undec-7-ène, phosphazenes (BEMP), pyridines, phosphanes, and guanidine type bases: $(R^1R^2N)(R^3R^4N)C\!\!=\!\!N\!\!-\!\!R^5$.

37. The method of claim 36, wherein the silver compound is selected from the group consisting of soluble Ag salts, and Ag-Alkoxysilane or Ag-Alkoxyde: AgO—Si(iPr)$_3$, AgO—C(CF$_3$)$_3$.

38. The method of claim 36, wherein the metal complex is defined as $MQ_{q'}$, where q' is an integer comprised between 0 to 11.

39. The method of claim 30, wherein the further step a' is done by reacting the material with passivating agents, typically considered as hydrophobic and selected from the group consisting of trialkylsilyl derivatives (chloro, bromo, iodo, amido or alkoxysilanes) and alcohols.

40. The material obtainable by a method as claimed in claim 28.

41. Use of the material of claim 1, as an heterogeneous catalyst in an organic reaction process.

42. Use of the material of the claim 22 as an heterogeneous catalyst in a metathesis reaction process.

43. Use of the material of the claim 23 as an heterogeneous catalyst in a coupling C—C reaction process.

44. Use of the material of the claim 24 as an heterogeneous catalyst in an oxidation reaction process.

45. Use of the material of the claim 25 as an heterogeneous catalyst in a polymerization or oligomerization reaction process.

46. Use of the material of the claim 26 as an heterogeneous catalyst in a hydroformylation or carbonylation reaction process.

47. Use of the material of the claim 27 as an heterogeneous catalyst in a hydrogenation reaction process.

48. Use of the material of the claim 21 as an heterogeneous catalyst in an alkane conversion and C—H activation process.

* * * * *